United States Patent
Kamada et al.

[11] Patent Number: 5,946,058
[45] Date of Patent: Aug. 31, 1999

[54] TRANSISTOR MATRIX DEVICE INCLUDING FEATURES FOR MINIMIZING THE EFFECT OF PARASITIC CAPACITANCES

[75] Inventors: Tsuyoshi Kamada; Yoji Nagase; Katsusige Asada, all of Kawasaki, Japan

[73] Assignee: Fujitsu Limited, Kawasaki, Japan

[21] Appl. No.: 08/642,865

[22] Filed: May 6, 1996

[30] Foreign Application Priority Data

Jul. 24, 1995 [JP] Japan .................................. 7-187477
Feb. 2, 1996 [JP] Japan .................................. 8-017526

[51] Int. Cl.[6] .......................... G02F 1/136; G02F 1/1343
[52] U.S. Cl. .................................. 349/42; 349/43; 349/38
[58] Field of Search ................................ 349/42, 43, 38, 349/39, 48

[56] References Cited

U.S. PATENT DOCUMENTS

| | | | |
|---|---|---|---|
| 4,789,223 | 12/1988 | Kasahara et al. | 349/43 |
| 5,251,050 | 10/1993 | Kurematsu et al. | 359/57 |
| 5,394,258 | 2/1995 | Morin et al. | 349/39 |
| 5,576,857 | 11/1996 | Takemura | 359/59 |
| 5,600,461 | 2/1997 | Ueda et al. | 349/38 |
| 5,682,211 | 10/1997 | Yao et al. | 349/38 |
| 5,757,444 | 5/1998 | Takemura | 349/38 |
| 5,763,899 | 6/1998 | Yamazaki et al. | 257/59 |
| 5,767,926 | 6/1998 | Kim et al. | 349/38 |
| 5,771,083 | 6/1998 | Fujihara et al. | 349/147 |

FOREIGN PATENT DOCUMENTS 06347824  12/1994  Japan .

*Primary Examiner*—William L. Sikes
*Assistant Examiner*—Tarifur R. Chowdhury
*Attorney, Agent, or Firm*—Greer, Burns & Crain, Ltd.

[57] ABSTRACT

A plurality of parallel gate bus lines 16n, 16n+1, 16n+2, ... and a plurality of parallel drain bus lines 18m, 18m+1, ... are provided. Thin film transistors 14 are disposed near the lower end of sub-patterns 30n, 30n+1, 30n+2, ... The source electrodes 36 of the thin film transistors 14 are picture element electrodes 12 through contact holes 38. The picture element electrodes 12 are formed at positions which are beyond a next gate bus line 16n, 16n+1, 16n+2, ... Intermediate electrodes 40 for forming sub-capacitances Cs are formed on the lower ends of the picture element electrodes 12. The thin film transistor matrix device can form sub-capacitances of a large capacitance value and does not reduce fabrication yields.

30 Claims, 45 Drawing Sheets

FIG.16
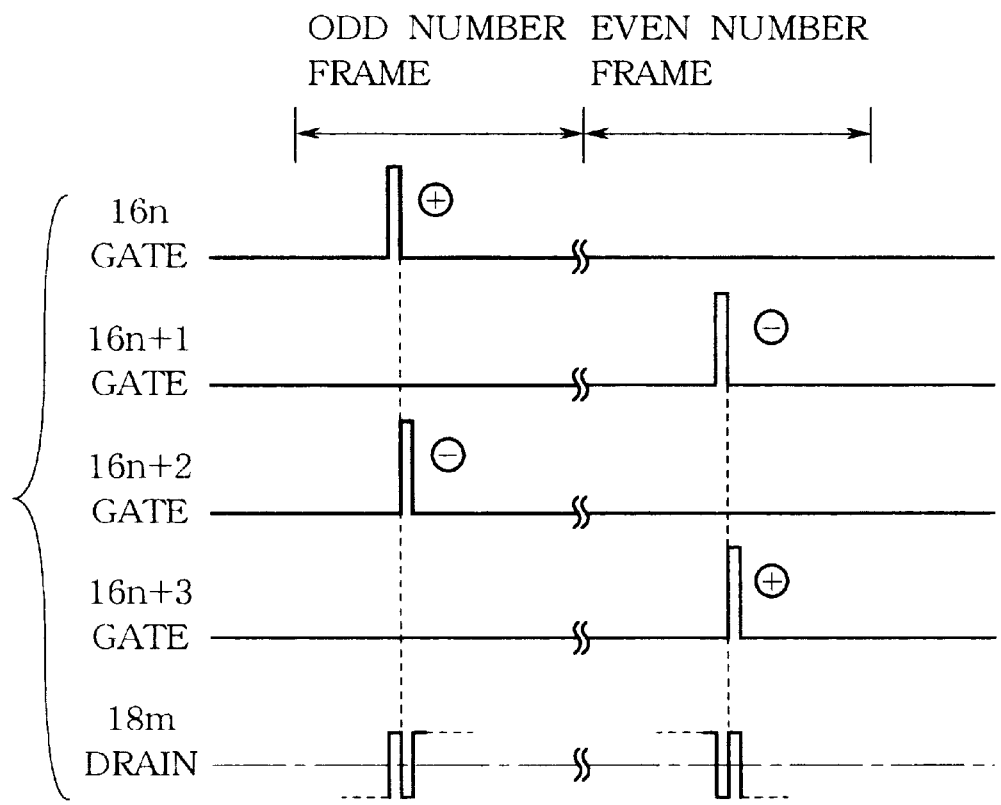
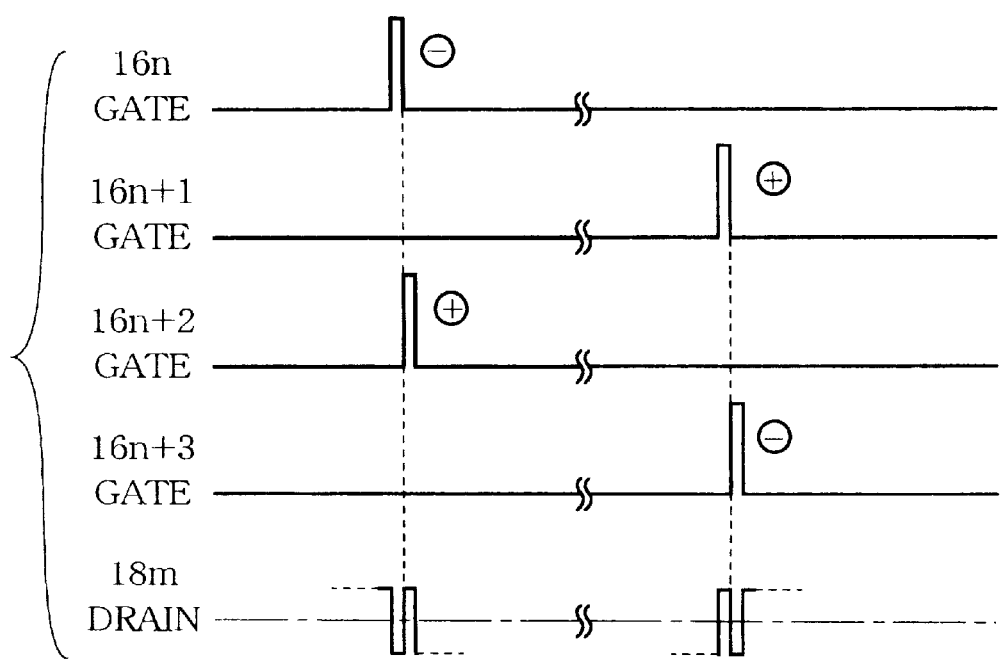

TRANSISTOR MATRIX DEVICE INCLUDING FEATURES FOR MINIMIZING THE EFFECT OF PARASITIC CAPACITANCES

BACKGROUND OF THE INVENTION

The present invention relates to a transistor matrix device and a method for driving the same, more specifically to a TFT matrix-type liquid crystal display device for use in laptop personal computers and wall televisions, and a method for driving the same.

TFT matrix-type liquid crystal display devices are characterized by thinness and lightness, low electric power consumption, etc., and are expected to have a large market in the future as a display device in place of CRTs. To realize large screens for use in work stations, and TFT panels of high precision, aperture ratios of picture elements are an important subject to obtain higher image qualities.

A liquid crystal panel of the most general normally white mode includes a light shield film which is called a black matrix opposed to the substrate for the purpose of preventing leakage of light between the picture element electrodes, and the drain bus lines and the gate bus lines which deteriorates contrast. In the liquid crystal panel of such structure, it is necessary to take into consideration a margin for aligning the TFT substrate with the opposed substrate, which adds to an area of the light shield film, the black matrix, adversely resulting in low aperture ratios. The aperture ratio is an important parameter on which display quality of the liquid crystal panel depends. For bright display, higher aperture ratios are required.

A liquid crystal capacitance which is a capacitance value of the liquid crystal is also an important parameter on which display, quality of the liquid crystal panel depends. Larger liquid crystal capacitances are necessary for higher display qualities.

Thus larger liquid crystal capacitances but nevertheless higher aperture ratios are an important technical subject for liquid crystal panel.

A conventional thin film transistor matrix device is shown in FIGS. 38A and 38B. FIG. 38A shows its pattern layout, and FIG. 38B shows a sectional view along the line A–A'.

With reference to FIG. 38A, the pattern layout of the thin film transistor matrix device will be explained. Picture element electrodes 102 are arranged in a matrix on a transparent insulating substrate 100. Thin film transistors 104 are disposed on the respective picture elements 102. Gate bus lines 106 are provided widthwise as viewed in FIG. 38A and are connected commonly to the gates of the respective thin film transistors 104 are commonly connected to gate bus lines 106. Drain bus lines 108 are provided lengthwise as viewed in FIG. 38A and commonly connected to the drains of the thin film transistors 104.

The structure of each thin film transistor will be detailed with reference to FIG. 38B. A gate electrode 109 is formed on a transparent insulating substrate 100, and a gate insulating film 110 is formed on the gate electrode 109. An amorphous silicon layer 112 to be a channel layer of the thin film transistor is formed on the gate insulating film 110. A channel protection film 114 for protecting the central channel region is provided on the amorphous silicon film 112. n$^+$-amorphous silicon layers 116, 118 are formed on both sides of the channel protection film 114 on the amorphous silicon layer 112. A drain electrode 120 is formed on the n$^+$-amorphous silicon layer 16, and a source electrode 122 is formed on the n$^+$-amorphous silicon layer 118. The thin film transistors 104 are entirely covered with a protection film 124. A picture element electrode 102 is formed on the protection film 124. The picture element electrode 102 and the source electrode 122 are connected through a contact hole 126 formed in the protection film 124.

FIG. 39 shows an equivalent circuit of each thin film matrix device. Each film transistor is provided at each of the intersections between gate bus lines 106 and drain bus lines 108. A liquid crystal capacitance Clc which is a capacitance of the liquid crystal is connected to the source electrode 122 of the thin film transistor 104. A parasitic capacitance Cgs is present between the picture element electrode 102 and the gate bus line 106. A parasitic capacitance Cgs is a total of a capacitance value corresponding to a degree of overlap between the gate electrode 109 and the source electrode 122 of the thin film transistor 104, and a capacitance value generated by the neighborhood between the picture element electrode 102 and the gate bus line 106.

Then, the operation of the thin film transistor matrix device will be explained with reference to FIG. 40.

When a positive pulse is applied to the gate bus line 106, the thin film transistors 104 are turned on, and a required drain voltage VD applied to the drain electrodes 120 is applied to the picture element electrodes 102. By applying a required drain voltage VD at this time, required displays including intensity levels can be available.

However, the presence of a parasitic capacitance Cgs makes it impossible to apply a required drain voltage VD to the picture element electrodes 102. That is, when a required drain voltage VD is applied, and a gate voltage VD is changed from an OFF voltage VGoff to an ON voltage VGon, the thin film transistors 104 are turned on, and the drain voltage VD is applied to the picture element electrodes 102. When the gate voltage VG is changed by ΔVG from the ON voltage VGon to the OFF voltage VGoff, a potential of the picture elements 102 is adversely lowered by ΔV as shown by the following formula, by the capacitive coupling of the parasitic capacitance Cgs.

$$\Delta V = Cgs/(Cgs+Clc) \cdot \Delta VG \tag{1}$$

Accordingly a direct current noise component ΔV is overlapped on a potential of the picture element electrodes 102 with the result of problems of flickering of liquid crystal displays, poor contrast, lower reliability of decomposition of the liquid crystal and orientation film, etc., printing of liquid crystal displays, etc. As a countermeasure to these problems. a common potential Vc which is a potential of opposed electrodes is lowered by ΔV, so that a required voltage is applied to the liquid crystal.

The liquid crystal capacitance Clc is changed in accordance with the ON/OFF states of the liquid crystal. The liquid crystal capacitance Clc(on) in the state that a voltage is applied to the liquid crystal is larger than the liquid crystal capacitance Clc(off) in the state that no voltage is applied to the liquid crystal. Accordingly a voltage ΔV which is lowered by the capacitive coupling by the parasitic capacitance Cgs varies depending on display states.

Even though a common potential Vc is lowered, the above-described problems, such as printing of liquid crystal displays, occur depending on display states.

To solve these problems, a thin film transistor matrix device including a sub-capacitance disposed parallel with a liquid crystal capacitance has been proposed.

This thin film transistor matrix device is shown in FIGS. 41A to 41C. FIG. 41A shows the pattern layout. FIG. 41B shows the sectional view along the line A–A'. FIG. 41C shows the sectional view along the line B–B'.

With reference to FIG. 41A, the pattern layout of the thin film transistor matrix device will be explained. Picture elements 102 are arranged in a matrix on a transparent insulating substrate 100. A thin film transistor 104 is provided on each picture element electrode 102. Gate bus lines 106 which are commonly connected to the gates of the thin film transistors 104 are provided, and drain bus lines 108 which are commonly connected to the drains of the thin film transistors 104 are provided.

Intermediate electrodes 128 for forming the sub-capacitances Cs are formed below the picture element electrodes 102. Gate bus lines 106 are formed below the intermediate electrodes 128 and in the gaps between the picture elements electrodes 102 along the drain bus lines 108 corresponding to the intermediate electrodes 128.

The structure of the thin film transistor matrix device will be explained with reference to FIGS. 41A and 41B.

The structure of the sub-capacitances Cs is shown in FIG. 41C. That is, a gate bus line 106 is formed on the transparent insulating substrate 100, and an intermediate electrode 128 is formed above the gate bus line 106 through the gate insulating film 110. The intermediate electrode 128 is covered with a protection film 124. A picture element electrode 102 is formed on the protection film 124. The picture electrode 102 and the intermediate electrode 128 are connected through a contact hole 130 formed in the protection film 124.

The equivalent circuit of the thin film transistor matrix device is shown in FIG. 42, and operational waveforms of the thin film transistor matrix device are shown in FIG. 43.

The thin film transistors 104 are disposed at the intersections between the gate bus lines 106 and the drain bus lines 108. Liquid crystal capacitances Clc which are a capacitance of the liquid crystal are connected to the source electrodes 122 of the thin film transistors 104. The sub-capacitances Cs are present between the picture element electrodes 102, and the gate bus lines 106 adjacent to the picture element electrodes 102. The parasitic capacitances Cs have a value corresponding to a degree of overlap between the gate bus lines 106 and the intermediate electrodes 128.

A direct current voltage change ΔV of the picture element electrodes 102 of the thin film transistor matrix device is given by the following formula.

$$\Delta V = Cgs/(Cgs+Clc+Cs) \cdot VG \qquad (2)$$

Thus the voltage change ΔV can be made small as shown in FIG. 43 by making the capacitance value Cs of the sub-capacitances larger as much as possible so that (Clc+Cs)>>Cgs, whereby much improved display quality can be available. As shown in FIG. 43, a voltage of the picture element electrodes 102 is changed by writing pulses of the gate bus lines 106 connected to the sub-capacitances Cs, but the change is too short to affect a display quality.

Thus, for the improvement of the display quality it is very effective to provide the sub-capacitances for larger apparent capacitances. To realize this, the sub-capacitances are formed by overlapping parts of the gate bus lines on parts of the picture element electrodes with the insulating film therebetween. That is, a structure called Cs-on-Gate structure has been proposed. The above-described structure of FIGS. 41A to 41C is a Cs-on-Gate structure.

One example of the Cs-on-Gate structure is shown in FIGS. 44A and 44B. FIG. 44A shows the pattern layout, and FIG. 44C shows the sectional view along the line C–C'.

In this thin film transistor matrix device, the pattern for forming the sub-capacitances functions as the black matrix for shielding leakage light, whereby higher aperture ratios can be obtained.

Picture element electrodes 102 are arranged on a transparent insulating substrate 100 in a matrix. A thin film transistor 104 is disposed on each picture element electrode 102. Gate bus lines 106 commonly connected to the gates of the thin film transistors 104, and the drain bus lines 108 commonly connected to the drains of the thin film transistors 104 are provided.

Sub-patterns 132 are provided for covering the gaps between the respective picture element electrodes 102, and those on the left and the right sides of the respective picture element electrodes 102. The sub-patterns 132 overlap the picture element electrodes 102 at peripheral parts thereof, and are continuous to the gate bus lines 106 in an integral pattern.

As shown in FIG. 44B, sub-patterns 132, which are continuous to gate bus lines 106, are formed on the transparent insulating substrate 100, and the gate insulating film 110 is formed on the sub-patterns 132. Drain bus lines 108 are formed on the gate insulating film 110, and a protection film 124 is formed on the drain bus lines 108. Picture element electrodes 102 are formed on the protection film 124.

The picture element electrodes 102 and the sub-patterns 132 partially overlap each other with the gate insulating film 110 and the protection film 124 therebetween, whereby sub-capacitances Cs are formed between the picture elements 102 and the gate bus lines 106.

Because the sub-patterns 132 also function as the light shield films, a pattern of the black matrix 134 to be formed on an opposed substrate is a region including the thin film transistor 104 above the picture element electrode 102, and a region between the gate bus line 106 and the picture element electrode 102.

In the thin film transistor matrix device of the Cs-on-Gate structure of FIG. 44A, the picture element electrode 102 is enclosed on only three sides thereof. A black matrix is necessary on the remaining one side, which results in lower aperture ratios.

As a countermeasure to this, a Cs-on-Gate structure in which the sub-patterns 132 are formed so as to enclose the picture element electrode 102 has been proposed. Such a Cs-on-Gate structure is shown in FIGS. 45A and 45B. FIG. 45A shows the pattern layout, and FIG. 45B shows the sectional view along the line C–C'.

In this thin film transistor matrix device, the sub-patterns 132 are extended further over the picture element electrode 102 in a ring-shaped pattern which encloses the picture element 102. This permits a pattern of the black matrix 134 which is to be formed on an opposed substrate to be able to shield only the thin film transistor 104, which results in very small alignment margins.

In the pattern of the thin film transistor matrix device as shown in FIGS. 45A and 45B, the gate bus lines neighbor each other over a long distance, which makes fabrication with high precision difficult, with a result of low fabrication yields. This is a problem.

On the other hand, as concerns the parasitic capacitance, in addition to the parasitic capacitances between the picture element electrodes and the gate bus lines, parasitic capacitances between the picture element electrodes are a problem. With large parasitic capacitances between the picture element electrodes, when data is written in picture element electrodes of a line adjacent to a line in the picture element electrodes in which data has been written, a potential of the picture element electrodes of the former line is changed by capacitive coupling. This is also a problem.

Accordingly, even in a case that there is ample allowance for the pattern, it is impossible to neighbor the picture element electrodes by, e.g., less than 5 µm, and the aperture ratio cannot exceed a certain degree.

As a structure in which sub-capacitances are provided for large apparent capacitances, in addition to the above-described Cs-on-Gate structure, the so-called independent Cs structure has been proposed. That is, capacitance bus lines for the sub-capacitances Cs are provided independent of the gate bus lines, and the sub-capacitances Cs are provided on the capacitance bus lines.

FIG. 46 shows a conventional thin film transistor matrix device using the independent Cs structure.

Picture element electrodes 102 are arranged on a transparent insulating substrate in a matrix. A thin film transistor 104 is disposed on each picture element electrode 102. Each thin film transistor 104 includes a gate electrode 109, a drain electrode 120 and a source electrode 122. The gate electrodes 109 of the thin film transistors 104 are commonly connected to gate bus lines 106 provided widthwise as viewed in FIG. 46. The drain electrodes 120 of the thin film transistors 104 are commonly connected to drain bus lines 108 provided lengthwise as viewed in FIG. 46. The source electrodes 122 of the thin film transistors 104 are connected to the picture element electrodes 102 through contact holes 126.

To form a sub-capacitance Cs, an intermediate electrode 128 is provided at the center of each thin film transistor 102. The intermediate electrode 128 is connected to the picture element electrode 102 through a contact hole 130. A capacitance bus line 140 is provided below the intermediate electrode 128 widthwise as viewed in FIG. 46. A sub-capacitance Cs is formed between the intermediate electrode 128 and the capacitance bus line 140.

To shield light at the gaps between the picture element electrodes 102 of the thin film transistor matrix device, and the gate bus lines 106 and the drain bus lines 108 thereof, a light shield film 150 which is called a black matrix is formed on a substrate opposed to the TFT substrate.

In the independent Cs thin film transistor matrix device, however, for shielding the gaps by the black matrix, it is necessary to consider a margin corresponding to adhesion precision as shown in FIG. 46 in consideration of an adhesion error between the TFT substrate and the opposed substrate. This has made it difficult for the aperture ratio to exceed a certain ratio.

For aperture ratio improvement, it is proposed that light is shielded at the gaps without the use of the black matrix on the opposed substrate but by the use of the gate bus lines on the TFT substrate, the capacitance bus lines, etc. In a case that the light shield is effected by the pattern of the substrate of the thin film transistor matrix, higher alignment precision can be secured in comparison with the adhesion precision, which results in higher aperture ratios.

FIGS. 47A and 47B show one of the conventional thin film transistor matrix device in which the gate bus lines are used to shield light at the gaps. FIG. 47A shows its pattern layout, and FIG. 47B shows the sectional view along the line I–I'.

In the thin film transistor matrix device shown in FIGS. 47A and 47B, the gate bus lines 106 have a large width to thereby shield light at the gaps between the picture element electrodes 102 and the gate bus lines 106. The pattern on the TFT substrate, such as the gate bus lines 106, the capacitance bus lines 140, etc., are used to shield light at the gaps, whereby it is not necessary to consider a large alignment margin. High aperture ratios are available.

However, when the gate bus lines 106 are used to shield light at the gaps as shown in FIG. 47B, new capacitances Cgs are generated between the picture element electrodes 102 and the gate bus lines 106, and a direct current voltage change ΔV of the picture element electrodes 102, i.e., a field through voltage ΔV is given by the above-described formula (1) or (2). As seen from these formulas, as capacitances Cgs increase, field through voltages ΔV increase, and a difference in the effective picture element voltage between the white display and the black display becomes large. This results in poor display quality.

There is also a problem that in shielding light at the gaps between the gate bus lines and the picture element electrodes by using the gate bus lines, deformation takes place in an orientation of the liquid crystal near the gate bus lines, and the deformation causes light leakage.

One example of the conventional thin film transistor matrix device in which light shielding at the gaps is conducted by the gate bus lines is shown in FIGS. 48 and 49. FIG. 48 shows the pattern layout, and FIG. 49 shows the sectional view along the line J–J'.

In the thin film transistor matrix device, as shown in FIG. 48, picture element electrodes 102 overlap gate bus lines 106 to shield light at the gap between the picture element electrodes 102. At the light shield parts, as shown in FIG. 49, deformation takes place in an orientation of the liquid crystal 142 between the picture element electrodes 102 and a common electrode 144. That is, a widthwise electric field is applied between the picture element electrodes and the common electrode 144 corresponding to a potential difference therebetween to orient the liquid crystal 142. In a case that an orientation of the widthwise electric field is opposite to that of the liquid crystal, as shown in FIG. 49, a reverse boundary 143 where a reversal of an orientation takes place in the liquid crystal 142 near an end of the picture element electrode 102. Light leaks at the reverse boundary. This a problem.

As described above, the conventional thin film transistor matrix devices must have high aperture ratios for light display and larger crystal capacities for higher display quality, but these criterion have not been sufficiently met.

The conventional thin film transistor matrix devices have patterns in which the gate bus lines neighbor each other over a rather long distance. This makes fabrication with good precision difficult, which results in low fabrication yields. This is a problem.

The conventional thin film transistor matrix device also has the problem that when data is written in adjacent picture element electrodes, a potential of the picture element electrodes is adversely changed due to capacitive coupling.

There is also a problem that due to a transverse electric field between the picture element electrodes and the gate bus lines, a boundary where an orientation is reversed appears in the liquid crystal, and light leaks at the boundary.

SUMMARY OF THE INVENTION

A first object of the present invention is to provide a thin film transistor matrix device which has an improved aperture ratio to realize light display, and has an increased liquid crystal capacitance to improve display quality.

A second object of the present invention is to provide a thin film transistor matrix device which can form sub-capacitances of large capacitance values, and does not lower fabrication yields.

A third object of the present invention is to provide a method for driving a thin film transistor matrix device which, even when a parasitic capacitance between the picture element electrodes is large, does not change a potential of the picture element electrodes.

A fourth object of the present invention is to provide a thin film transistor matrix device which, even when a boundary where an orientation is reversed appears in the liquid crystal, is free from light leakage.

The above-described objects are achieved by a transistor matrix device comprising: a transparent insulating substrate; a plurality of picture element electrodes arranged in a matrix on the transparent insulating substrate; a plurality of transistors disposed respectively on said plurality of picture element electrodes for switching the respective picture element electrodes; a plurality of gate bus lines commonly connecting gates of the transistors; and a plurality of drain bus lines commonly connecting drains of the transistors, the picture element electrodes of an n-th row, which are connected to an n-th gate bus line through the transistors having at least parts thereof located between an n+1-th gate bus lines next to the n-th gate bus line, and an n+2-th gate bus line next to the n+1-th gate bus line.

In the above-described transistor matrix device it is preferred that the picture element electrodes of the n-th row are disposed in a region between the n+1-th gate bus line and the n+2-th gate bus line.

In the above-described transistor matrix device it is preferred that the transistor matrix device further comprises first sub-capacitances disposed between the picture element electrodes of the n-th row and the n+2-th gate bus lines.

In the above-described transistor matrix device it is preferred that the transistor matrix device further comprises second sub-capacitances disposed between the picture element electrodes of the n-th row and the n+2-th gate bus lines.

In the above-described transistor matrix device it is preferred that a capacitance value of the second sub-capacitances is larger than that of the first sub-capacitances.

In the above-described transistor matrix device it is preferred that a capacitance value of the first sub-capacitances is larger than that of the second sub-capacitances.

In the above-described transistor matrix device it is preferred that the transistor matrix device further comprises intermediate electrodes disposed between the picture element electrodes and the gate bus lines and connected to the picture element electrodes, and that the first sub-capacitances or the second sub-capacitances are formed between the intermediate electrodes and the gate bus lines.

In the above-described transistor matrix device it is preferred that the transistor matrix device further comprises source electrodes disposed between sources of the transistors and the picture element electrodes and connecting the sources to the picture element electrodes, and that the first sub-capacitances are formed between the source electrodes and the gate bus lines.

In the above-described transistor matrix device it is preferred that the source electrodes shield light at gaps between the picture element electrodes and the gate bus lines.

In the above-described transistor matrix device it is preferred that the picture element electrodes of the n-th row or electrodes connected thereto, and the picture element electrodes of the n+1-th row or electrodes connected thereto are neighbored with each other by below 5 µm.

In the above-described transistor matrix device it is preferred that the transistor matrix device further comprises a plurality of light shielding films for shielding light at gaps between the picture element electrodes of the n-th row and the picture element electrodes of the n+1-th row next to the n-th row.

In the above-described transistor matrix device it is preferred that an n-th light shielding film which shields light at the gaps between the picture element electrodes of the n-th row and the picture element electrodes of the n+1-th row is connected to the n+2-th gate bus line.

In the above-described transistor matrix device it is preferred that the transistor matrix device further comprises a plurality of capacitance bus lines disposed between said plurality of gate bus lines; and third sub-capacitances disposed between the picture element electrodes and the capacitance bus lines.

In the above-described transistor matrix device it is preferred that light is shielded at gaps between the picture element electrodes of the n-th row and the picture element electrodes of the n+1-th row by the n+1-th capacitance bus line.

In the above-described transistor matrix device it is preferred that the transistor matrix device further comprises intermediate electrodes connected to the picture element electrodes and forming the third sub-capacitances between the capacitance bus lines and the intermediate electrodes, and that the intermediate electrodes shield light at gaps between the picture element electrodes of the n-th row and the picture element electrodes of the n+1-th row.

In the above-described transistor matrix device it is preferred that the transistor matrix device further comprises sub-patterns extended along the drain bus lines from the gate bus lines or the capacitance bus lines to shield light at gaps between the picture element electrodes and the drain bus lines.

The above-described objects can be achieved by a transistor matrix device comprising: a transparent insulating substrate; a plurality of picture element electrodes arranged in a matrix on the transparent insulating substrate; a plurality of transistors disposed respectively on said plurality of picture element electrodes for switching the respective picture element electrodes; a plurality of gate bus lines commonly connecting the gates of the transistors; and a plurality of drain bus lines commonly connecting the drains of the transistors, the gate bus lines being overlapped on edges of the picture element electrodes of two neighboring rows or electrodes connected to said picture element electrodes, the gate bus lines being overlapped on the picture element electrodes of one of the two neighboring rows or the electrodes connected thereto over a width wider than on the picture element electrodes of the other of the two neighboring rows or the electrodes connected thereto, whereby the gate bus lines shield inversion boundaries of liquid crystal generated near the edges of the picture element electrodes of said one row or said electrodes connected thereto.

In the above-described transistor matrix device it is preferred that the gate bus lines are overlapped on edges of the picture element electrodes of two neighboring rows or electrodes connected to said picture element electrodes, and the gate bus lines are overlapped on the picture element electrodes of one of the two neighboring rows or the electrodes connected thereto over a width wider than on the picture element electrodes of the other of the two neighboring rows or the electrodes connected thereto, whereby the gate bus lines shield inversion boundaries of liquid crystal generated near the edges of the picture element electrodes of said one row or said electrodes connected thereto.

In the above-described transistor matrix device it is preferred that an orientation of the liquid crystal has a component which is directed from the edges of said picture element electrodes or said electrodes connected thereto, which are overlapped on the gate bus lines over the relatively larger width, to the edges of said picture element electrodes or said electrodes, which are overlapped on the gate bus lines over the relatively smaller width.

In the above-described transistor matrix device it is preferred that said picture element electrodes are picture element electrodes each of three sub-picture elements constituting one color picture element.

In the above-described transistor matrix device it is preferred that the three sub-picture elements constituting each of said picture elements are located respectively at three summits of a triangle.

In the above-described transistor matrix device it is preferred that the transistors are thin film transistors.

The above-described objects can be achieved by a liquid crystal panel comprising: the above-described transistor matrix device; an opposed substrate arranged opposed to the transistor matrix device; and a liquid crystal sandwiched between the transistor matrix device and the opposed substrate.

In the above-described liquid crystal panel it is preferred that an orientation of the liquid crystal corresponding to a first region between the n-th gate bus line and the n-th light shielding film is different from an orientation of the liquid crystal corresponding to a second region between the n-th light shielding film and the n+1-th gate bus line.

The above-described objects can be achieved by a liquid crystal display unit comprising: the above-described liquid crystal panel; a drive circuit for driving the liquid crystal panel; and a connection wiring for connecting the liquid crystal panel and the drive circuit.

The above-described objects can be achieved by a transistor matrix device driving method for driving a transistor matrix device comprising: a transparent insulating substrate; a plurality of picture element electrodes arranged in a matrix on the transparent insulating substrate; a plurality of transistors disposed respectively on said plurality of picture element electrodes for switching the respective picture element electrodes; a plurality of gate bus lines commonly connecting the gates of the transistors; and a plurality of drain bus lines commonly connecting the drains of the transistors, the picture element electrodes of an n-th row and the picture element electrodes of an n+2-th row being driven so that their polarities are opposite to each other.

In the above-described method for driving the transistor matrix device it is preferred that in a first frame of a display image the picture element electrodes of the n-th row and the picture element electrodes of the n+2-th row are driven so that their polarities are opposite to each other, in a second frame of the display image the picture element electrodes of an n+1-th row and the picture element electrodes of the n+3-th row are driven so that their polarities are opposite to each other.

In the method for driving the transistor matrix device it is preferred that the picture element electrodes of the n-th row and the picture element electrodes of the n+1-th row are driven so that their polarities are opposite to each other.

BRIEF DESCRIPTION OF THE DRAWINGS

FIG. 16 is an explanatory view of a method for driving the thin film transistor matrix device according to the fifth embodiment of the present invention.

DETAILED DESCRIPTION OF THE INVENTION

A First Embodiment

Figure 1:
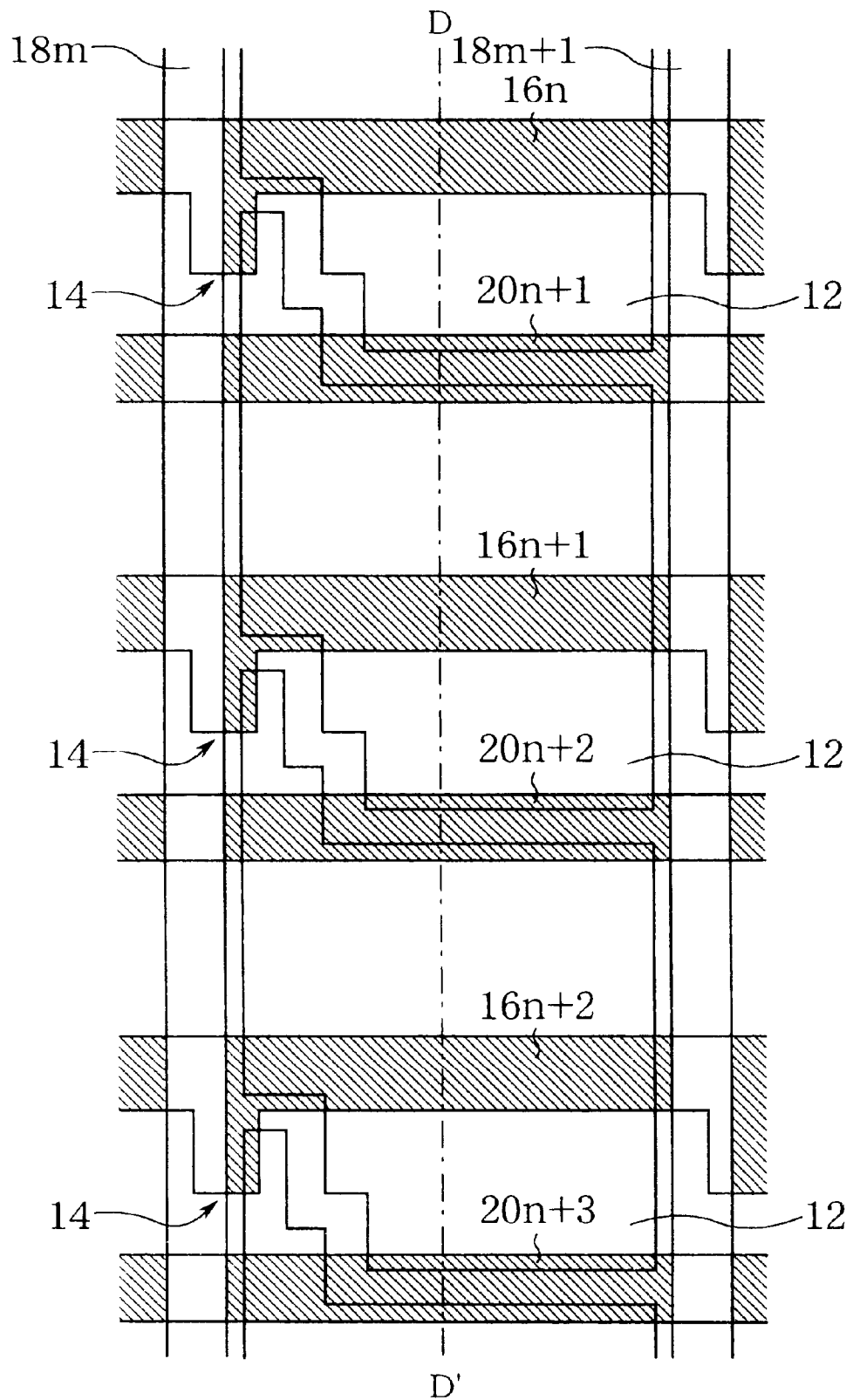
FIG. 1 is a view of a pattern layout of the thin film transistor matrix device according to a first embodiment of the present invention.
Figure 2:
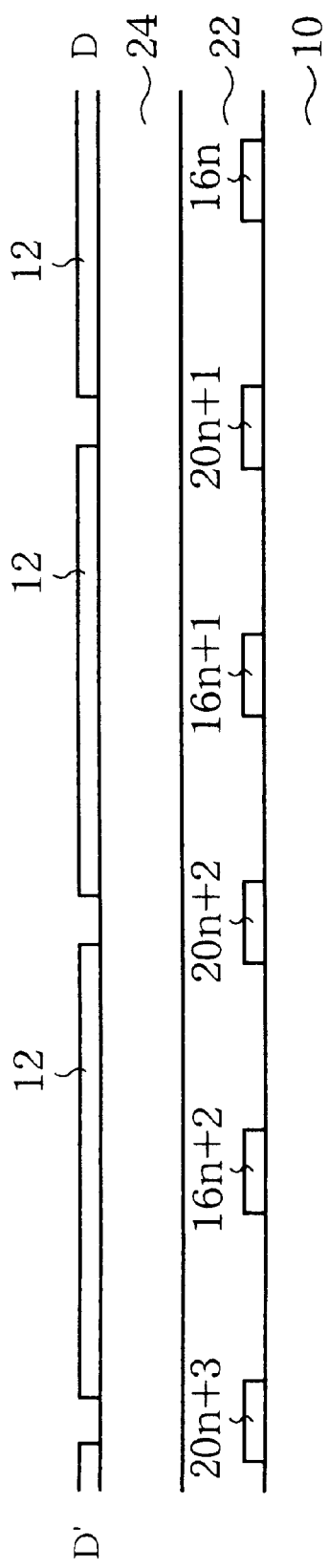
FIG. 2 is a sectional view of the thin film transistor matrix device according to the first embodiment of the present invention.
Figure 3:
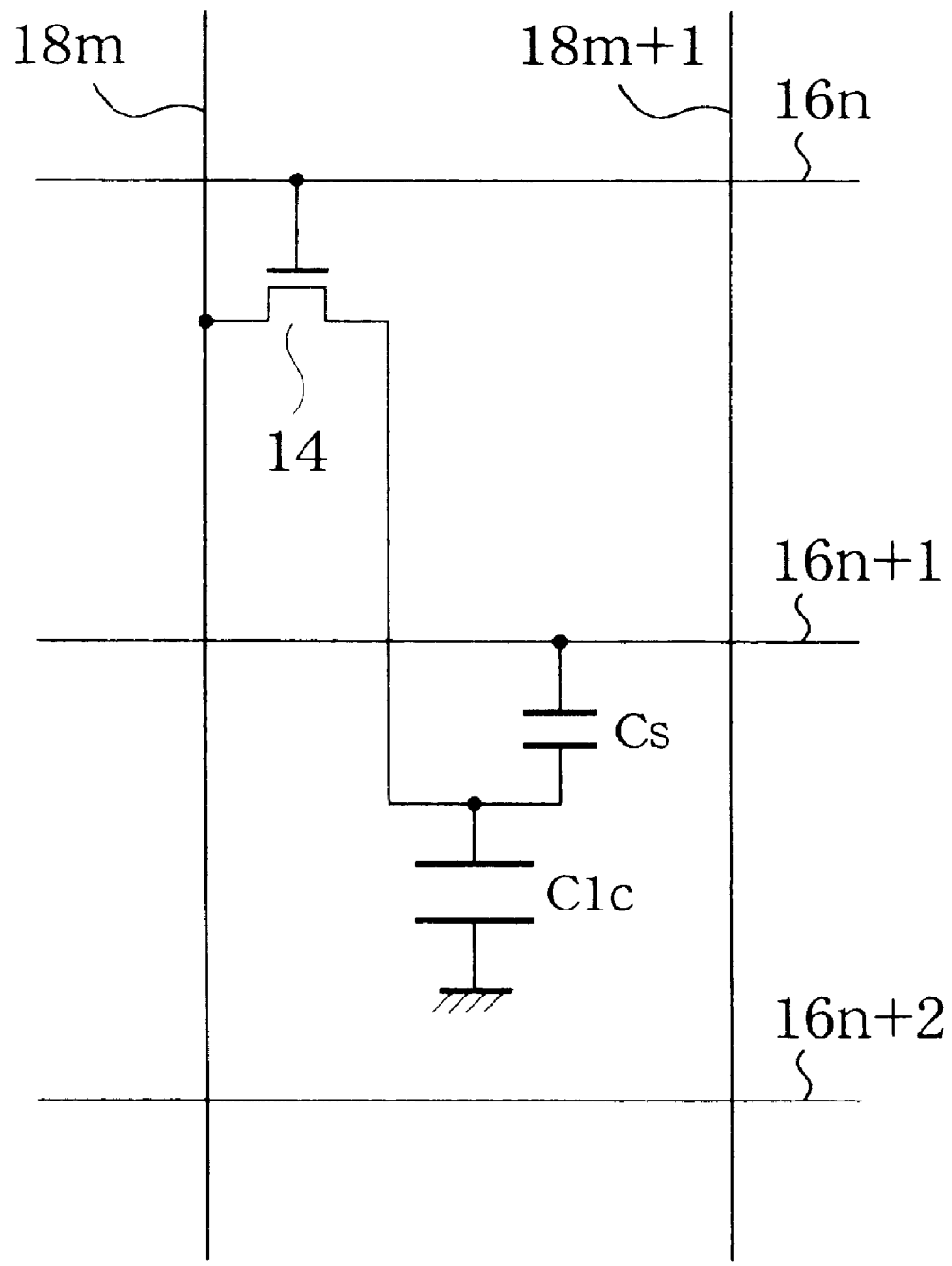
FIG. 3 is a view of an equivalent circuit of the thin film transistor matrix device according to the first embodiment of the present invention.

The thin film transistor matrix device according to a first embodiment will be explained with reference to FIGS. 1 to 3. FIG. 1 shows a pattern layout of the device. FIG. 2 shows the sectional view along the line D–D'. FIG. 3 shows an equivalent circuit of the device.

As shown in FIG. 1, a plurality of gate bus lines $16n$, $16n+1$, $16n+2$, . . . which are parallel with each other, and a plurality of drain bus lines $18m$, $18m+1$, . . . which are parallel with each other are provided respectively widthwise and lengthwise on a transparent insulating substrate 10.

Thin film transistors 14 are disposed at the intersections between the gate bus lines $16n$, $16n+2$, $16n+2$, . . . and the drain bus lines $18m$, $18m+1$, . . . The gate electrodes of the thin film transistors 14 are commonly connected to the gate bus lines $16n$, $16n+1$, $16+2$, . . . , and the drain electrodes of the thin film transistors 14 are commonly connected to the drain bus lines $18m$, $18m+1$, . . . The source electrodes of the thin film transistors 14 are connected to picture element electrodes 12.

Each picture element electrode 12 of the present embodiment is positioned over the gate bus lines $16n$, $16n+1$, $16n+2$, . . . For example, a picture element electrode 12 connected to the gate bus line $16n$ via a thin film transistor 14 has an upper end located between the gate bus line $16n$ and the gate bus line $16n+1$, and a lower end located between the gate bus line $16n+1$ and the gate bus line $16n+2$. That is, the thin film transistor 14 is located at an intersection between the gate bus line $16n$ and the drain bus line $18m$, and the source electrode of the thin film transistor 14 is extended downward to be connected to the upper end of the picture element electrode 12.

This arrangement defines gaps between adjacent picture element electrodes 12 between the gate bus lines $16n$, $16n+1$ and the gate bus lines $16n+1$, $16n+2$. To shield light at these gaps, light shield films $20n$, $20n+1$, $20n+2$, . . . are provided.

As shown in FIG. 2, the gate bus lines $16n$, $16n+1$, $16n+2$, . . . , and the light shield films $20n$, $20n+1$, $20n+2$, . . . are formed on the transparent insulating substrate 10. A gate insulating film 22 of the thin film transistors 14 is formed on the gate bus lines $16n$, $16n+1$, $16n+2$, . . . and the light shield films $20n$, $20n+1$, $20n+2$, . . . The picture element electrodes 12 are formed so that they are located respectively over the gate bus line $16n$, $16n+1$, $16n+2$, . . . and each of the picture element electrodes 12 have their ends located in agreement with light shield films $20n$, $20n+1$, $20n+2$, . . . adjacent to each other.

FIG. 3 is an equivalent circuit of the first embodiment which is focussed on one picture element electrode 14.

The thin film transistor 14 is formed at an intersection between the gate bus lines $16n$, $16n+1$, $16n+2$, . . . and the drain bus lines $18m$, $18m+1$, . . . The thin film transistor 14 has the gate electrode connected to the gate bus line $16n$, the d rain electrode connected to the drain bus line $18m$ and the source electrode extended downward to be connected to a picture element electrode 12. As a result, a liquid crystal capacitance Clc which is a capacitance of the liquid crystal is connected to the source electrode of the thin film transistor 14.

Because the picture element electrode 12 overlaps the light shield films $20n$, $20n+1$, $20n+2$, the light shield films $20n$, $20n+1$, $20n+2$, . . . are connected to the gate bus lines $16n$, $16n+1$, $16n+2$, . . . , whereby a sub-capacitance Cs is formed between the picture element electrode 12 and the gate bus line $16n+1$.

Thus, according to the present embodiment, the gaps between the picture element electrodes are shielded by the gate bus lines and the light shield films, whereby it is not necessary for a black matrix to shield light at the gaps.

Accordingly the black matrix on an opposed substrate shields only the parts where the thin film transistors are located, with a result of much reduced alignment margins.

A Second Embodiment

Figure 4:
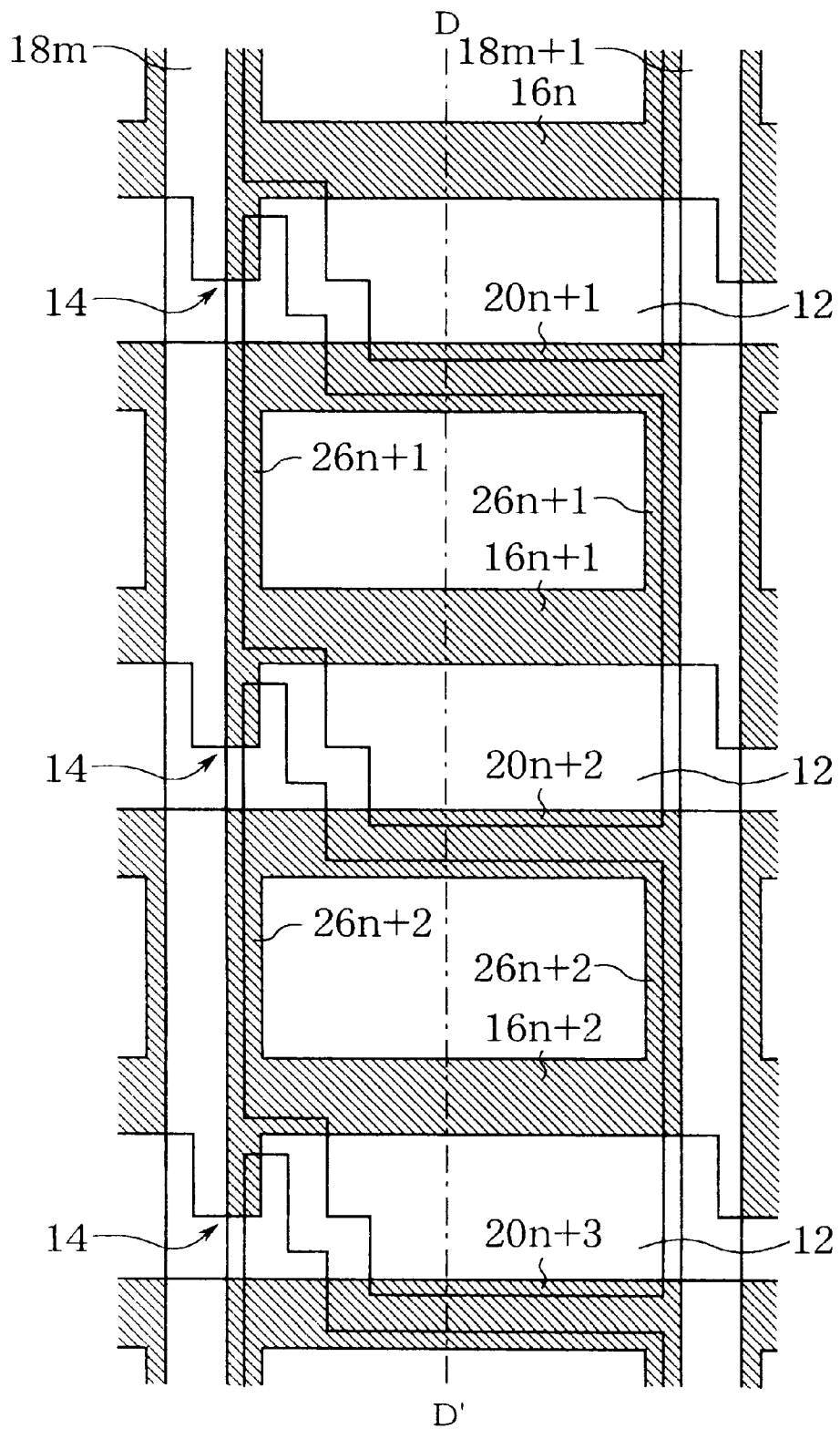
FIG. 4 is a view of a pattern layout of the thin film transistor matrix device according to the second embodiment of the present invention.
Figure 5:
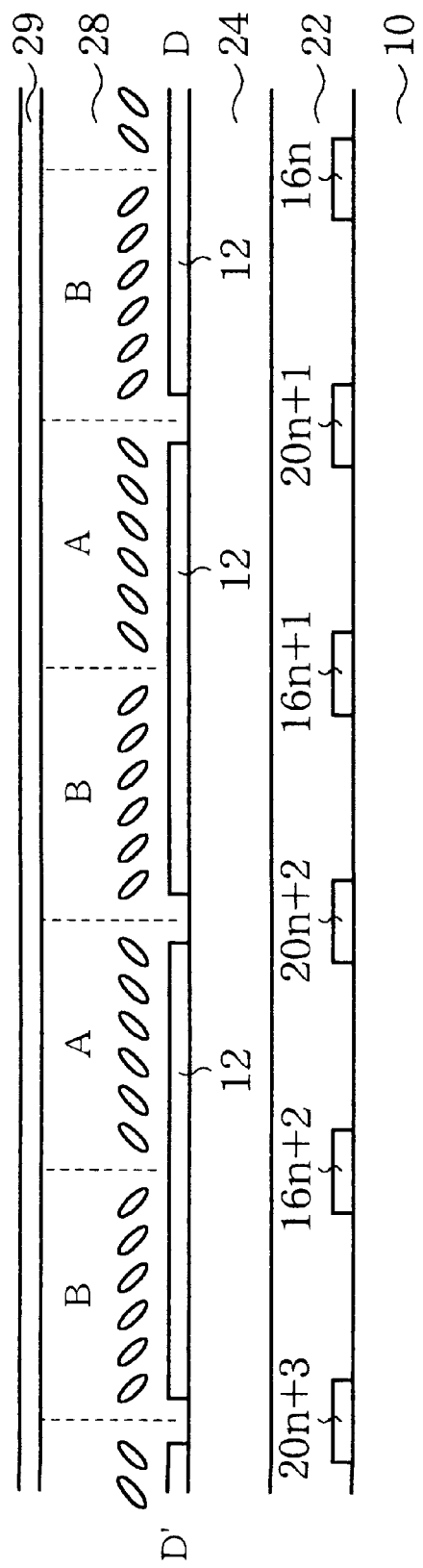
FIG. 5 is a sectional view of the thin film transistor matrix device according to the second embodiment of the present invention.

The thin film transistor matrix device according to a second embodiment of the present invention will be explained with reference to FIGS. 4 and 5. FIG. 4 shows a pattern layout of the device, and FIG. 5 shows the sectional view along the line D–D'. Members of the present embodiment which are the same or of the same kind as those of the first embodiment will be represented by the same reference numerals so as not to repeat or to explain their explanation.

In the present embodiment the light shield films $20n$, $20n+1$, $20n+2$, ... are connected to the gate bus lines $16n$, $16n+1$, $16n+2$, .... Connection patterns $26n$, $26n+1$, $26n+2$, ... interconnect the light shield films $20n$, $20n+1$, $20n+2$, ... and the gate bus lines $16n$, $16n+1$, $16n+2$, .... The upper half parts of the picture element electrodes 12 are enclosed by the gate bus lines $16n$, $16n+1$, $16n+2$, ..., the light shield films $20n$, $20n+1$, $20n+2$, ..., and the connection patterns $26n$, $26n+1$, $26n+2$, .... The lower half parts of the picture element electrodes 12 are located in the regions between the gate bus line $16n$, $16n+1$, $16n+2$ and the light shield films $20n$, $20n+1$, $20n+2$, ....

The picture element electrodes 12, the gate bus lines $16n$, $16n+1$, $16n+2$, ..., the light shield films $20n$, $20n+1$, $20n+2$, ..., and the connection patterns $26n$, $26n+1$, $26n+2$, ... overlap one another, whereby large sub-capacitances Cs are formed.

In the present embodiment, large transverse electric fields are sometimes generated near the light shield films $20n$, $20n+1$, $20n+2$, ... between the light shield films $20n$, $20n+1$, $20n+2$, ... and the picture element electrodes 12. For example, when −12.5 V is applied to the light shield films $20n$, $20n+1$, $20n+2$, ..., and ±−5 V is applied to the picture element electrodes 12, the liquid crystal orientation becomes unstable due to transverse electric fields. As a countermeasure to this, as shown in FIG. 5, an orientation of the liquid crystal 28 between the picture element electrodes 12 and a common electrode 29 is tilted toward the light shield films $20n$, $20n+1$, $20n+2$, .... This stabilizes the liquid crystal orientation.

Thus, according to the present embodiment, the upper half parts of the picture element electrodes are enclosed by the gate bus lines, whereby the black matrix does not cover these parts. Accordingly the black matrix on the opposed substrate covers only the parts where the thin film transistors are provided. This results in very small alignment margins.

The gate bus lines and the light shield films are spaced from each other by a certain distance, which makes it possible to fabricate the device with precision, and fabrication yields do not fall.

Furthermore, an orientation of the liquid crystal is tilted toward the light shield films, whereby the liquid crystal orientation can be stabilized.

A Third Embodiment

Figure 6:
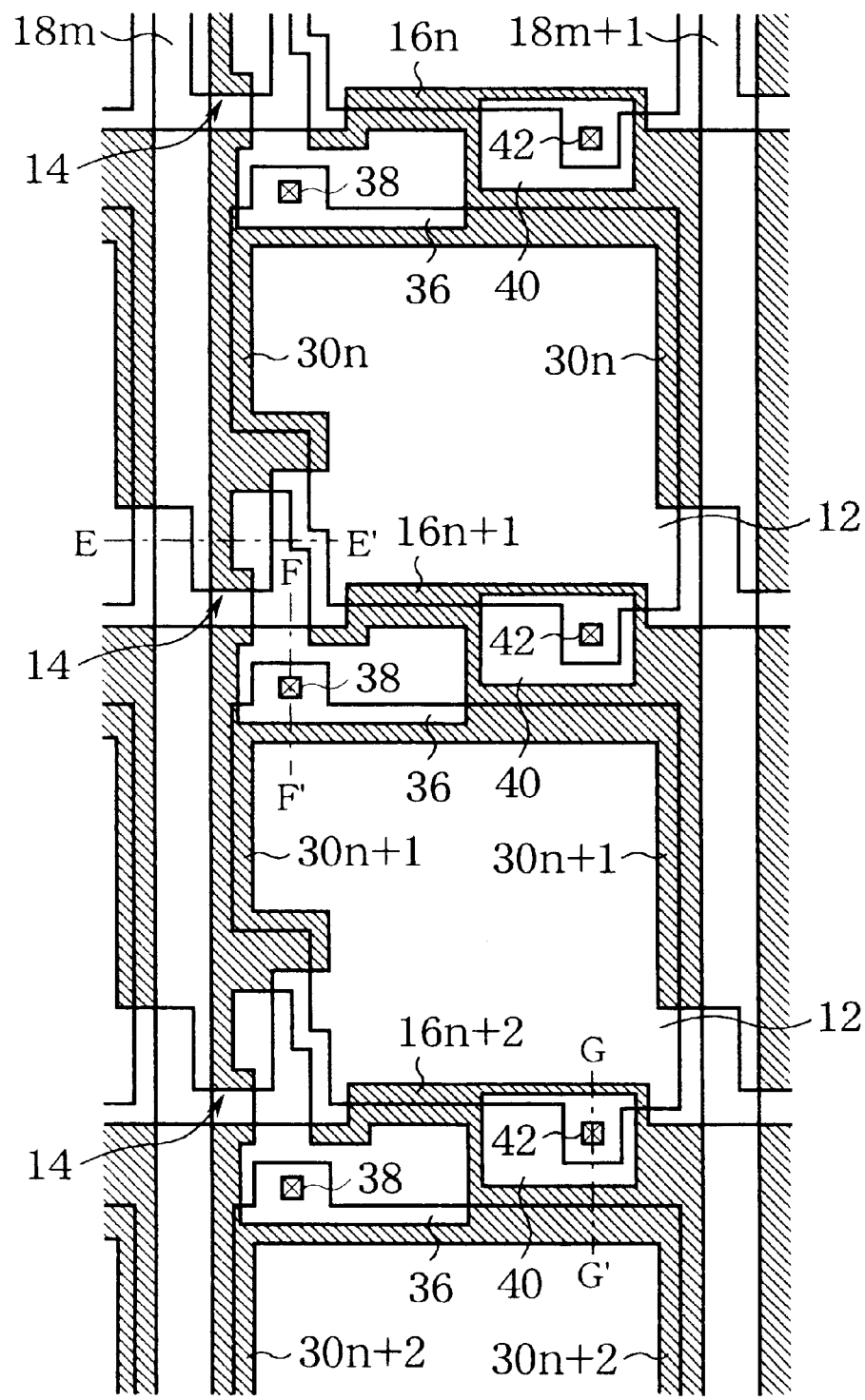
FIG. 6 is a view of a pattern layout of the thin film transistor matrix device according to a third embodiment of the present invention.
Figure 7A:
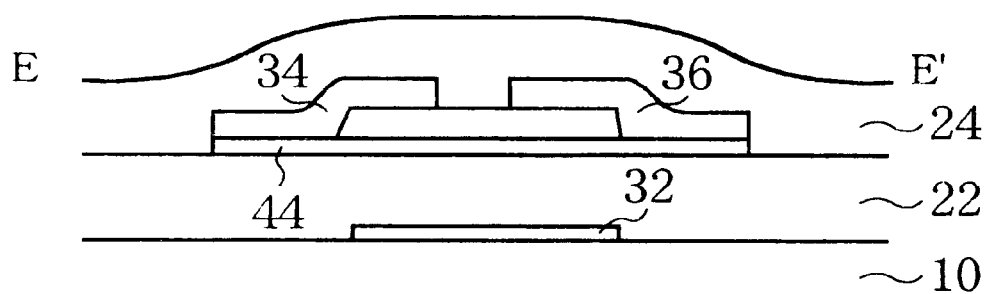
FIGS. 7A to 7C are sectional views of the thin film transistor matrix device according to the third embodiment of the present invention.
Figure 7B:
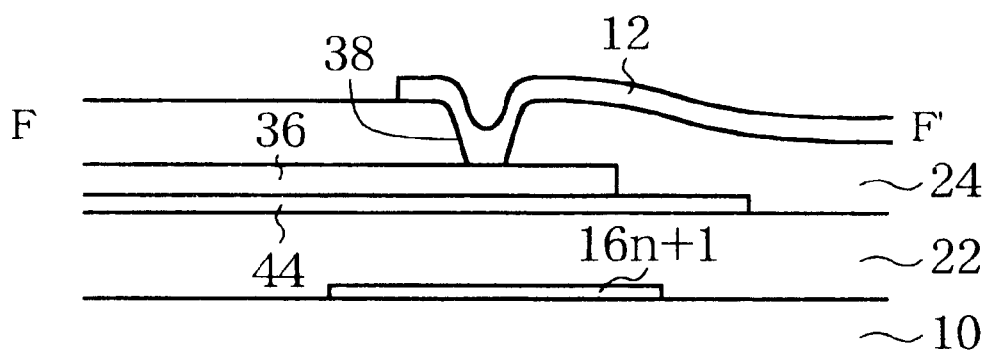
Figure 7C:
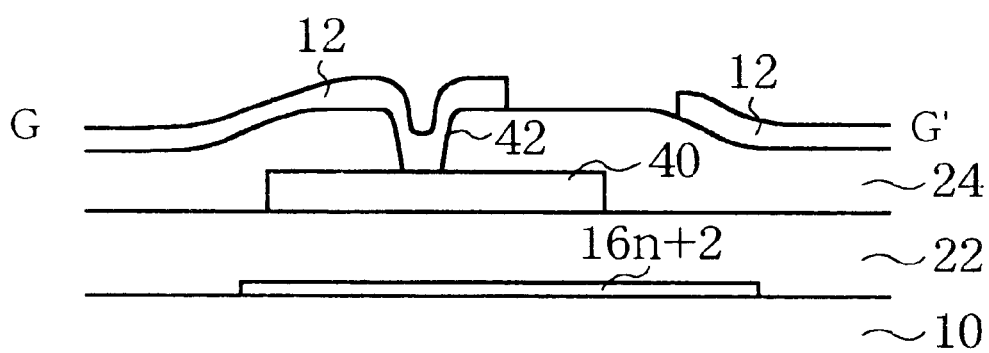
Figure 8:
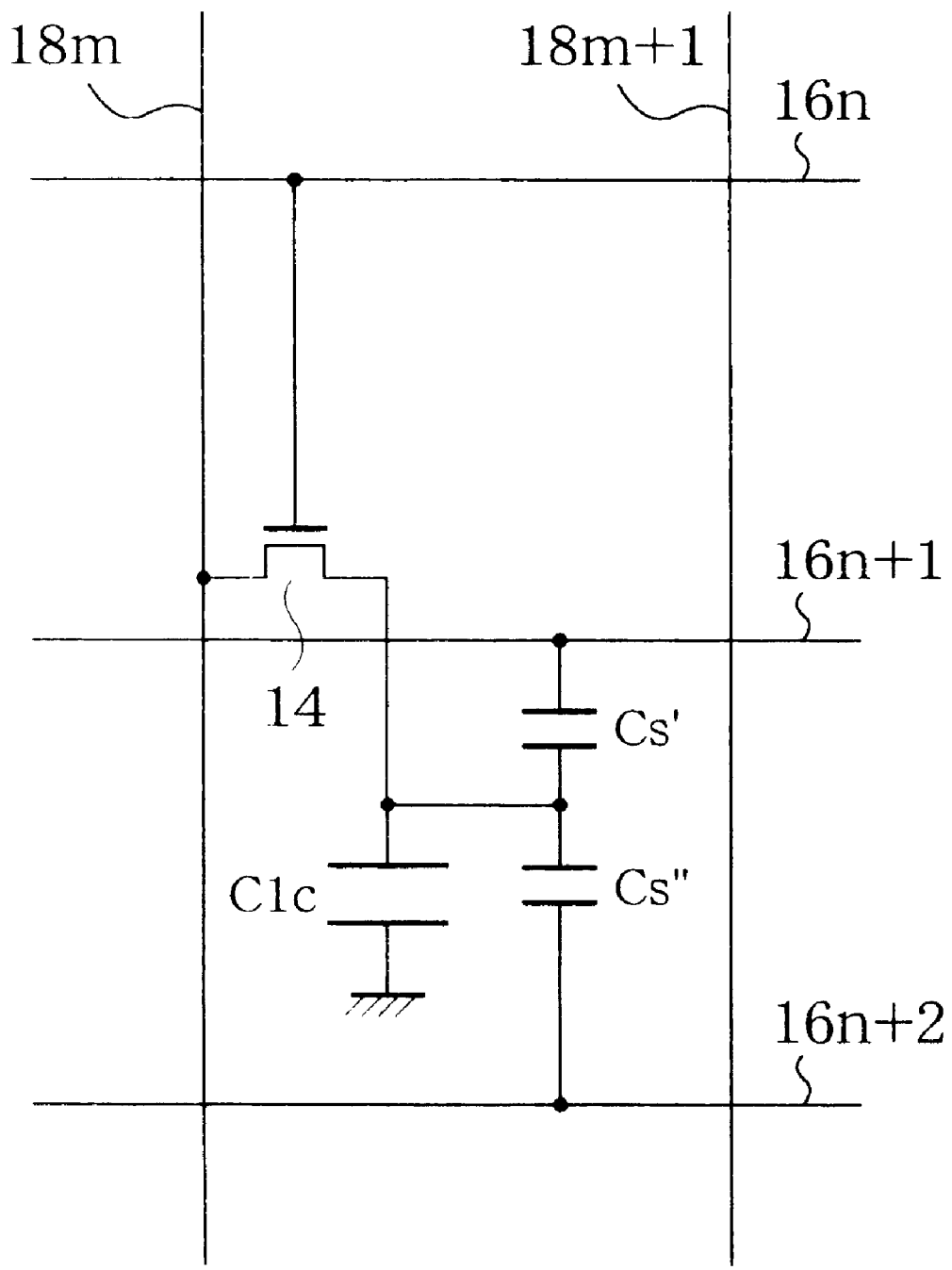
FIG. 8 is a view of an equivalent circuit of the thin film transistor matrix device according to the third embodiment of the present invention.

The thin film transistor matrix device according to a third embodiment will be explained with reference to FIGS. 6 to 8. FIG. 6 shows a pattern layout of the device. FIG. 7A shows the sectional view along the line E–E'. FIG. 7C shows the sectional view along the line G–G'. FIG. 8 shows an equivalent circuit of the device.

As shown in FIG. 6, a plurality of gate bus lines $16n$, $16n+1$, $16n+2$, ... which are parallel with each other, and a plurality of drain bus lines $18m$, $18m+1$, ... which are parallel with each other are provided respectively widthwise and lengthwise on a transparent insulating substrate 10.

The gate bus lines $16n$, $16n+1$, $16n+2$, ... include sub-patterns $30n$, $30n+1$, $30n+2$, ... extended downward along the drain bus lines $18m$, $18m+1$, ...

The thin film transistors 14 are provided near the lower ends of the sub-patterns $30n$, $30n+1$, $30n+2$, .... The gate electrodes 32 of the thin film transistors 14 are commonly connected to the gate bus lines $16n$, $16n+1$, $16n+2$, ... via the sub-patterns $30n$, $30n+1$, $30n+2$, .... The drain electrodes 34 of the thin film transistors 14 are commonly connected to the drain bus lines $18m$, $18m+1$, $18m+2$, .... The source electrodes 36 of the thin film transistors 14 are connected to the picture element electrodes 12 through contact holes 38.

In the present embodiment, the respective picture element electrodes 12 are formed at positions which are beyond each next row of gate bus lines $16n$, $16n+1$, $16n+2$, .... For example, the entire picture element electrode 12 connected to the gate bus line $16n$ via the thin film transistor 14 is located between the gate bus line $16n+1$ and the gate bus line $16n+2$. The thin film transistor 14 is disposed on the lower end of the sub-pattern $30n$, and the source electrode 36 is extended above the gate bus line $26n+1$ to be connected to the upper end of the picture element electrode 12.

Intermediate electrodes 40 which form sub-capacitances Cs are formed on the lower ends of picture element electrodes 12. The intermediate electrodes 40 are connected to the picture element electrodes 12 through contact holes 42.

A structure of the thin film transistor matrix device according to the present embodiment will be explained with reference to FIGS. 7A, 7B and 7C.

As shown in the sectional view along the line E–E' shown in FIG. 7A, in a thin film transistor 14, the gate electrode 32 is formed on the transparent insulating substrate 10, and the gate insulating film 22 is formed on the gate electrode 32. An amorphous silicon layer 44 which is to be the channel layer of the thin film transistor 14 is formed on the gate insulating film 22. The entire thin film transistor 14 is covered with a protection film 24.

As shown in the sectional view along the line F–F' shown in FIG. 7B, a gate bus line 16n+1 is formed on the transparent insulating substrate 10 below the thin film transistor 14, and the gate insulating film 22 is formed on the gate bus line 16n+1. The amorphous silicon layer 44 which is to be the channel layer of the thin film transistor 14 is formed on the gate insulating film 22. The source electrode 36 is formed on the amorphous silicon layer 44. The entire source electrode 36 is covered with the protection film 24. A picture element electrode 12 is formed on the protection film 24. The picture element electrode 12 is connected to the source electrode 36 through a contact a hole 38.

As shown in the sectional view along the line G–G' shown in FIG. 7C, a gate bus line 16n+1 is formed on the transparent insulating substrate 10 near the lower end of the picture element electrode 12. The gate insulating film 22 is formed on the gate bus line 16n+2. The intermediate layer 40 which is the same layer as the source electrode 36 is formed on the gate insulating film 22. The entire intermediate electrode 40 is covered with the protection film 24. A picture element electrode 12 is formed on the protection film 24. The picture element electrode 12 is connected to the intermediate electrode 40 through a contact hole 42 formed in the protection film 24.

FIG. 8 is a view of an equivalent circuit which is focussed on one picture element electrode 12.

A thin film transistor 14 is disposed at a position which is near a gate bus line 16n+1 from the intersection between a gate bus line 16n and a drain bus line 18m. The gate electrode of the thin film transistor 14 is connected to the gate bus line 16n, the drain electrode thereof is connected to the drain bus line 18m, and the source electrode thereof is extended downward to be connected to a picture element electrode 12. Thus liquid crystal capacitance Clc which is a capacitance of the liquid crystal is connected to the source electrode of the thin film transistor 14.

Because the source electrode 36 is formed large so as to cover the gate bus line 16n+1, a sub-capacitance Cs' is formed between the picture element electrode 12 and the gate bus line 16n+1. An area where the picture element electrode 12 and the gate bus line 16n+1 overlap each other is varied to adjust the sub-capacitance Cs'.

Because an intermediate electrode 40 connected to the picture element electrode 12 is formed so as to cover a gate bus line 16n+2, a sub-capacitance Cs" is formed between the picture element electrode 12 and the gate bus line 16n+1. An area where the intermediate electrode 40 and the gate bus line 16n+2 overlap each other is varied to adjust the sub-capacitance Cs".

As described above, according to the present embodiment, the gaps between the picture element electrodes are shielded by the gate bus lines for light leakage. It is not necessary for the black mask to shield light at the gaps. In addition to this, all the films provided for the light shielding form the sub-capacitances. The pattern has no useless parts, and very high aperture ratios and high fabrication yields can be realized.

A Fourth Embodiment

Figure 9:
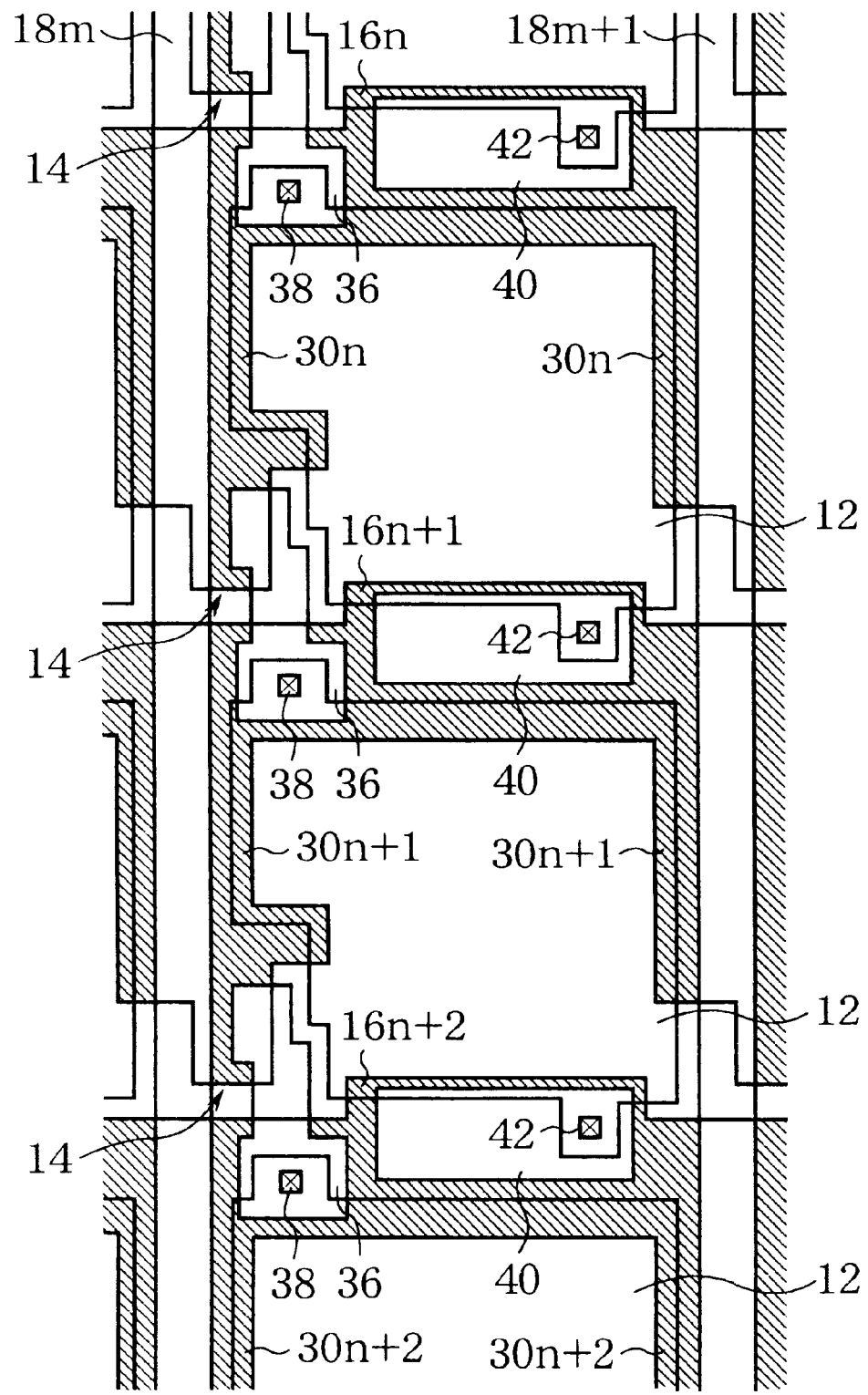
FIG. 9 is a view of a pattern layout of the thin film transistor matrix device according to a fourth embodiment of the present invention.
Figure 10:
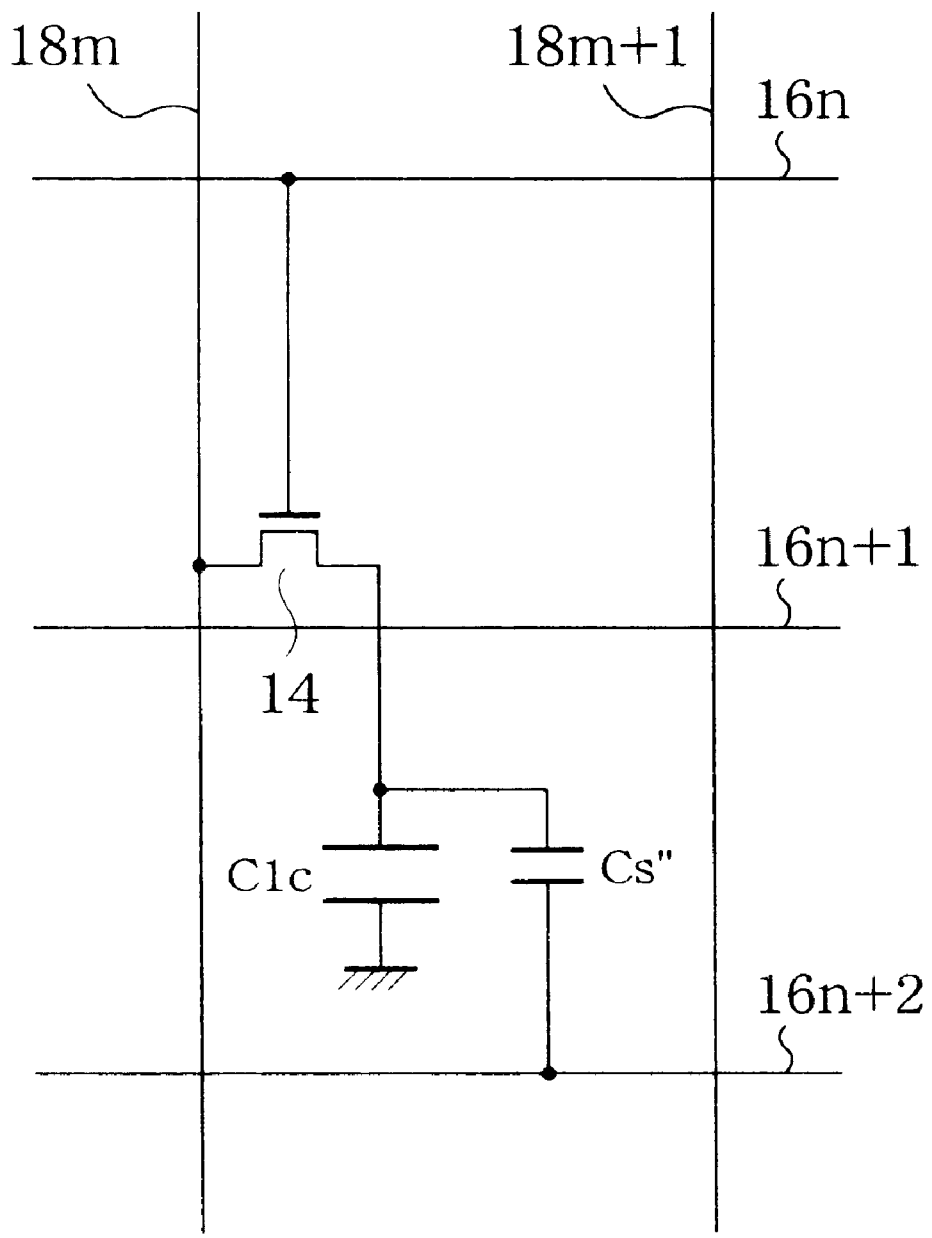
FIG. 10 is a view of an equivalent circuit of the thin film transistor matrix device according to the fourth embodiment of the present invention.

The thin film transistor matrix according to a fourth embodiment of the present invention will be explained with reference to FIGS. 9 and 10. FIG. 9 shows a pattern layout of the present embodiment. FIG. 10 shows an equivalent circuit of the present embodiment. Members of the present embodiment which are the same or of the same kind as those of the thin film transistor matrix device shown in FIGS. 6 to 8 are represented by the same reference numerals to simplify or not to repeat their explanation.

The basic constitution of the present embodiment is the same as that of the third embodiment but is different from the latter in sizes of the source electrodes 36 and the intermediate electrodes 40. As described above, an area where a source electrode 36 and a gate bus line 16n+1 overlap each other is varied to adjust a capacitance value of a sub-capacitances Cs. An area where an intermediate electrode 40 and a gate bus line 16n+2 overlap each other is varied to adjust a sub-capacitance Cs".

In the present embodiment, the size of the source electrodes 36 is minimized, and the area of the intermediate electrodes 40 is maximized, the sub-capacitances Cs' have an ignorable value with respect to a value of the sub-capacitances Cs" (sub-capacitance Cs">>sub-capacitance Cs'), and as shown in FIG. 10, no substantial sub-capacitances Cs' are formed.

In the normal data writing operation, data are written in the picture element electrodes of one row, and immediately thereafter data are written in the picture element electrodes of the next row. Accordingly, when the picture element electrodes 12 are capacity-coupled with the gate bus line 16n+1, the writing operation in the picture element electrodes of the next row is conducted before the thin film transistors 14 of the former line are completely turned off, which may make writing signals different. As a countermeasure to this, in the present embodiment, the picture element electrodes 12 are not capacity-coupled with the gate bus lines 16n+1 of the next row but capacity-coupled with the next but one gate bus line 16n+2.

Thus, according to the present embodiment, in writing data signals in one row, the writing operation is not affected by writing operations in other rows, whereby higher display quality can be obtained.

A Fifth Embodiment

Figure 11:
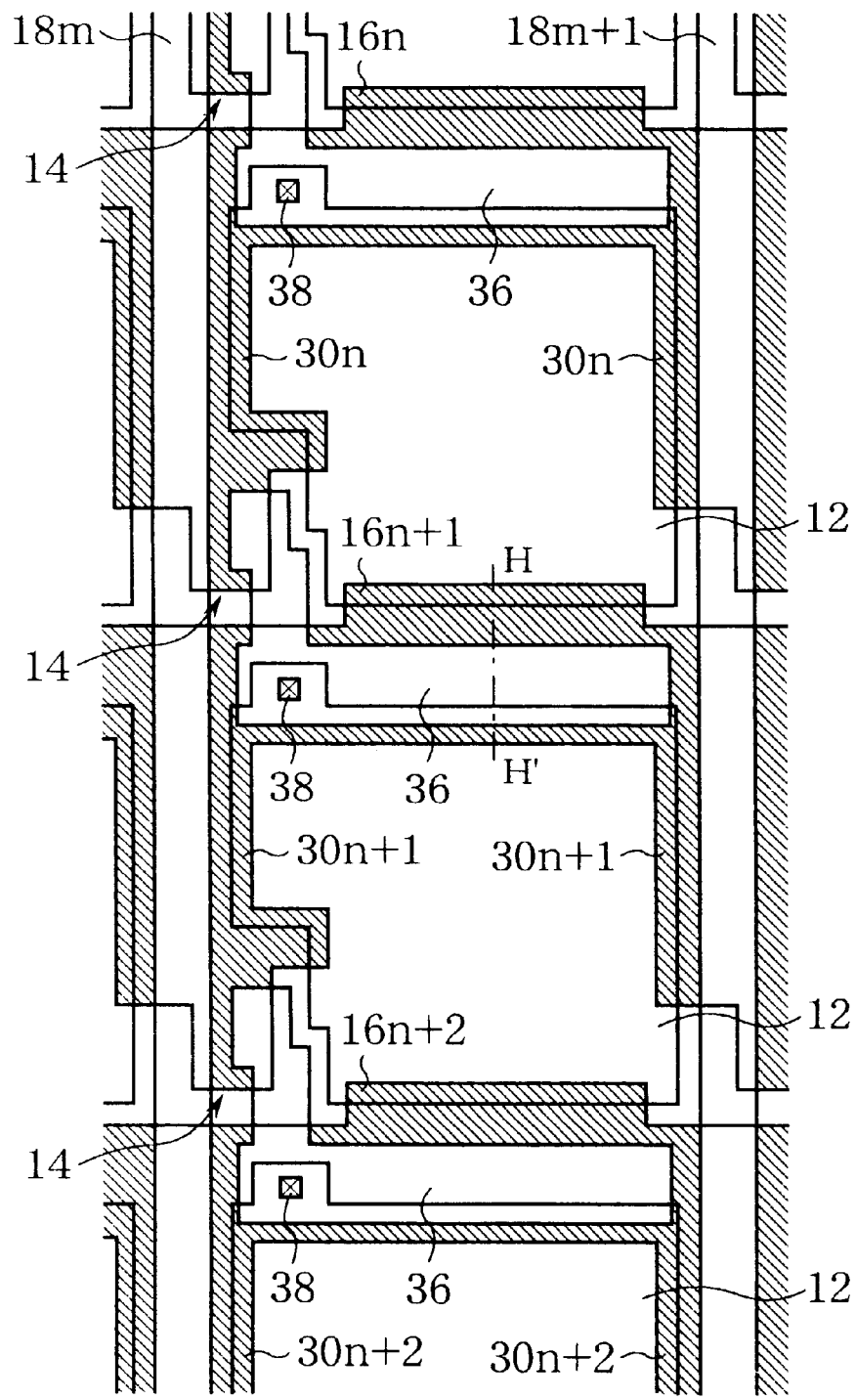
FIG. 11 is a view of a pattern layout of the thin film transistor matrix device according to a fifth embodiment of the present invention.
Figure 12A:
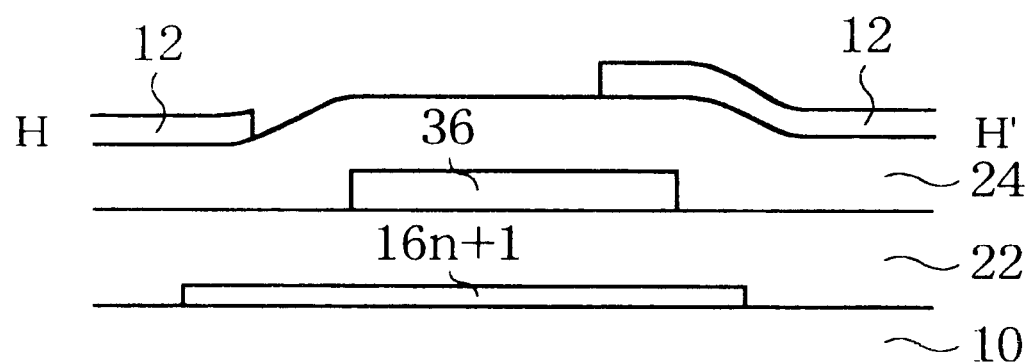
FIGS. 12A and 12B are sectional views of the thin film transistor matrix device according to the fifth embodiment of the present invention.
Figure 12B:
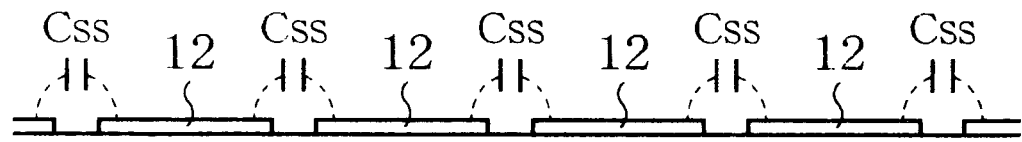
Figure 13:
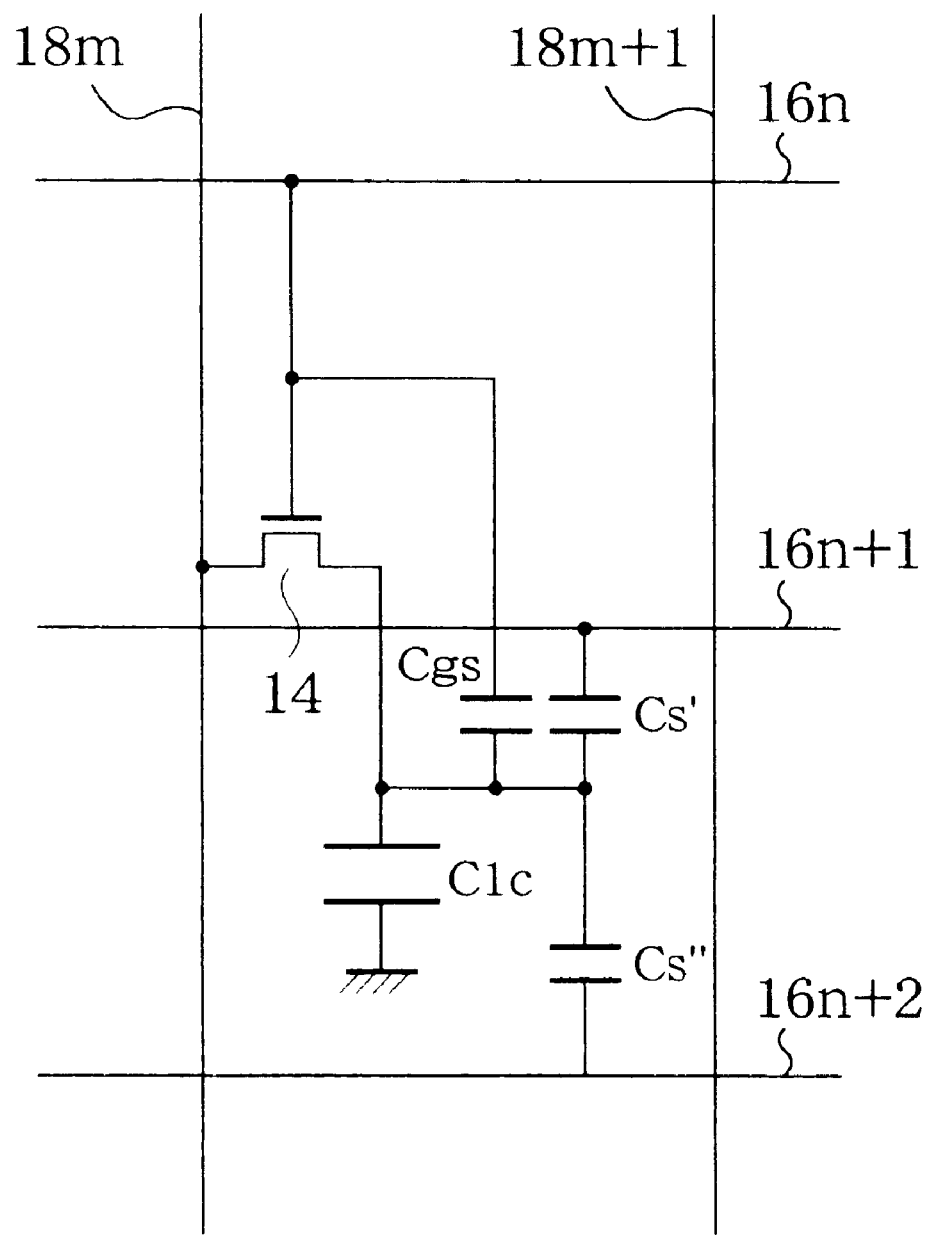
FIG. 13 is a view of an equivalent circuit of the thin film transistor matrix device according to the fifth embodiment of the present invention.
Figure 14:
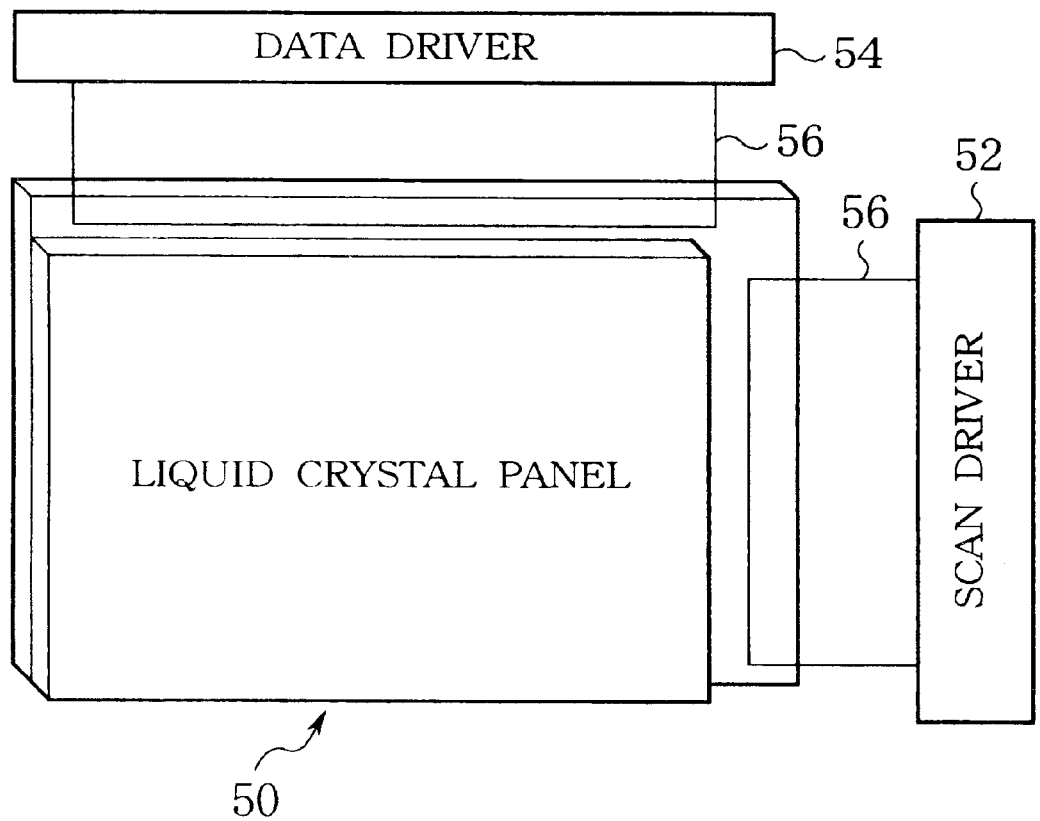
FIG. 14 is a view of a liquid crystal display unit according to the fifth embodiment of the present invention.
Figure 15:
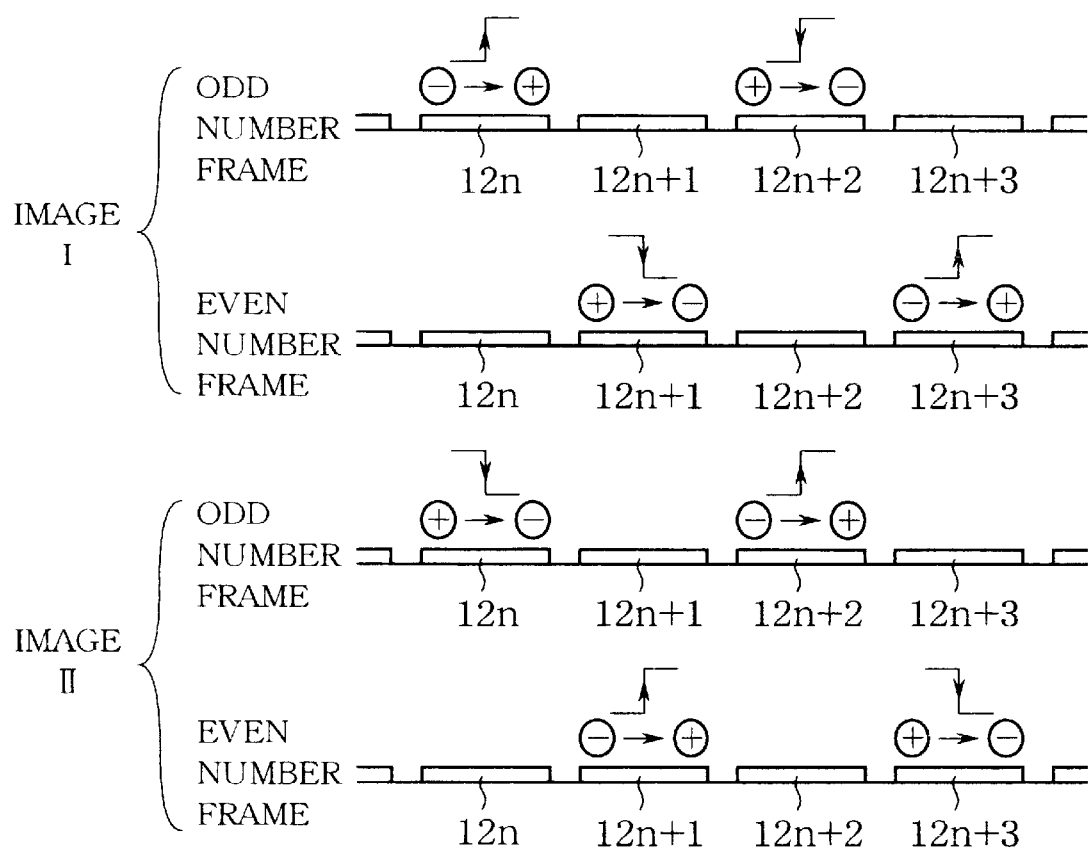
FIG. 15 is an explanatory view of a method for driving the thin film transistor matrix device according to the fifth embodiment of the present invention.

The thin film transistor matrix device according to a fifth embodiment of the present invention will be explained with reference to FIGS. 11 to 16. FIG. 11 shows a pattern layout of the fifth embodiment. FIG. 12A shows the sectional view along the line H–H'. FIG. 13 shows an equivalent circuit of the-fifth embodiment. FIG. 14 shows a liquid crystal display unit. FIGS. 15 and 16 are views which explain a drive method for the liquid crystal display unit. Members of the present embodiment which are the same or of the same kind as those of the thin film transistor matrix device of FIGS. 6 to 8 are represented by the same reference numerals to simplify or not to repeat their explanation.

The basic constitution of the present embodiment is substantially the same as that of the third embodiment, but as shown in, FIG. 11, the intermediate electrodes 40 are not provided. As described, above, an area where the source electrode 36 and gate bus line 16n+1 overlap each other is varied, whereby a capacitance value of the sub-capacitance Cs' can be adjusted.

In the present embodiment, no intermediate electrodes are provided to maximize an area of the source electrodes 36, whereby as shown in FIG. 13, a value of the sub-capacitances Cs" becomes ignorable with respect to that of the sub-capacitances Cs' (sub-capacitance Cs'>>sub-capacitance Cs") and no substantial sub-capacitances Cs" are formed.

Thus according to the present embodiment, because no intermediate electrodes are provided, the number of contact holes can be smaller. Defects due to defective connections can be avoided. Without the intermediate electrodes, there are no limitations and wastes in patterning the source electrodes, and higher aperture ratios can be obtained.

The description so far has focussed on parasitic capacitances between the picture element electrodes 12 and the gate bus lines 16, but not only parasitic capacitances between the picture element electrodes 12 and the gate bus lines 16 but also those between the picture element electrodes are also a problem.

A structure of the picture element electrodes 12 is shown in the sectional view along the line H–H' of FIG. 12A. In a region between picture element electrodes 12 a gate bus line 16n+1 is formed on a transparent insulating substrate 10, and a gate insulating film 22 is formed on the gate bus line 16n+1. A source electrode 36 is formed on the gate insulating film 22. The entire source electrode 36 is covered with a protection film 24. The two picture element electrodes 12 are formed adjacent to each other on the protection film 24. Because the adjacent picture element electrodes 12 are connected to each other through the source electrode 36, a gate insulating film 22 and the protection film 24, as shown in FIG. 12B parasitic capacitances Css between the picture element electrodes 12, which are adjacent to each other, become unignorable.

In a case that parasitic capacitance Css between the picture element electrodes 12 are large, when data are written in the picture element electrodes of one row, a potential of the picture element electrodes of an adjacent row is changed due to capacitive coupling upon writing data in the picture element electrodes of said adjacent row.

As a result, even in a case that there is an allowance for patterning, the picture element electrodes 12 are not permitted to be near each other by, e.g., less than 5 μm, which makes it impossible to raise the aperture ratio beyond a certain ratio.

The present embodiment provides an innovative method for driving the thin film transistor matrix device which does not change a potential of the picture element electrodes 12 even in a case that a parasitic capacitance between the picture element electrodes 12 is large.

FIG. 14 shows a liquid crystal unit using the thin film transistor matrix device according to the present embodiment.

A liquid crystal panel 50 comprises an opposed substrate (not shown) opposed to the thin film transistor matrix device according to the present embodiment, and liquid crystal (not shown) sandwiched between the thin film transistor matrix device and the opposed substrate. As a drive circuit for driving the liquid crystal 50 there are provided a scan driver 52 and a data driver 54. The scan driver 52 and the data driver 54 are connected to the liquid crystal panel by connection lines 56.

The scan driver 52 outputs writing pulses one after another to the gate bus lines 16 to scan the picture element electrodes 12 arranged in a matrix. The data driver 54 outputs data signals to be written to the drain bus lines 18 for a required display on the picture element electrodes 12.

A method for driving the thin film transistor matrix device according to the present embodiment will be explained with reference to FIGS. 15 and 16.

In the present embodiment, one display image is represented by an odd number frame constituted by the picture element electrodes of odd ordinal number rows, and an even number frame constituted by even ordinal number rows. The odd number frame inputs writing pulses in the odd ordinal number gate bus lines 16n, 16n+2, . . . to write signals in the picture element electrodes 12. The even number frame inputs writing pulses in the even ordinal number gate bus lines 16n+1, 16n+3 to write signals in the picture element electrodes. At this time, according to the present embodiment, the device is driven so that writing voltages for the picture element electrodes 12 located on both sides of one picture element electrode 12 respectively have a positive and a negative voltage which are opposite to each other. Accordingly when the picture element electrode 12 is pulled by a positive or negative voltage of the picture element electrode 12 on one side, the former picture element electrode 12 is compensatively pulled by the picture element electrode 12 on the other side. The effect by a parasitic capacitance between the picture element electrodes 12 can be minimized.

FIG. 15 is an explanatory view of the method for driving the device according to the present embodiment and shows driven states of the picture element electrode 12n of the n-th row, the picture element electrode 12n+1 of the n+1-th row, the picture element electrodes 12n+2 of the n+2-th row, and the picture element electrode 12n+3 of the n+3-th row.

In the odd-number frame of a first image I, the picture element electrode 12 is driven from a negative potential to a positive potential, and the picture element electrode 12n+2 is driven from a positive potential to a negative potential. Then, in the even number frame of the first image I, the picture element electrode 12n+1 is driven from a negative potential to a positive potential while the picture element electrode 12n+3 is driven from a positive potential to a negative potential. In a second image II, the positive and the negative drive directions of the first image are opposite.

The same operation is repeated.

FIG. 16 shows waveforms of the gate bus lines 16 and the drain bus line 18 for the driving method shown in FIG. 15.

In the odd number frame of the first image I, the drain bus line 18m has a positive potential to apply a writing pulse to a gate bus line 16n, and the picture element electrode 12n is driven from a negative potential to a positive potential. Immediately hereafter the drain bus line 18m has a negative potential, and a writing pulse is applied to the gate bus line 16n+2. Thus the picture element electrode 12n+2 is driven from a positive potential to a negative potential.

Subsequently in the even number frame of the first image I, the drain bus line 18m has a negative potential to apply a writing pulse to a gate bus line 16n+1, and the picture element electrode 12n+1 is driven from a positive potential to a negative potential. Immediately hereafter the drain bus line 18m has a positive potential, and a writing pulse is applied to the gate bus line 16n+3. Thus the picture element electrode 12n+3 is driven from a negative potential to a positive potential.

In the odd number frame of the second image II, the drain bus line 18m has a negative potential to apply a writing pulse to a gate bus line 16n, and the picture element electrode 12n is driven from a positive potential to a negative potential. Immediately hereafter the drain bus line 18m has a positive potential, and a writing pulse is applied to the gate bus line 16n+2. Thus the picture element electrode 12n+2 is driven from a negative potential to a positive potential.

Subsequently in the even number frame of the second image I, the drain bus line 18m has a positive potential to apply a writing pulse to a gate bus line 16n+1, and the picture element electrode 12n+1 is driven from a negative potential to a positive potential. Immediately hereafter the drain bus line 18m has a negative potential, and a writing pulse is applied to the gate bus line 16n+3. Thus the picture element electrode 12n+3 is driven from a positive potential to a negative potential.

The same operation is repeated.

As described above, according to the driving method of the present embodiment, picture element electrodes on both sides of each picture element electrode are driven so that the picture elements on both sides have a positive and a negative writing voltages which are opposite to each other. When the picture element electrode is pulled by a positive or negative voltage of the picture element electrodes on one side, the former is compensatively pulled by the picture element electrode on the other side. The effect by a parasitic capacitance between the picture element electrodes can be minimized.

The thin film transistor matrix device having the picture element electrodes spaced from each other by 3 μm was driven by the following driving method to measure voltage deflections between the picture element electrodes. The thin film transistor matrix device whose liquid crystal was turned on black at 5 V with all the picture element electrodes on. Voltages of +5 and −5 were alternately applied to the picture element electrodes, and a voltage change was 10 V. The thin film transistor matrix device was driven by this driving method, and a voltage change was 0.3 V between the picture element electrodes.

The same thin film transistor matrix device was driven by the driving method according to the present embodiment, and a voltage change between the picture element electrodes was much improved and was below 0.1 V.

The thin film transistor matrix device having the picture element electrodes less spaced by 2 μm was driven by the driving method according to the present embodiment, and a voltage change between the picture element electrodes was as low as about 0.2 V.

A Sixth Embodiment

Figure 17:
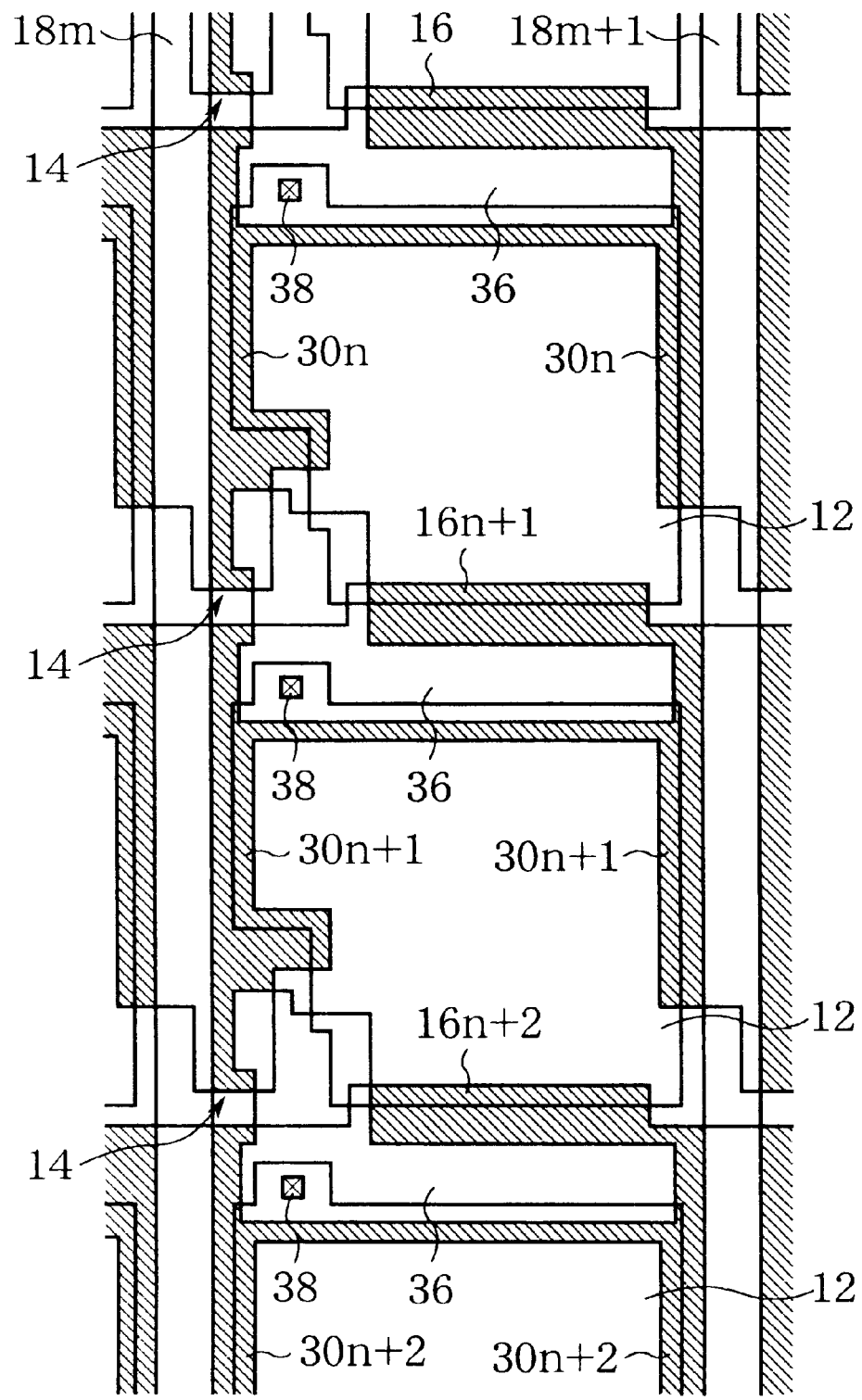
FIG. 17 is a view of a pattern layout of the thin film transistor matrix device according to a sixth embodiment of the present invention.

The thin film transistor matrix according to a sixth embodiment of the present invention will be explained with reference to FIG. 17. FIG. 17 shows a pattern layout. The same members or members of the same kinds of the thin film transistor matrix device of FIG. 11 are represented by the same reference numerals to simplify or not to repeat their explanation.

The basic constitution of the present embodiment is substantially the same as that of the fifth embodiment. As shown in FIG. 17, source electrodes 36 are larger sized to shield light at the gap between the source electrodes 36 and the picture element electrodes of the previous rows. A part of the black matrix on the opposed substrate is unnecessary, which results in a higher aperture ratio.

A larger capacitance is present between the source electrodes and the picture element electrodes of the previous rows, but a voltage applied to the picture element electrodes 12 is not changed only by ±5 V at maximum. A change width (26 V) of a gate voltage V6 is considerably small. The increased capacitance little affects display quality, and can be less affective by the use of the above-described driving method.

As described above, according to the present embodiment, the source electrodes are enlarged to shield light at the gaps, whereby higher aperture ratios can be obtained, and light can be used more efficiently. As a result, a bright display can be realized, and electric power consumption can be decreased. Even when larger parasitic capacitances take place due to the enlarged source electrodes, display quality is little affected without degrading display quality.

A Seventh Embodiment

Figure 18:
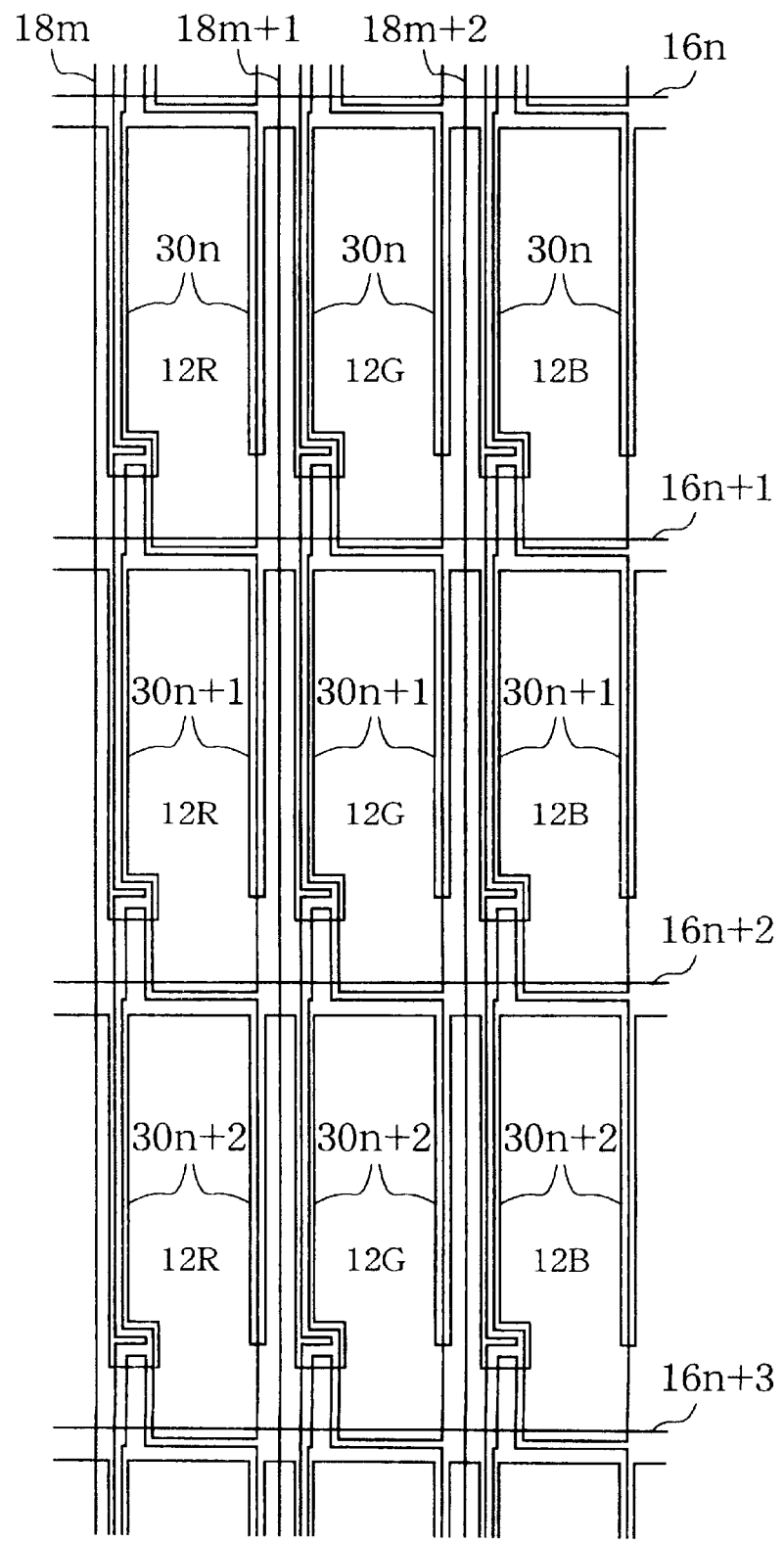
FIG. 18 is a view of a pattern layout of the thin film transistor matrix device according to a seventh embodiment of the present invention.

The thin film transistor according to a seventh embodiment of the present invention will be explained with reference to FIG. 18. FIG. 18 shows a pattern layout.

The thin film transistor matrix device according to the present embodiment is a thin film transistor matrix device to be used in liquid crystal color display unit. Three picture element electrodes for RGB are provided for one picture element. The same members of the present embodiment as those of the thin film transistor matrix device of FIGS. 6 to 8 are represented by the same reference numerals to simplify or not to repeat their explanation.

On a transparent insulating substrate 10 there are provided a plurality of gate bus lines 16n, 16n+1, 16n+2, . . . which are extended parallel with each other widthwise as viewed in FIG. 18, and a plurality of drain bus lines 18m, 18m+1, 18m+2, . . . which are parallel with each other lengthwise as viewed in FIG. 18. On the gate bus lines 16n, 16n+1, 16n+2, . . . there are formed sub-patterns 30n, 30n+1, 30n+2, . . . which are extended downward along the drain bus lines 18m, 18m+1, 18m+2, . . .

Thin film transistors 14 are disposed near the lower ends of the sub-patterns 30n, 30n+1, 30n+2, . . . The gate electrodes 22 of the thin film transistors 14 are commonly connected to the gate bus lines 16n, 16n+1, 16n+2, . . . through the sub-patterns 30n, 30n+1, 30n+2, . . . The source electrodes of the thin film transistors are connected to the picture element electrodes 12.

In the present embodiment three picture element electrodes 12R, 12G, 12B are disposed for one picture element. The picture element electrodes 12R, 12G, 12B are formed at positions which are beyond the gate bus line 16n, 16n+1, 16n+2, . . . of the next row. For example, all picture element electrodes 12R, 12G, 12B connected to the gate bus line 16n through the thin film transistor 14 are located between the gate bus lines 16n+1; 16n+2.

As described above, according to the present embodiment, the gaps between the picture element electrodes are shielded against light leakage. Accordingly no black matrix for shielding light at the gaps is necessary. All the film provided for the purpose of the light shielding is used to form a sub-capacitance. Accordingly a liquid crystal color panel having no useless pattern, very high aperture ratios and high fabrication yields can be provided.

An Eighth Embodiment

Figure 19:
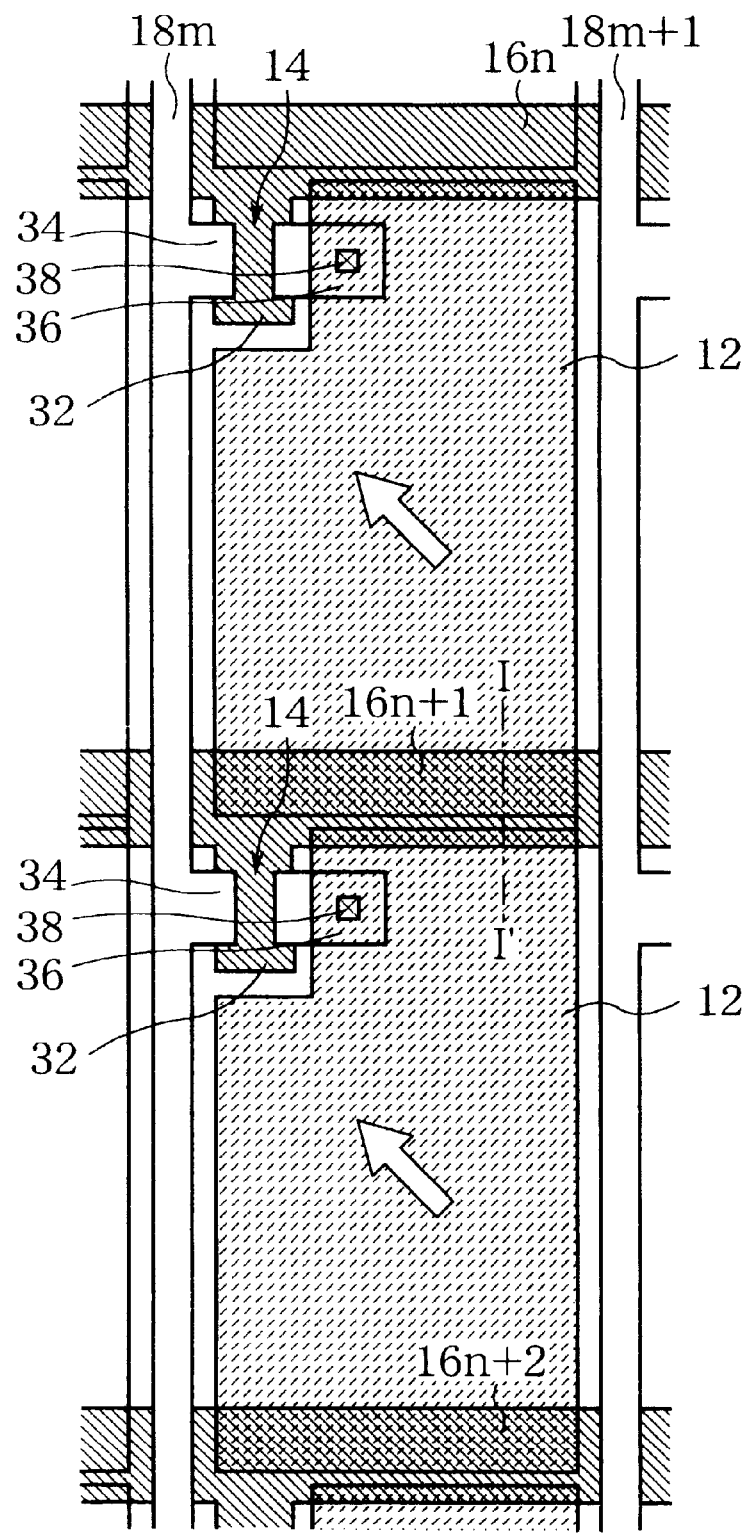
FIG. 19 is a view of a pattern layout of the thin film transistor matrix device according to an eighth embodiment of the present invention.
Figure 20:
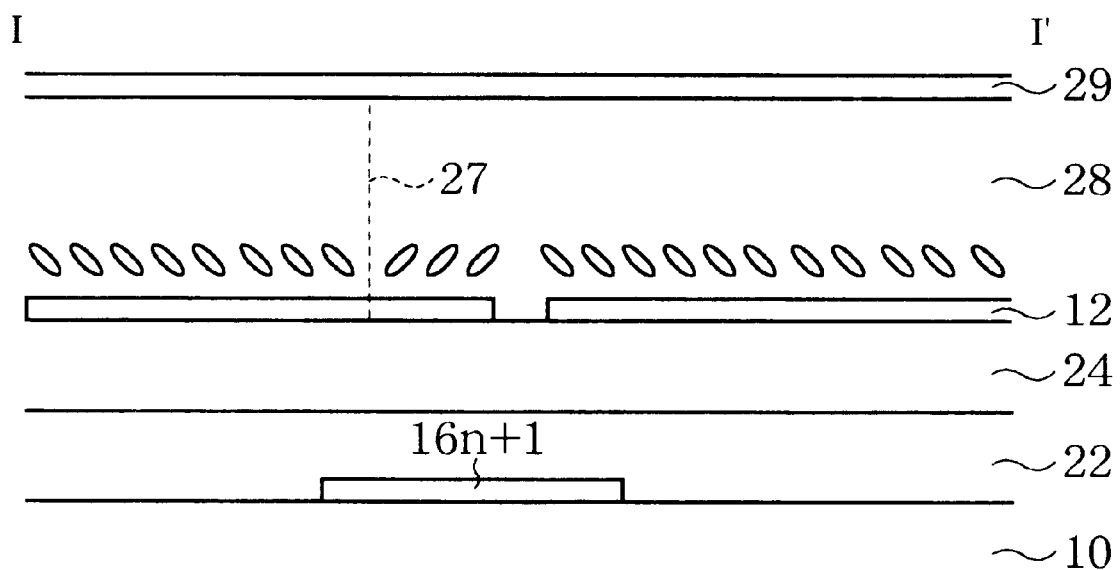
FIG. 20 is a sectional view of the thin film transistor matrix device according to the eighth embodiment of the present invention.

The thin film transistor device according to an eighth embodiment of the present invention will be explained with reference to FIGS. 19 and 20. FIG. 19 shows a pattern layout. FIG. 20 shows the sectional view along the line I–I'.

A pattern layout of the thin film transistor matrix device will be explained with reference to FIG. 19. Picture element electrodes 12 are arranged in a matrix on a transparent insulating substrate 10. A thin film matrix transistor 14 is disposed on each picture element electrode 12. Gate bus lines 16n, 16n+1, 16n+2, . . . which commonly connect the gate electrodes 32 of the thin film transistors are provided widthwise as viewed in FIG. 19. Drain bus lines 18m, 18m+1, 18m+3, . . . which commonly connect the drain electrodes 34 of the thin film transistors are provided lengthwise as viewed in FIG. 19. The source electrodes 36 of the thin film transistors 14 are connected to the picture element electrodes 12 through contact holes 38.

Figure 48:
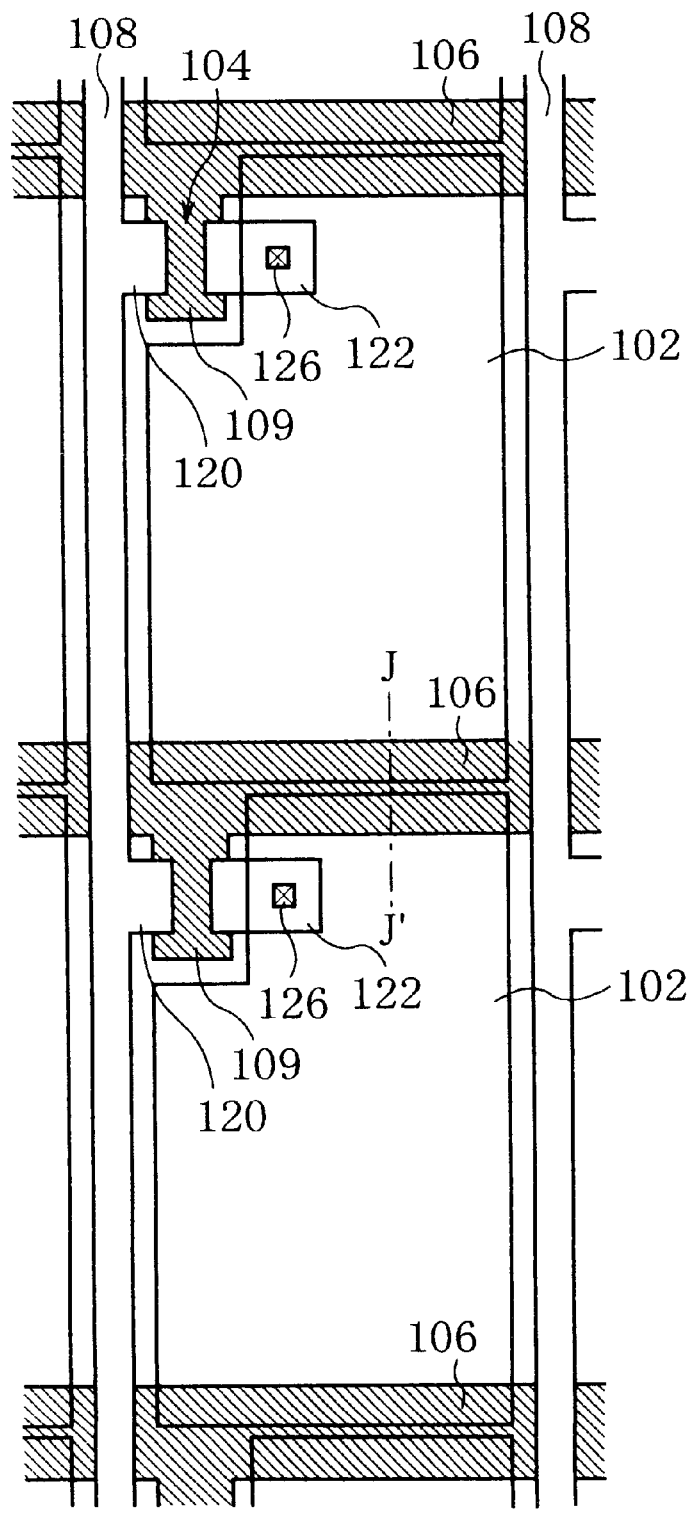
FIG. 48 is a view of a conventional thin film transistor matrix device.
Figure 49:
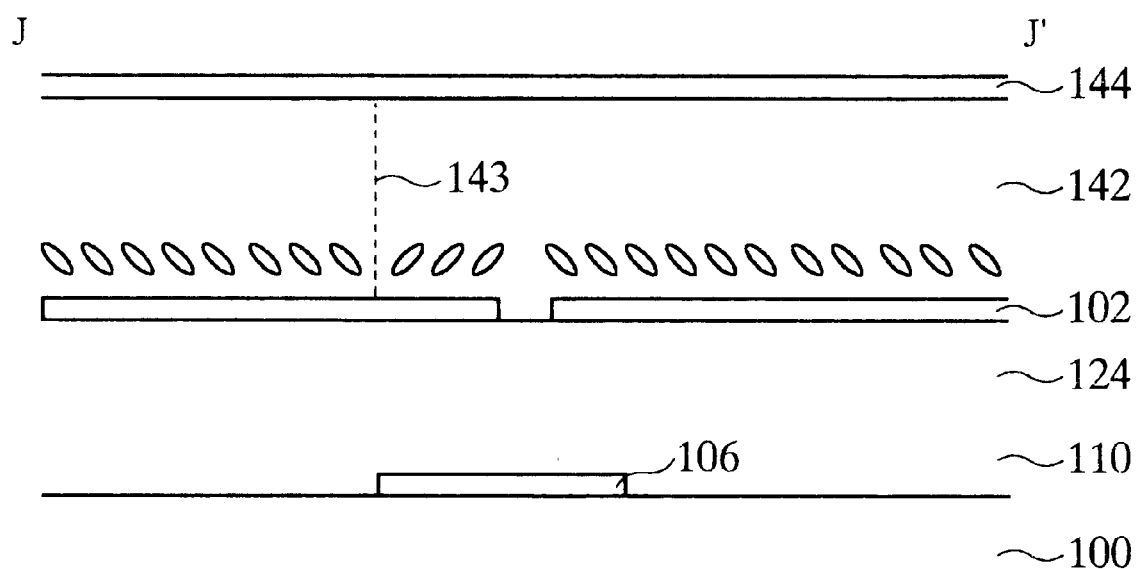
FIG. 49 is a sectional view of the thin film transistor matrix device shown in FIG. 48.

Also in the thin film transistor matrix device according to the present embodiment, the gate bus lines 16n, 16n+1, 16n+2, . . . shield light at the gaps between the picture element electrodes 12, but the device is different from the conventional thin film transistor matrix device shown in FIG. 48 in that the gate bus lines 16n, 16n+1, 16n+2, . . . are overlapped over the picture element electrodes on both sides thereof by different areas. That is, in a case that a liquid crystal 18 is oriented from lower right to upper left as indicated by the thick arrows in FIG. 19, the gate bus lines 16n, 16n+1, 16n+2, . . . are more overlapped over the upper picture element electrode 12 and less overlapped over the lower picture element electrode 12.

Thus, as described in FIG. 20, the liquid crystal 28 is oriented by a horizontal electric field corresponding to a potential difference between the gate electrode 12 and the gate bus line 16. Even when an inversion boundary 27 where the a direction of the orientation of the liquid crystal occurs in the liquid crystal 28 near the end of the picture element electrode 12, light is shielded by the gate bus line 16n, 16n+1, 16n+2, . . . , and light leakage at the inversion boundary 27 due to the deformation is prevented.

That is, in the present embodiment as well, the inversion boundary 27 due to the orientation deformation of the liquid crystal 28 by the horizonal electric field corresponding to a potential difference between the picture element electrode 12 and the gate bus line 16 is generated, but the place of the occurrence is spaced by a certain distance from the edge of the picture element electrode 12. Accordingly the gate bus lines 16n, 16n+1, 16n+2, . . . are overlapped by a large area over the picture element electrodes 12 for the light shielding.

An occurrence position of orientation deformation caused by the horizontal electric field is related with an orientation of the liquid crystal 28. As shown in FIG. 20, the horizontal electric field corresponding to a potential difference between the picture element electrode 12 and the gate bus line 16 tilts the liquid crystal 28 toward the gate bus line 16. At the picture element electrode on the right in FIG. 20, the orientation of the liquid crystal 28 caused by the horizontal electric field agrees with the orientation of the liquid crystal 28, and no deformation occurs. At the picture element electrode 12 on the left in FIG. 20, the orientation of the liquid crystal 28 caused by the horizontal electric field is opposite to the orientation of the liquid crystal 28, and an inversion boundary 27 occurs at a position spaced by a certain distance from the edge of the picture element electrode 12.

In the thin film matrix device having, for example, a 65×65 $\mu$m picture element pitch and 640×480 picture elements, the inversion boundary 27 due to the deformation occurs at a position spaced from the edge of the picture element electrode 12 by 4–5 $\mu$m, and accordingly the gate bus line 16 is overlapped over the upper picture element electrode 12 by about 7 $\mu$m more and over the lower picture element electrode 12 by about 2 $\mu$m less.

In the present embodiment, the orientation of the liquid crystal 28 is tilted with respect to the picture element electrodes 12 by about 45°, but the angle may be any angle. The liquid crystal 28 may be oriented upward or downward. When the liquid crystal 28 has a component which is normal to the gate bus lines 16, the gate bus lines are overlapped over the picture element electrodes by different areas corresponding to an orientation of the component.

As described above, according to the present embodiment, the reversing boundary caused by deformation in the liquid crystal is shielded by offsetting the gate bus lines, whereby the thin film transistor matrix is free from light leakage and can have good display quality.

A Ninth Embodiment

Figure 21:
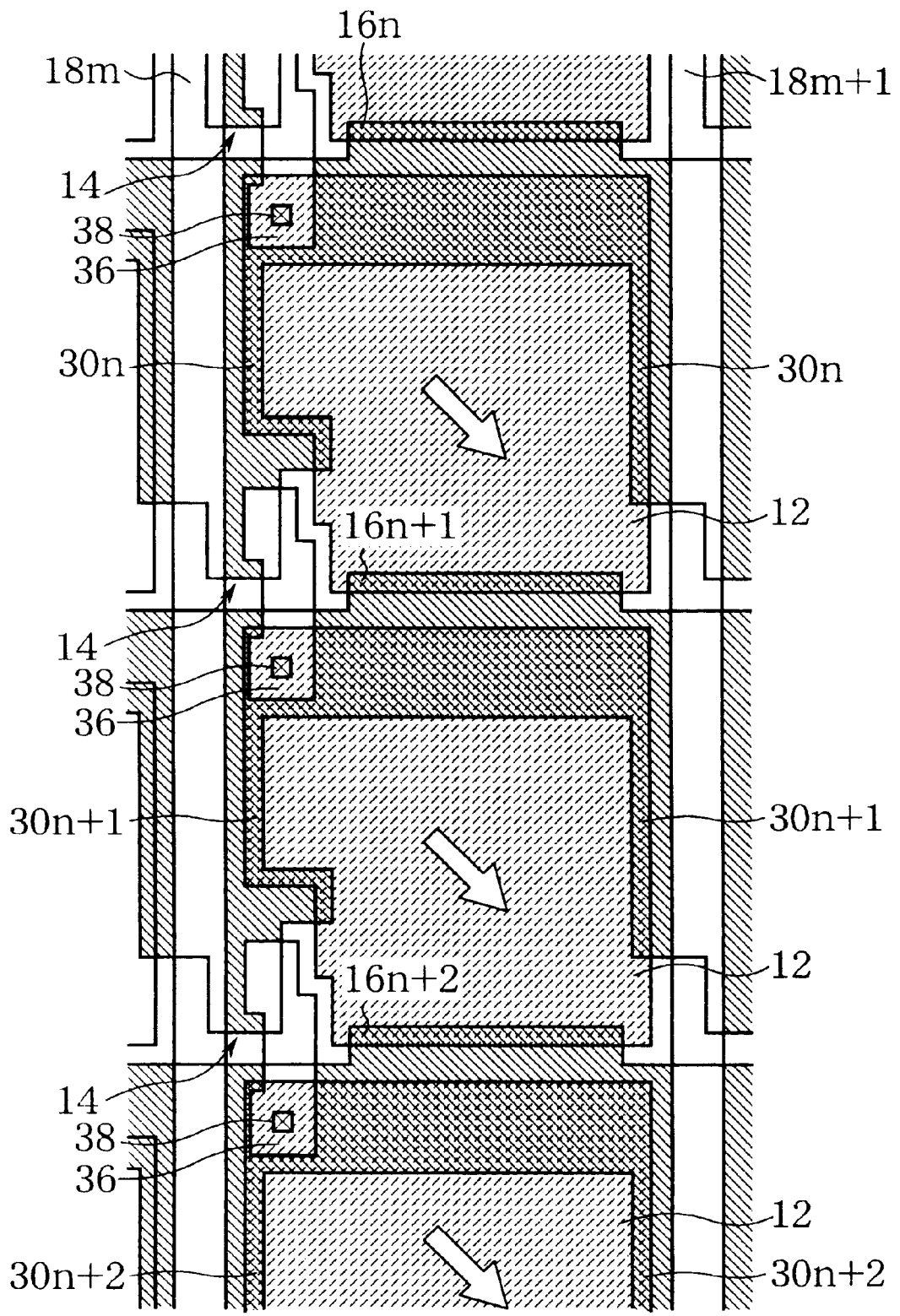
FIG. 21 is a view of a pattern layout of the thin film transistor matrix device according to a ninth embodiment of the present invention.

The thin film transistor matrix device according to a ninth embodiment of the present invention will be explained with reference to FIG. 21. FIG. 21 shows a pattern layout. The same members or members of the same kinds of the present embodiment as those of the thin film transistor matrix device of FIG. 6 are represented by the same reference numerals to simplify or not to repeat their explanation.

On a transparent insulating substrate there are provided a plurality of gate bus lines 16n, 16n+1, 16n+2, . . . which are parallel with each other and are extended downward along the drain bus lines 18m, 18m+1, . . .

Thin film transistors 14 are disposed near the lower ends of the sub-patterns 30m, 30n+1, 30n+2, . . . The gate electrodes 32 of the thin film transistors are commonly connected by the gate bus lines 16n, 16n+1, 16n+2, . . . through the sub-patterns 30n, 30n+1, 30n+2, . . . The source electrodes 36 of the thin film transistors 14 are connected to picture element electrodes 12 through contact holes 38.

In the present embodiment, the picture element electrodes 12 are formed at positions beyond the gate bus lines 16n, 16n+1, 16n+2, . . . of their next rows. For example, the entire picture element electrode 12 connected to the gate bus line 16n through the thin film transistor 14 is located between the gate bus line 16n+1 and the gate bus line 16n+2. The thin film transistor 14 is disposed on the lower end of the sub-pattern 30n of the gate bus line 16n. The source electrode 36 is extended over the gate bus line 16n+1 to be connected to the upper end of the picture element electrode 12.

In the thin film transistor matrix device according to the present embodiment, as in the eighth embodiment, the gate bus line 16n, 16n+1, 16n+2, . . . are used to shield light at the gaps between the picture element electrodes 12.

In the present embodiment, a liquid crystal 28 is oriented from upper left to lower right in the picture element electrodes 12 as indicated by the thick arrows, so that the gate bus lines 16n, 16n+1, 16n+2, . . . are overlapped larger over the lower picture element electrodes 12 and smaller over the upper electrodes 12.

This is because inversion boundaries 27 caused by deformation of an orientation of the liquid crystal due to a horizontal electric field are generated at positions spaced by a certain distance from the upper ends of the picture element electrodes below the gate lines 16n, 16n+1, 16n+2, The inversion boundaries 27 of the liquid crystal are shielded by the gate bus lines 16n, 16n+1, 16n+2, . . .

As described above, according to the present embodiment, the inversion boundaries caused by deformation of the liquid crystal are shielded by the gate bus lines, whereby the thin film transistor device is free from light leakage and has good display quality.

A Tenth Embodiment

Figure 22:
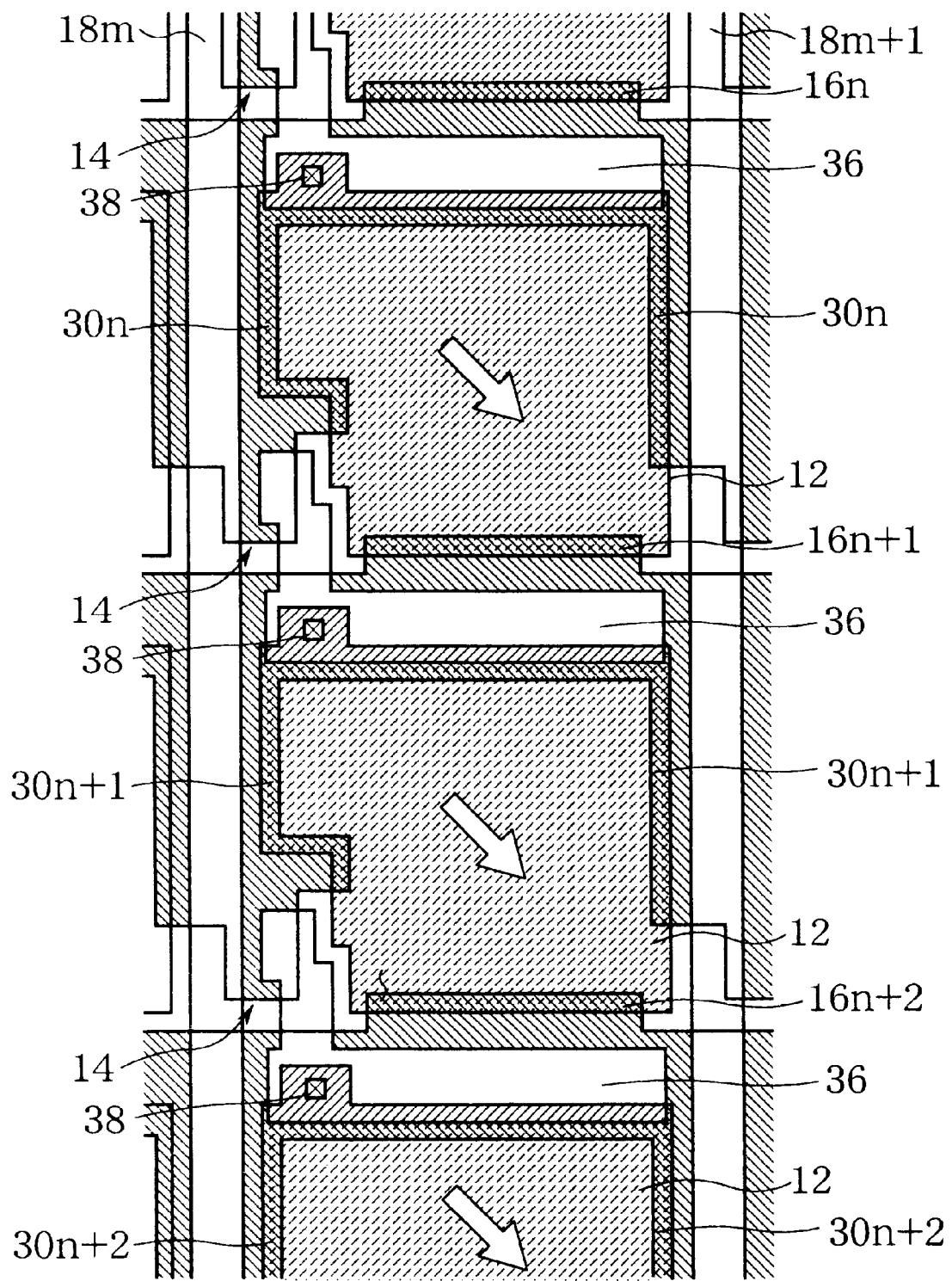
FIG. 22 is a view of a pattern layout of the thin film transistor matrix device according to a tenth embodiment of the present invention.

The thin film transistor matrix device according to a tenth embodiment will be explained with reference to FIG. 22. FIG. 21 shows a pattern layout. The same members or members of the same kinds of the present embodiment as those of the thin film transistor matrix of FIG. 21 are represented by the same reference numerals to simplify or not to repeat their explanation.

In the thin film transistor matrix devices according to the above-described embodiments, the source electrodes 36 have a minimum size which allows the source electrodes 36 to be connected to the picture element electrodes 12, but in the present embodiment the source electrodes are extended widthwise in substantially the same size as picture element electrodes 12. As indicated by the thick arrows in FIG. 22, a liquid crystal 28 is oriented from upper left to lower right in the picture element electrodes.

In the thin film transistor matrix device according to the present embodiment, the source electrodes 36 are sandwiched between the picture element electrodes 12. The gate bus lines 16n, 16n+1, 16n+2, . . . shield light at the gaps between the picture element electrodes 12 and the source electrodes 36. Because the source electrodes 36 have substantially the same potential as the picture element electrodes 12, inversion boundaries 27 of the liquid crystal 28 are generated at positions spaced by a certain distance, e.g., 4–5 $\mu$m from the upper ends of the source electrodes 36. Accordingly the gate bus lines 16 are more overlapped over their next below source electrodes 36 and the picture element electrodes 12 by about 7 $\mu$m more, and over their next upper picture element electrodes by about 2 $\mu$m more.

As described above, according to the present embodiment inversion boundaries caused by deformation of the liquid crystal are shielded by the gate bus lines, whereby the thin film transistor matrix device is free from light leakage and can have good display quality.

An Eleventh Embodiment

Figure 23A:
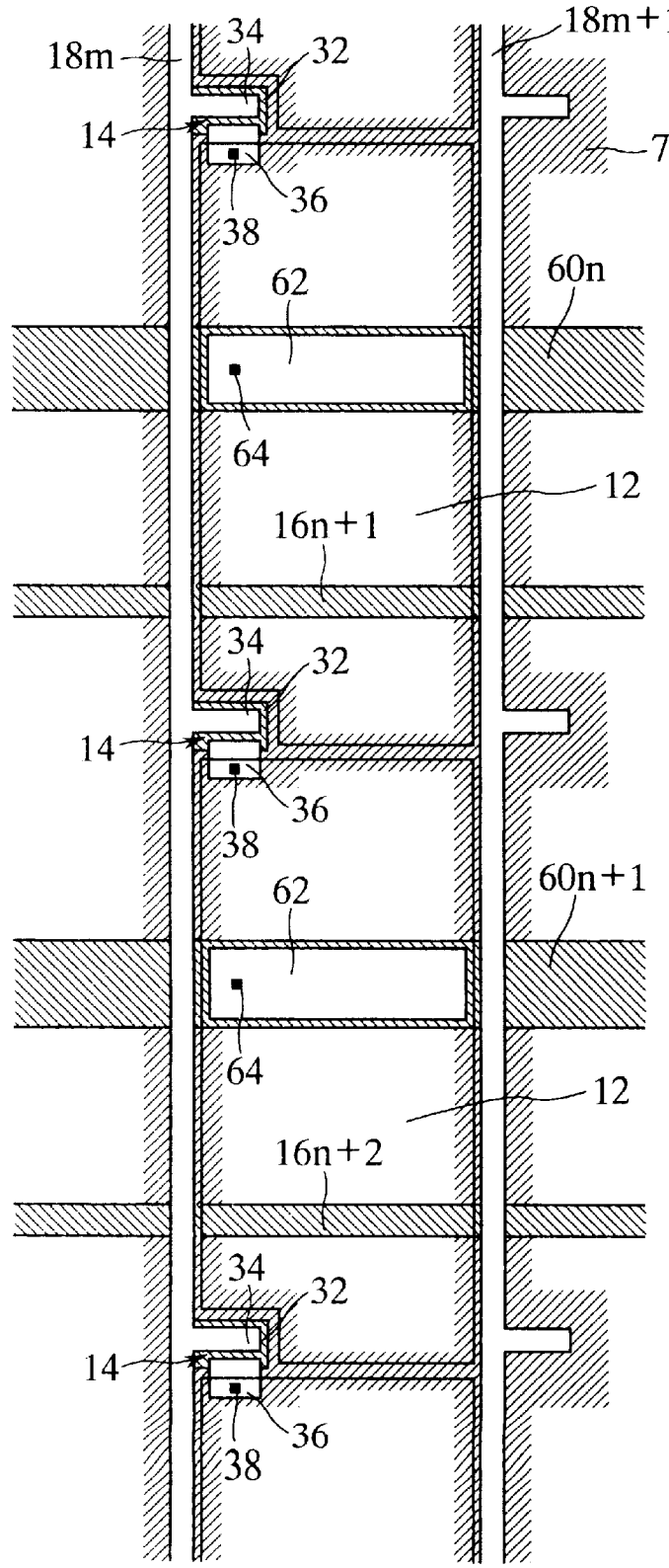
FIGS. 23A and 23B are views of a pattern layout of the thin film transistor matrix device according to an eleventh embodiment of the present invention.
Figure 23B:
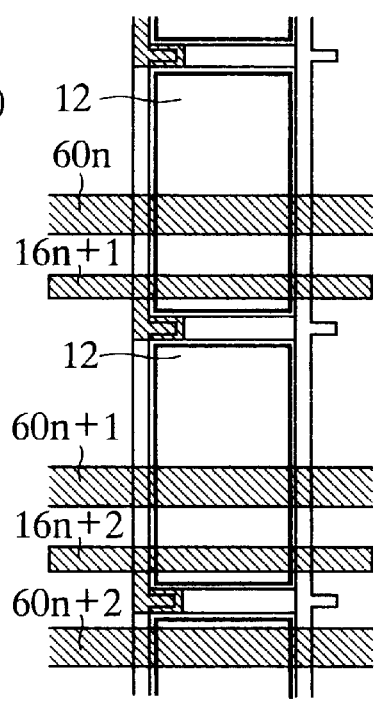

The thin film transistor matrix device according to an eleventh embodiment will be explained with reference to FIGS. 23A and 23B. FIG. 23A shows a detailed pattern layout. FIG. 23B shows positional relationships among picture element electrodes, gate bus lines and capacitance bus lines.

The thin film transistor matrix device according to the present embodiment is a thin film transistor matrix device to be used in a liquid crystal color display unit. Three sub-picture elements for RGB are provided for one picture element. One picture element electrode of the present embodiment constitutes the sub-picture element electrodes in the color picture element electrode.

On a transparent insulating substrate (not shown) there are provided a plurality of gate bus lines $16n$, $16n+1$, $16n+2$, ... which are parallel with each other and extended widthwise as viewed in FIGS. 23A and 23B, and a plurality of capacitance bus lines $60n$, $60n+1$, $60n+2$, ... which are parallel with each other and extended between the gate bus lines $60n$, $60n+1$, $60n+2$, ... widthwise as viewed in FIGS. 23A and 23B. Further, a plurality of drain bus lines $18m$, $18m+1$, $18m+2$, ... are provided parallel with each other and lengthwise as viewed in FIGS. 23A and 23B.

Sub-patterns are extended downward from the gate bus lines $16n$, $16n+1$, $16n+2$, ... along the drain bus lines $18m$, $18m+1$, $18m+2$, ...

Thin film transistors 14 are provided near the lower ends of the sub-patterns. The gate electrodes 32 of the thin film transistors 14 are commonly connected to the gate bus lines $16n$, $16n+1$, $16n+2$, ... through the sub-patterns. The drain electrodes 34 are commonly connected to the drain bus lines $18m$, $18m+$, $18m+2$, ... The source electrodes 36 of the thin film transistors 14 are connected to the picture element electrodes 12 through contact holes 38.

In the present embodiment the respective picture elements are formed beyond their associated capacitance bus lines $60n$, $60n+1$, $60n+2$, ... and their next gate bus lines $16n+1$, $16n+2$, $16n+3$, ... For example, a picture element electrode 12 connected to the gate bus line $16n+1$ through a thin film transistor 14 is extended beyond the capacitance bus line $60n+1$ and the gate bus line $16n+2$ from the thin film transistor 14 to a thin film transistor 14 of the next row. The thin film transistor 14 is disposed on the lower end of the sub-pattern of the gate bus lines $16n+1$, and the source electrode 36 is connected to the upper end of the picture element electrode 12 through the contact hole 38.

Intermediate electrodes 62 for forming sub-capacitances Cs are formed on the capacitance bus lines $60n$, $60n+1$, $60n+2$, ... disposed at the middle of the picture element electrodes 12. The intermediate electrodes 62 are connected to the picture element electrodes 12 through contact holes 64. The sub-capacitances Cs are formed between the intermediate electrodes 62 and the capacitance bus lines $60n$, $60n+1$, $60n+2$, ...

The gaps between the picture element electrodes 12, and the gaps between the picture element electrodes 12 and the drain bus lines $18m$, $18m+1$, $18m+2$, ... are light-shielded by light shielding films 70 called a black matrix formed on an opposed substrate.

In the present embodiment, the intermediate electrodes 62 are formed to form larger sub-capacitances for a small area, and are not essential.

As described above, according to the present embodiment, the picture element electrodes are formed in the regions which are remote from the gate bus lines for controlling the picture element electrodes, whereby no increase occurs in a capacitance between the picture element electrodes and the gate bus lines. Because the capacitance bus lines have no voltage variations from a common voltage, the gaps between the picture element electrodes can be light-shielded by the capacitance bus lines without considering voltage changes of the capacitance bus lines due to a drive voltage.

A Twelfth Embodiment

Figure 24A:
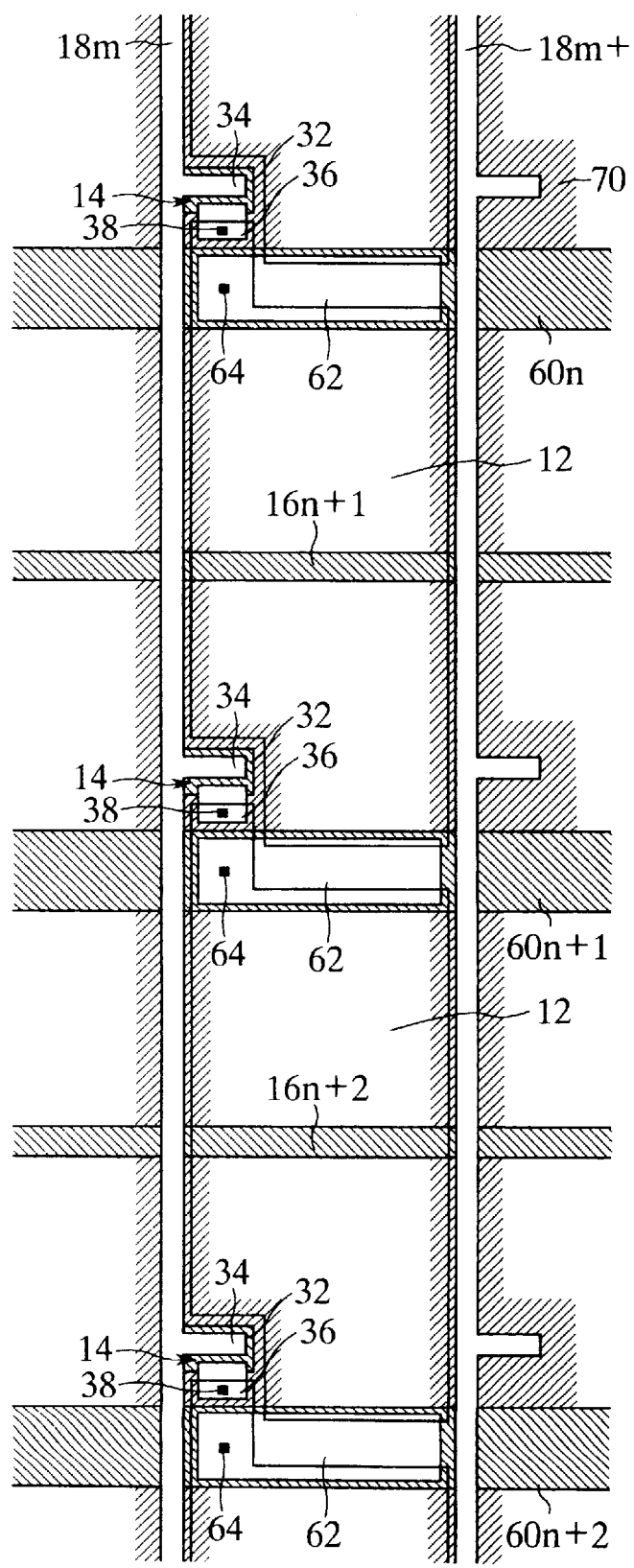
FIGS. 24A and 24B are views of a pattern layout of the thin film transistor matrix device according to a twelfth embodiment of the present invention.
Figure 24B:
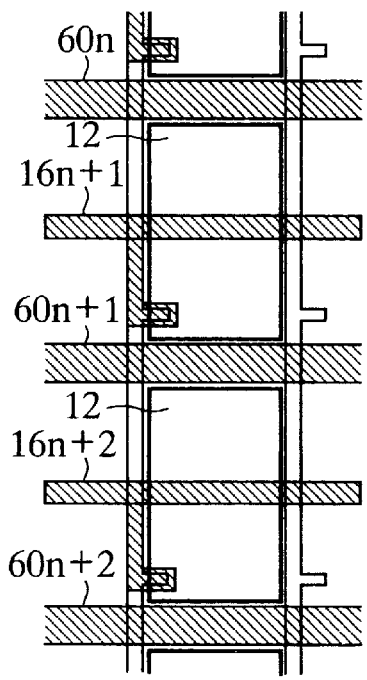

The thin film transistor matrix device according to a twelfth embodiment of the present invention will be explained with reference to FIG. 24A and 24B. FIG. 24A shows a detailed pattern layout. FIG. 24B shows positional relationships among the picture element electrodes, the gate bus lines and the capacitance bus lines. The same members or members of the same kinds of the present embodiment as those of the thin film transistor matrix device of FIGS. 23A and 23B are represented by the same reference numerals to simplify or not to repeat their explanation.

On a transparent insulating substrate (not shown) there are provided a plurality of gate bus lines $16n$, $16n+1$, $16n+2$, ... which are parallel with each other and extended widthwise as viewed in FIGS. 24A and 24B, and a plurality of capacitance bus lines $60n$, $60n+1$, $60n+2$, ... which are extended parallel with each other substantially intermediate between the gate bus lines $16n$, $16n+1$, $16n+2$, ... widthwise as viewed in FIGS. 24A and 24B. Further a plurality of drain bus lines $18m$, $18m+1$, $18m+2$, ... are provided parallel with each other lengthwise as viewed in FIGS. 24A and 24B.

Sub-patterns are extended from the gate bus lines $16n$, $16n+1$, $16n+2$, ... along the drain bus lines $18m$, $18m+1$, $18m+2$, ... down to a vicinity of the capacitance bus lines $60n$, $60n+1$, $60n+2$, ...

Thin film transistors 14 are provided near the lower ends of the sub-patterns. The gate electrodes 32 of the thin film transistors 14 are commonly connected to the gate bus lines $16n$, $16n+1$, $16n+2$, ... through the sub-patterns. The drain electrodes 34 are commonly connected to the drain bus lines $18m$, $18m+1$, $18m+2$, ... The source electrodes 36 of the thin film transistors 14 are connected to the picture element electrodes 12 through contact holes 38.

In the present embodiment the respective picture element electrodes 12 are extended between their associated capacitance bus lines $60n$, $60n+1$, $60n+2$, ... and the next capacitance bus lines $60n$, $60n+1$, $60n+2$, ... A thin film transistor 14 is disposed on the lower end of a sub-pattern of a gate bus line $16n+1$, and the source electrode 36 is connected to the upper end of a picture element electrode 12 through a contact hole 38.

The capacitance bus lines $60n$, $60n+1$, $60n+2$, ... are disposed immediately below the thin film transistors 14 and between the picture element electrodes 12. Intermediate electrodes 62 which form sub-capacitances Cs are formed on the capacitance bus lines $60n$, $60n+1$, $60n+2$, ... The intermediate electrodes 62 are connected to the picture element electrodes 12 through contact holes 64.

In the present embodiment, as shown in FIGS. 24A and 24B, the gaps between the picture element electrodes 12 are light-shielded by the capacitance bus lines $60n$, $60n+1$, $60n+2$, ... The gaps between the picture element electrodes 12 and the drain bus lines $18m$, $18m+1$, $18m+2$, ... are light-shielded by light shielding films 70 called a black matrix formed on an opposed substrate.

As described above, according to the present embodiment, because the capacitance bus lines do not have voltage variations from a common voltage, the gaps between the picture element electrodes can be light-shielded by the capacitance bus lines without considering voltage changes of the capacitance bus lines due to a drive voltage.

A Thirteenth Embodiment

Figure 25:
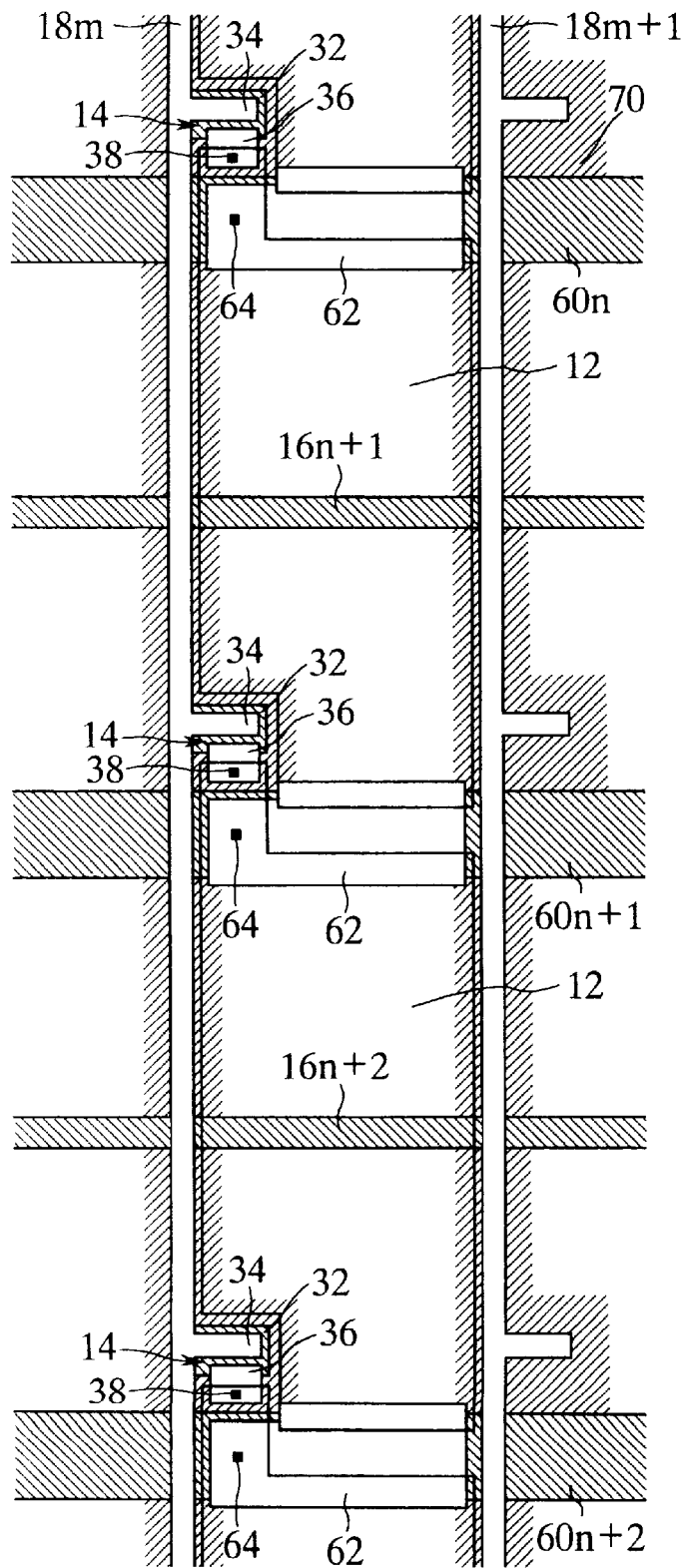
FIG. 25 is a view of a pattern layout of the thin film transistor matrix device according to a thirteenth embodiment of the present invention.

The thin film transistor matrix device according to a thirteenth embodiment of the present invention will be explained with reference to FIG. 25. The same members or members of the same kinds of the present embodiment as those of the thin film transistor matrix device of FIGS. 24A and 24B are represented by the same reference numerals to simplify or not to repeat their explanation.

The thin film transistor matrix device according to the present embodiment has substantially the same constitution as that according to the twelfth embodiment shown in FIGS. 24A and 24B, but is characterized in that a width of the intermediate electrodes 62 is larger than that of the capacitance bus lines 60$n$, 60$n$+1, 60$n$+2, . . . Thus the gaps between the picture element electrodes 12 are light-shielded not by the capacitance bus lines 60$n$, 60$n$+1, 60$n$+2, . . . but by the intermediate electrodes 62.

The intermediate electrodes 62 are widened to light-shield the gaps between the picture element electrodes 12, whereby adverse parasitic capacitances are generated between the intermediate electrodes 62 and the picture element electrodes of the previous rows. Values of the parasitic capacitances are so small that display quality is little affected and is never degraded.

Thus according to the present embodiment, because the picture element electrodes are disposed in regions which are remote from the gate bus lines by which the picture element electrodes control themselves, the gaps between the picture element electrodes can be light-shielded by the use of the intermediate electrodes connected to the picture element electrodes without increasing a capacitance between the picture element electrodes and the gate bus lines.

A Fourteenth Embodiment

The thin film transistor matrix device according to a fourteenth embodiment will be explained with reference to FIG. 26. The same members or members of the same kinds of the present embodiment as those of the thin film transistor matrix device of FIGS. 24A and 24B are represented by the same reference numerals to simplify or not to repeat their explanation.

Figure 26:
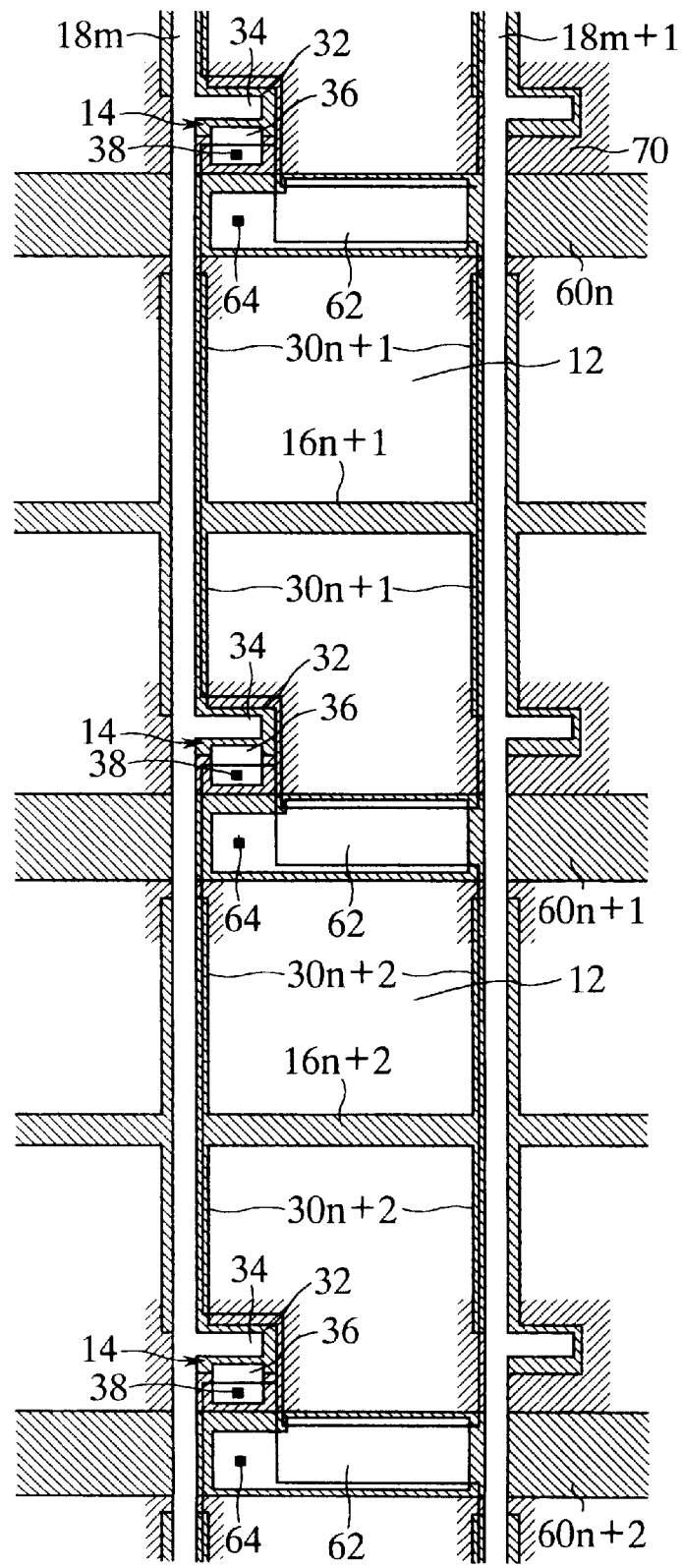
FIG. 26 is a view of a pattern layout of the thin film transistor matrix device according to a fourteenth embodiment of the present invention.

The thin film transistor matrix device according to the present embodiment has substantially the same constitution as that according to the twelfth embodiment, but is characterized in that sub-patterns 30$n$, 30$n$+1, 30$n$+2, . . . extended from the gate bus lines 16$n$, 16$n$+1, 16$n$+2, . . . down to the gate electrodes 32 as shown in FIG. 26 are thickened, and that sub-patterns 30$n$, 30$n$+1, 30$n$+2, . . . are extended to a vicinity of the upper capacitance patterns 60$n$, 60$n$+1, 60$n$+2, . . . The sub-patterns 30$n$, 30$n$+1, 30$n$+2, . . . shield light at the gaps between the picture element electrodes 12 and the drain bus lines 18$m$, 18$m$+1, 18$m$+2, . . . Light shielding films 70 are formed on an opposed substrate so as to shield light in a vicinity of the thin film transistors 14. Accordingly it is not necessary to consider a large margin for aligning the TFT substrate and the opposed substrate, which results in higher aperture ratios.

As described above, according to the present embodiment, the gaps between the picture element electrodes and the drain bus lines are light-shielded by the use of the sub-patterns of the gate bus lines, whereby the light shielding films on the opposed substrate can have a smaller light-shielding region, with a result of higher aperture ratios.

A Fifteenth Embodiment

The thin film transistor matrix device according to a fifteenth embodiment of the present invention will be explained with reference to FIG. 27. The same members or members of the same kinds as those of the thin film transistor matrix device of FIGS. 24A and 24B are represented by the same reference numerals to simplify or not to repeat their explanation.

Figure 27:
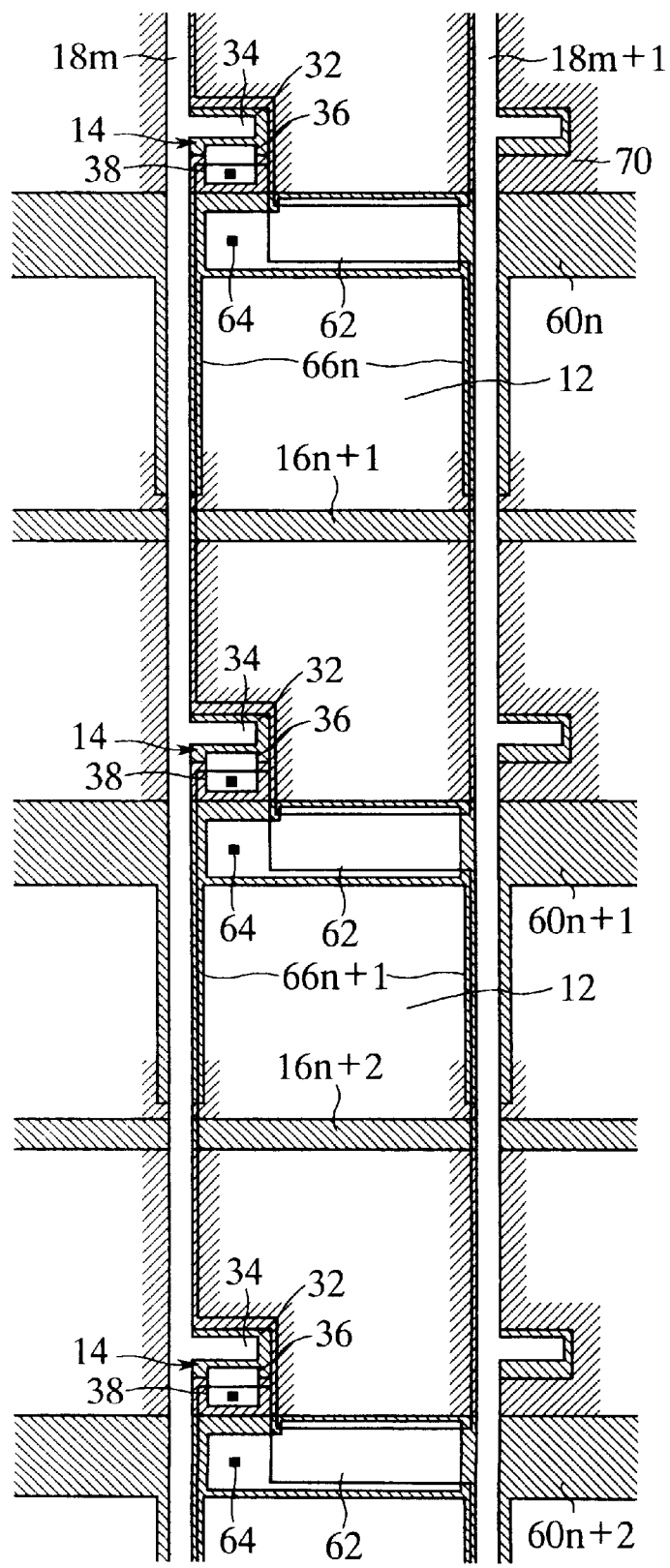
FIG. 27 is a view of a pattern layout of the thin film transistor matrix device according to a fifteenth embodiment of the present invention.

The thin film transistor matrix device according to the present embodiment has substantially the same constitution as the thin film transistor matrix device of FIGS. 24A and 24B, but is characterized in that sub-patterns 66$n$, 66$n$+1, 66$n$+2, . . . are extended from the capacitance bus lines 60$n$, 60$n$+1, 60$n$+2, . . . down to the gate bus lines 16$n$, 16$n$+1, 16$n$+2, 16$n$+3, . . . as shown in FIG. 27. Light shielding films 70 are formed so as to shield light only at the gaps between the picture element electrodes 12 from the gate bus line 16$n$, 16$n$+1, 16$n$+2, . . . to the thin film transistors 14 and the drain bus lines 18$m$, 18$m$+1, 18$m$+2, . . . , and also only the gaps in a vicinity of the thin film transistors 14. Accordingly it is not necessary to consider a large margin for aligning the TFT substrate and the opposed substrate, with a result of higher aperture ratios.

As described above, according to the present embodiment, the gaps between the picture element electrodes and the drain bus lines are light-shielded by the use of the sub-patterns of the capacitance bus lines, whereby the opposed substrate can have a smaller light shielding region, with a result of higher aperture ratios.

A Sixteenth Embodiment

Figure 28:
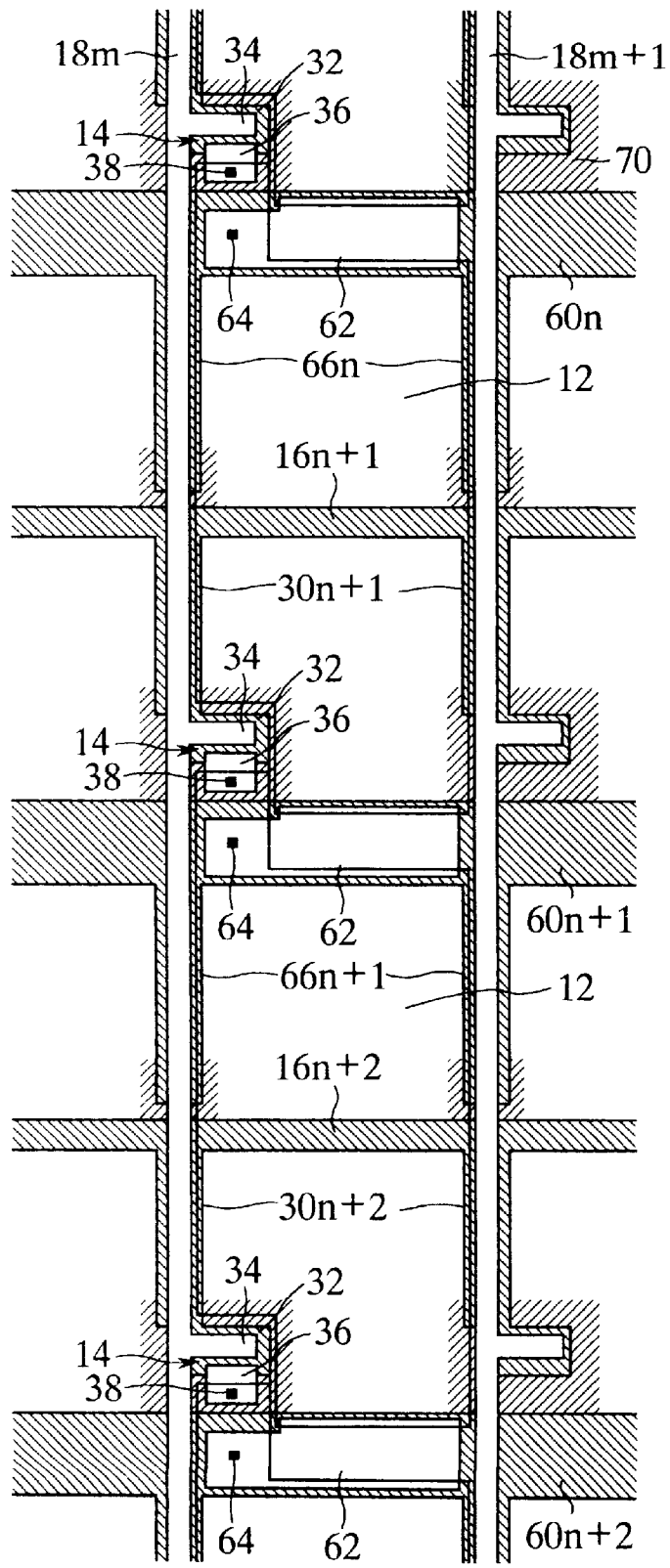
FIG. 28 is a view of a pattern layout of the thin film transistor matrix device according to a sixteenth embodiment of the present invention.

The thin film transistor matrix device according to a sixteenth embodiment of the present invention will be explained with reference to FIG. 28. The same members or members of the same kinds of the present embodiment as those of the thin film transistor matrix device of FIGS. 24A and 24B are represented by the same reference numerals to simplify or not to repeat their explanation.

The thin film transistor matrix device according to the present embodiment has substantially the same constitution as the thin film transistor matrix device according to the twelfth embodiment, but is characterized in that the sub-patterns 30$n$, 30$n$+1 30$n$+2, . . . extended from the gate bus lines 16$n$, 16$n$+1, 16$n$+2, . . . down to the gate electrodes 32 are thickened, and the sub-patterns 66$n$, 66$n$+1, 66$n$+2, . . . are extended from the capacitance bus lines 60$n$, 60$n$+1, 60$n$+2, . . . down to the gate bus lines 16$n$, 16$n$+1, 16$n$+2, . . . The sub-patterns 30$n$, 30$n$+1, 30$n$+2, . . . , and the sub-patterns 60$n$, 60$n$+1, 60$n$+2, . . . light-shield the gaps between the picture element electrodes 12 and the drain bus lines 18$m$, 18$m$+1, 18$m$+2, . . . The light shielding films 70 on the opposed substrate are formed so as to shield light in a vicinity of the thin film transistors 14. Accordingly it is not necessary to consider a large margin for aligning the TFT substrate with the opposed substrate, with a result of higher aperture ratios.

As described above, according to the present embodiment, the sub-patterns of the gate bus lines and the sub-patterns of the capacitance bus lines shield light at the gaps between the picture element electrodes and the drain bus lines. The light shielding films on the opposed substrate can have a smaller light shielding area, with a result of higher aperture ratios.

A Seventeenth Embodiment

The thin film transistor matrix device according to a seventeenth embodiment of the present invention will be explained with reference to FIG. 29. The same members or members of the same kinds of the present embodiment as those of the thin film transistor matrix device shown in FIG. 26 are represented by the same reference numerals to simplify or not to repeat their explanation.

The thin film transistor matrix device according to the present embodiment has substantially the same constitution as the thin film transistor matrix device according to the fourteenth embodiment shown in FIG. 26, but is characterized in that a source electrode and an intermediate electrode 62 of the fourteenth embodiment are integrated in an intermediate electrode 62. As a result, the number of the contact holes connected to the picture element electrodes 12 can be reduced, and the thin film transistors 14 and the capacitance bus lines $60n$, $60n+1$, $60n+2$, . . . can be made nearer to each other.

As described above, according to the present embodiment, the source electrodes and the intermediate electrodes are integrated with each other, whereby the number of the contact holes can be reduced, and the thin film transistors and the capacitance bus lines can be made nearer to each other. Higher aperture ratios can be obtained.

An Eighteenth Embodiment

The thin film transistor matrix device according to an eighteenth embodiment of the present invention will be explained with reference to FIG. 30. The same members or members of the same kinds of the present embodiment as the thin film transistor matrix device shown in FIG. 29 are represented by the same reference numerals to simplify or not to repeat their explanation.

Figure 29:
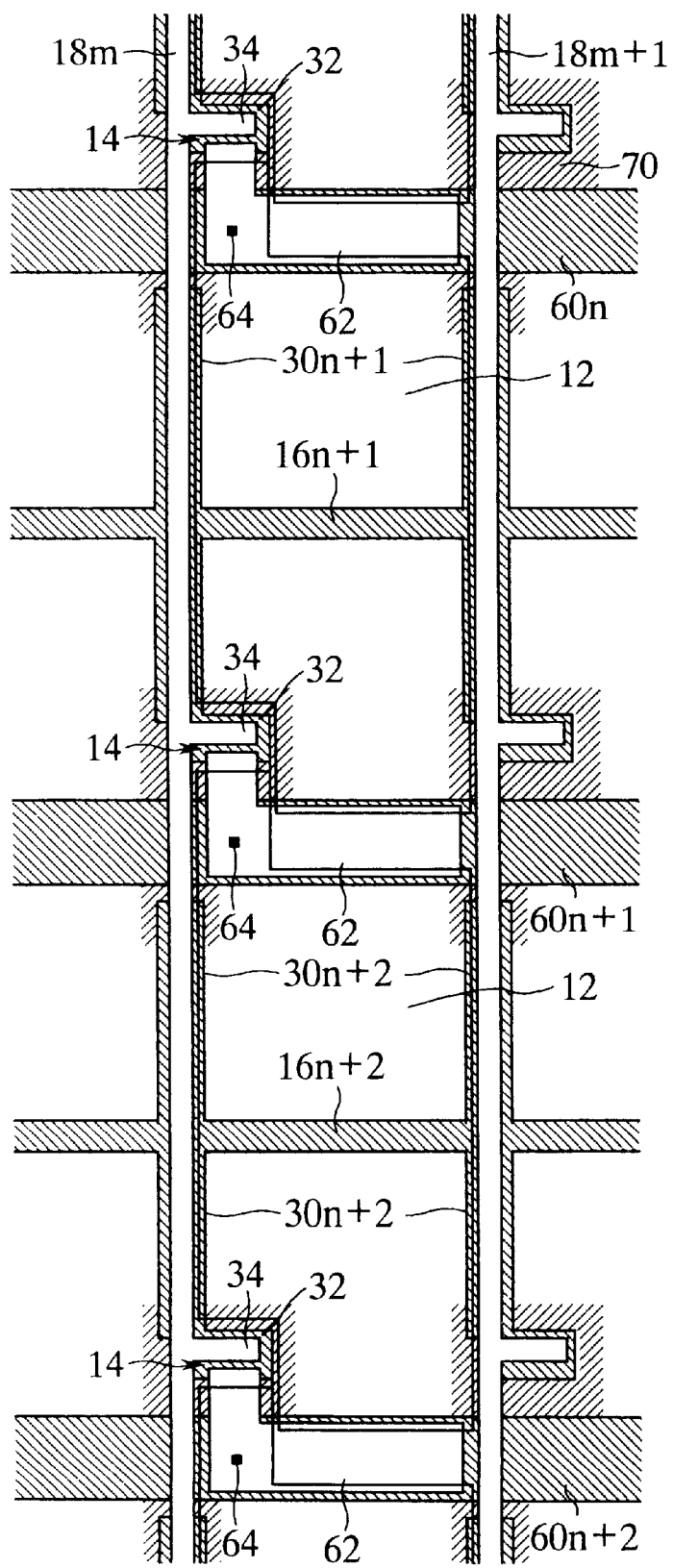
FIG. 29 is a view of a pattern layout of the thin film transistor matrix device according to a seventeenth embodiment of the present invention.

The thin film transistor matrix device according to the present embodiment is an application of the thin film transistor matrix device according to the seventeenth embodiment of the present invention shown in FIG. 29 to a sub-picture element array for color display which is called a delta array. In the delta array, three sub-picture elements for RGB for one picture element are arranged at three summits of a triangle. Such delta array is widely used in liquid crystal color display devices for AV (Audio Visual) use.

Three picture element electrodes 12R, 12G, 12B for color display of each row are offset from each other by a half pitch. Drain bus lines $18m$, $18m+1$, $18m+2$, . . . are accordingly bent along the offset of the picture element electrodes 12R, 12G, 12B. Thin film transistors 14 are located right of the upper edges of the respective picture element electrodes 12R, 12G, 12B. Right halves of the upper edges of respective intermediate electrodes 62 connected to the picture element electrodes 12R, 12G, 12B are formed in a convex so as to function as the source electrodes of the thin film transistors 14. The lower edges of the respective picture element electrodes 12R, 12G, 12B are contoured to the bend of the drain bus lines $18m$, $18m+1$, $18m+2$, . . .

Sub-patterns $30n$, $30n+1$, $30n+2$, . . . extended downward from the gate bus lines $16n$, $16n+1$, $16n+2$, . . . are bent along the bend of the drain bus lines $18m$, $18m+1$, $18m+2$, . . . and light-shield the gaps between the picture element electrodes 12R, 12G, 12B and the drain bus lines $18m$, $18m+1$, $18m+2$, . . .

As described above, according to the present embodiment, even in the thin film transistor matrix device for use in liquid crystal color display device of the delta array, the gaps between the picture element electrodes and the drain bus lines can be light-shielded by the use of the sub-patterns of the gate bus lines, whereby light shielding films on an opposed substrate have a smaller light-shielding region with a result of higher aperture ratios.

A Nineteenth Embodiment

The thin film transistor matrix device according to a nineteenth embodiment of the present invention will be explained with reference to FIG. 31. The same members or members of the same kinds of the present embodiment as those of the thin film transistor matrix device shown in FIG. 30 are represented by the same reference numerals to simplify or not to repeat their explanation.

Figure 31:
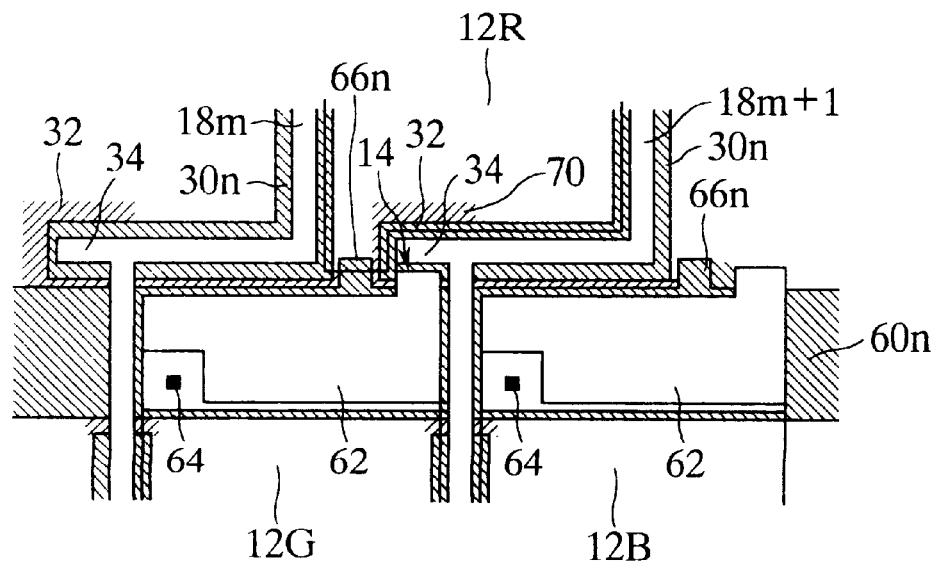
FIG. 31 is a view of a pattern layout of the thin film transistor matrix device according to a nineteenth embodiment of the present invention.

The thin film matrix device according to the present embodiment have substantially the same constitution as the thin film transistor matrix device according to the eighteenth embodiment shown in FIG. 31 but is characterized in that sub-patterns $66n$, $66n+1$, $66n+2$, . . . are provided on the capacitance bus lines $60n$, $60n+1$, $60n+2$, . . . to shield light at the gaps between the capacitance bus lines $60n$, $60n+1$, $60n+2$, . . . and the picture element electrodes 12R, 12G, 12B. The light shielding can be conducted without curving the sub-patterns $30n$, $30n+1$, $30n+2$, . . . of the gate bus lines $16n$, $16n+1$, $16n+2$, . . . as in the eighteenth embodiment.

As described above, according to the present embodiment light is shielded at the gaps between the picture element electrodes and the capacitance bus lines, whereby light shielding films on an opposed substrate can have a smaller light shielding region with a result of higher aperture ratios.

A Twentieth Embodiment

The thin film transistor matrix device according to a twentieth embodiment of the present invention will be explained with reference to FIG. 32. The same members or members of the same kinds of the present embodiment as those of the thin film transistor matrix device shown in FIG. 30 are represented by the same reference numerals to simplify or not to repeat their explanation.

Figure 30:
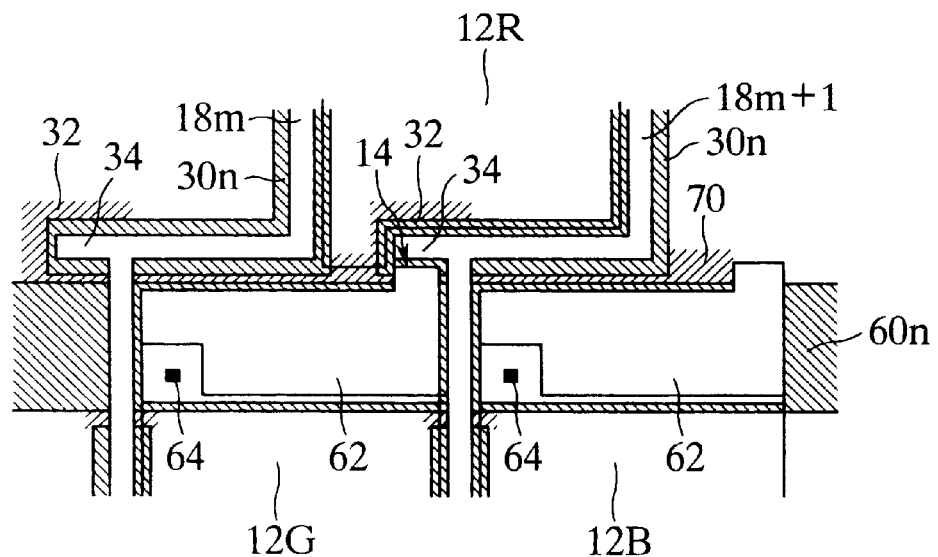
FIG. 30 is a view of a pattern layout of the thin film transistor matrix device according to an eighteenth embodiment of the present invention.

The thin film transistor matrix device according to the present embodiment as well as the thin film transistor matrix device according to the eighteenth embodiment shown in FIG. 30 is an application to a sub-picture element array for color display which is called a delta array. In the eighteenth embodiment, the drain bus lines $18m$, $18m+1$, $18m+2$, . . . are bent at a right angle to arrange three picture element electrodes 12R, 12G, 12B for color display in the delta arrangement, but the present embodiment is characterized in that the drain bus lines $18m$, $18m+1$, $18m+2$, . . . are bent at an angle smaller than a right angle. The drain bus lines $18m$, $18m+1$, $18m+2$, . . . are bent at about 45° on the upper edges of the capacitance bus lines $60n$, $60n+1$, $60n+2$, . . . , and are further extended slant and are again bent at the lower edges at about 45°. The intermediate electrodes 62 are formed in a parallelogram which contours the drain bus lines $18m$, $18m+1$, $18m+2$, . . . The gaps between the drain bus lines $18m$, $18m+1$, $18m+2$, . . . and the picture element electrodes 12R, 12G, 12B are light shielded by the sub-patterns $30n$, $30n+1$, $30n+2$, . . . of the gate bus lines $16n$, $16n+1$, $16n+2$, . . .

As described above, according to the present embodiment, the thin film transistor matrix device for a liquid crystal color display device of the delta array can be realized without bending the drain bus lines at a right angle.

A Twenty-First Embodiment

The thin film transistor matrix device according to a twenty-first embodiment of the present invention will be explained with reference to FIG. 33. The same members or members of the same kinds of the present embodiment as those of the thin film transistor matrix device shown in FIG. 32 are represented by the same reference numerals to simplify or not to repeat their explanation.

Figure 32:
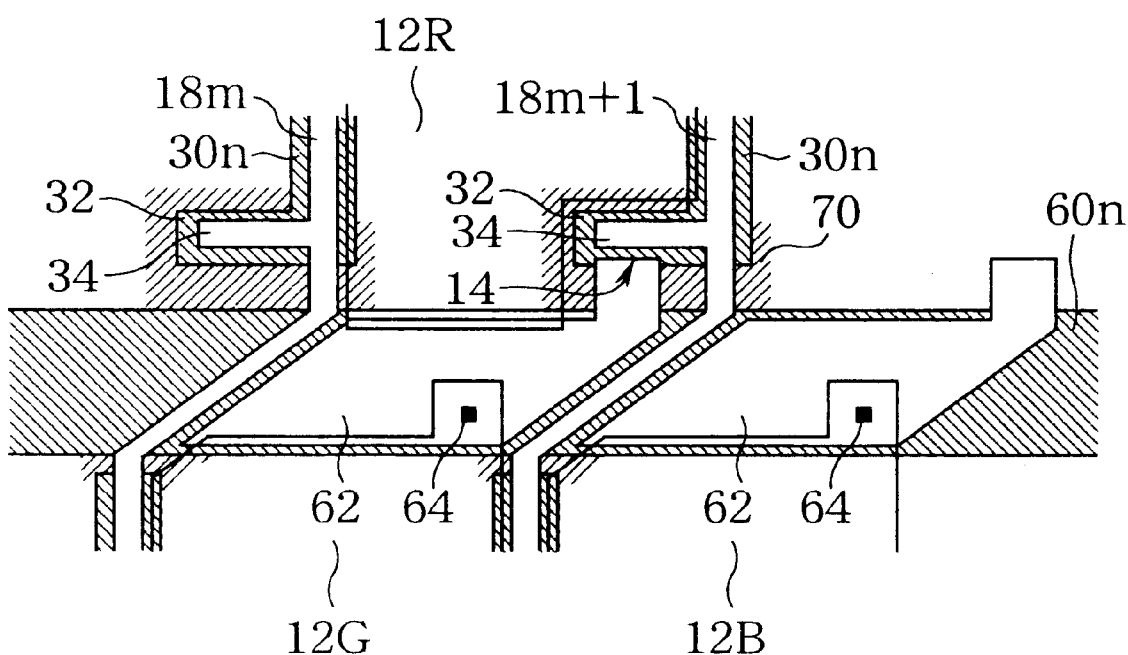
FIG. 32 is a view of a pattern layout of the thin film transistor matrix device according to a twentieth embodiment of the present invention.
Figure 33:
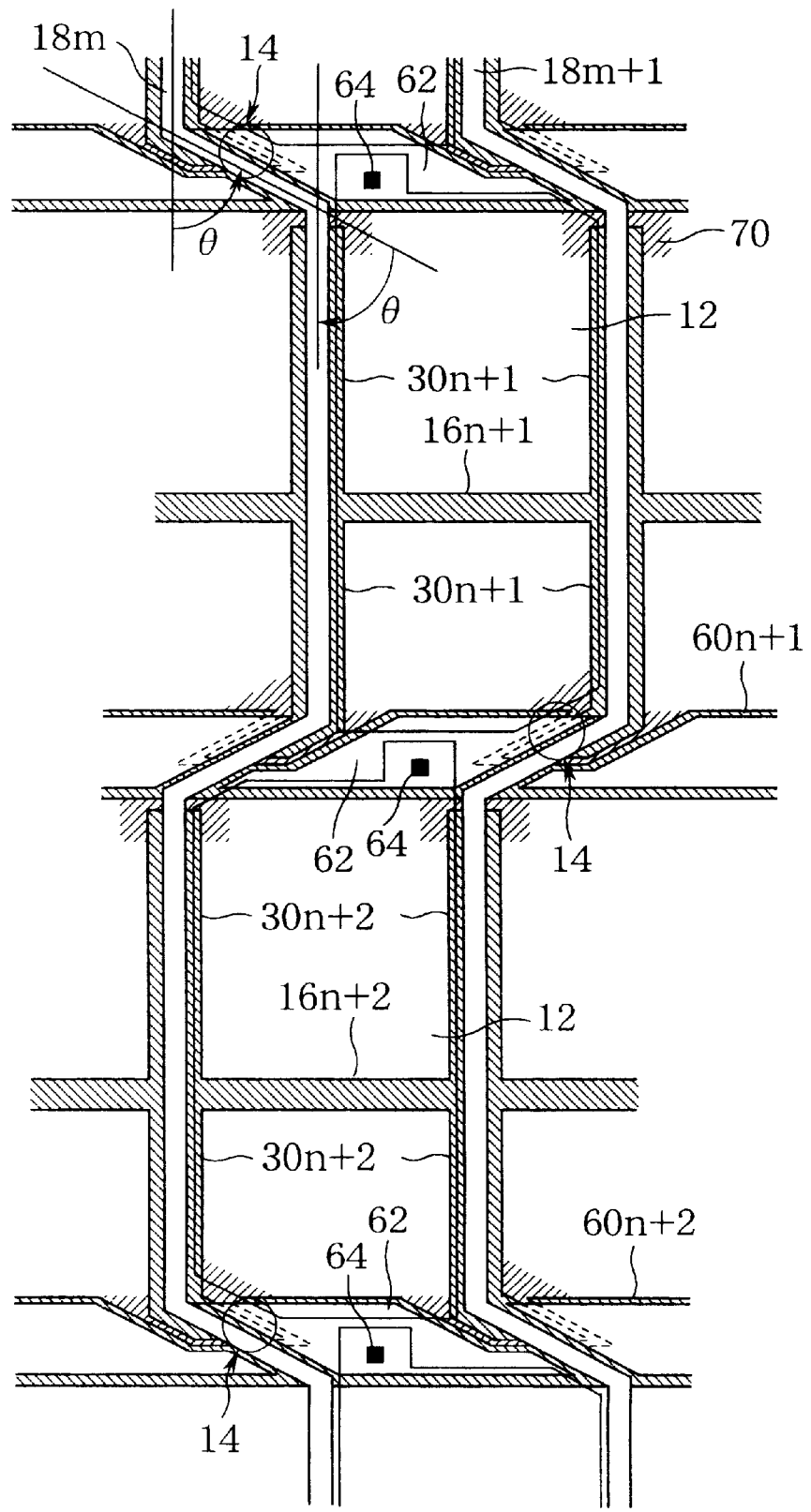
FIG. 33 is a view of a pattern layout of the thin film transistor matrix device according to a twenty-first embodiment of the present invention.

The thin film transistor matrix device according to the present embodiment has substantially the same structure as the thin film transistor matrix device according to the twelfth embodiment shown in FIG. 32, but is characterized in the location of the thin film transistors 14. Regions of drain bus lines 18$m$, 18$m$+1, 18$m$+2, . . . in capacitance bus lines 60$n$, 60$n$+1, 60$n$+2, . . . are recessed, and end portions of sub-patterns 30$n$, 30$n$+1, 30$n$+2, . . . of gate bus lines 16$n$, 16$n$+1, 16$n$+2, . . . are positioned in the recesses. The thin film transistors 14 are formed in the recesses. Gate electrodes 32, drain electrodes 34 and source electrodes which are parts of intermediate electrodes 62 constitute the thin film transistors 14.

The gaps between the drain bus lines 18$m$, 18$m$+1, 18$m$+2, . . . and the picture element electrodes 12R, 12G, 12B are light shielded by the sub-patterns 30$n$, 30$n$+1, 30$n$+2, . . . of the gate bus lines 16$n$, 16$n$+1, 16$n$+2, . . . The light shielding films 70 are provided only near the recesses in the capacitance bus lines 60$n$, 60$n$+1, 60$n$+2, . . .

As described above, according to the present embodiment, the thin film transistors are disposed in the regions for the capacitance bus lines, whereby the picture element electrodes can have a larger effective area, and higher aperture ratios can be obtained.

A Twenty-Second Embodiment

The thin film transistor matrix device according to a twenty-second embodiment of the present invention will be explained with reference to FIG. 34. The same members or members of the same kinds as the thin film transistor matrix device of FIG. 26 are represented by the same reference numerals not to repeat or to simplify their explanation.

The thin film transistor matrix device according to the present embodiment has substantially the same constitution as the thin film transistor matrix device according to the fourteenth embodiment but is characterized by the position of the thin film transistors 14. Parts of capacitor bus lines 60$n$, 60$n$+1, 60$n$+2, . . . below drain bus lines 18$m$, 18$m$+1, 18$m$+2, . . . are recessed, and gate electrodes 32 on the ends of sub-patterns 30$n$, 30$n$+1, 30$n$+2, . . . are accommodated in the recesses. The thin film transistors 14 are formed in the recesses. The gate electrodes 32, the drain electrodes and the source electrodes which are parts of intermediate electrodes 62 constitute the thin film transistors 14.

Gaps between the drain bus lines 18$m$, 18$m$+1, 18$m$+2, . . . and picture element electrodes 12R, 12G, 12B are light shielded by the sub-patterns of the gate bus lines 16$n$, 16$n$+1, 16$n$+2, . . . and light shielding films 70 are provided only in the neighborhood of the recesses of the capacitance bus lines 60$n$, 60$n$+1, 60$n$+2, . . .

As described above, according to the present embodiment, the thin film transistors are disposed in the regions of the capacitance bus lines, which increases an effective area of the picture element electrodes, and higher aperture ratios can be obtained.

A Twenty-Third Embodiment

The thin film transistor matrix device according to a twenty-third embodiment of the present invention will be explained with reference to FIG. 35. The same members or members of the same kinds of the present embodiment as the thin film transistor matrix device are represented by the same reference numerals to simplify or not to repeat their explanation.

Figure 34:
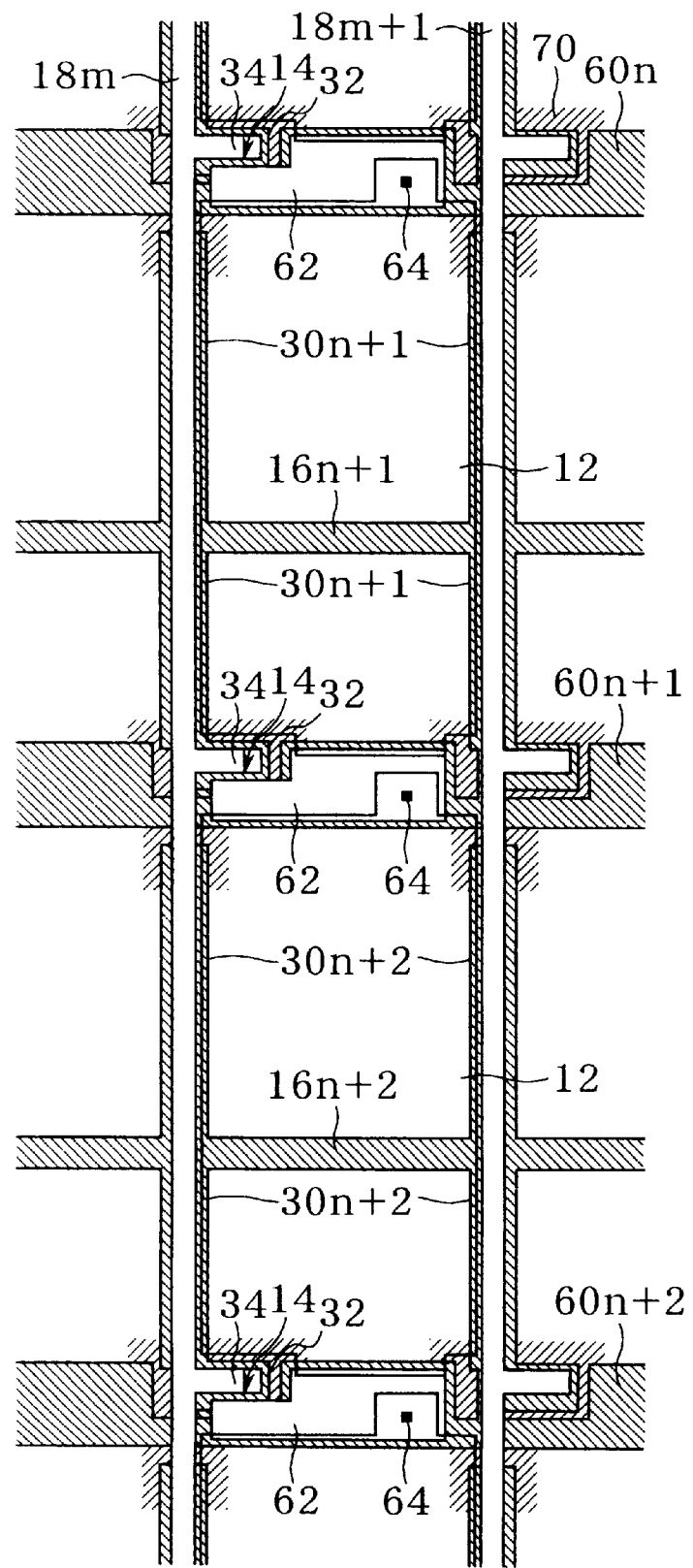
FIG. 34 is a view of a pattern layout of the thin film transistor matrix device according to a twenty-second embodiment of the present invention.

The thin film transistor matrix device according to the present embodiment is an application of the constitution of the thin film transistor matrix device according to the twenty-second embodiment shown in FIG. 34 to a color sub-picture element array called delta array. Drain bus lines 18$m$, 18$m$+1, 18$m$+2, . . . are bent at a right angle along offset picture element electrodes 12R, 12G, 12B. The drain bus lines 18$m$, 18$m$+1, 18$m$+2, . . . are bent in recesses formed in parts of the upper edges of the capacitance bus lines 60$n$, 60$n$+1, 60$n$+2, . . . The thin film transistors 14 are formed in the recesses. End portions of sub-patterns 30$n$, 30$n$+1, 30$n$+2, . . . function as the drain electrodes, and parts of intermediate electrodes 62 function as the source electrodes.

The sub-patterns 30$n$, 30$n$+1, 30$n$+2, . . . extended downward from the gate bus lines 16$n$, 16$n$+1, 16$n$+2, . . . are bent, contouring the drain bus lines 18$m$, 18$m$+1, 18$m$+2, . . . to thereby light shield the gaps between the picture element electrodes 12R, 12G, 12B and the drain bus lines 18$m$, 18$m$+1, 18$m$+2, . . .

As described above, according to the present embodiment, also in the thin film transistor matrix device for the use in a liquid crystal color display device of delta array, thin film transistors are disposed in the regions of the capacitance bus lines, whereby larger effective areas of the picture element electrodes can be obtained, and higher aperture ratios can be obtained.

A Twenty-Fourth Embodiment

The thin film transistor matrix device according to a twenty-fourth embodiment of the present invention will be explained with reference to FIG. 36. The same members or members of the same kinds of the present embodiment as the thin film transistor matrix device shown in FIG. 35 are represented by the same reference numerals to simplify or not to repeat their explanation.

Figure 35:
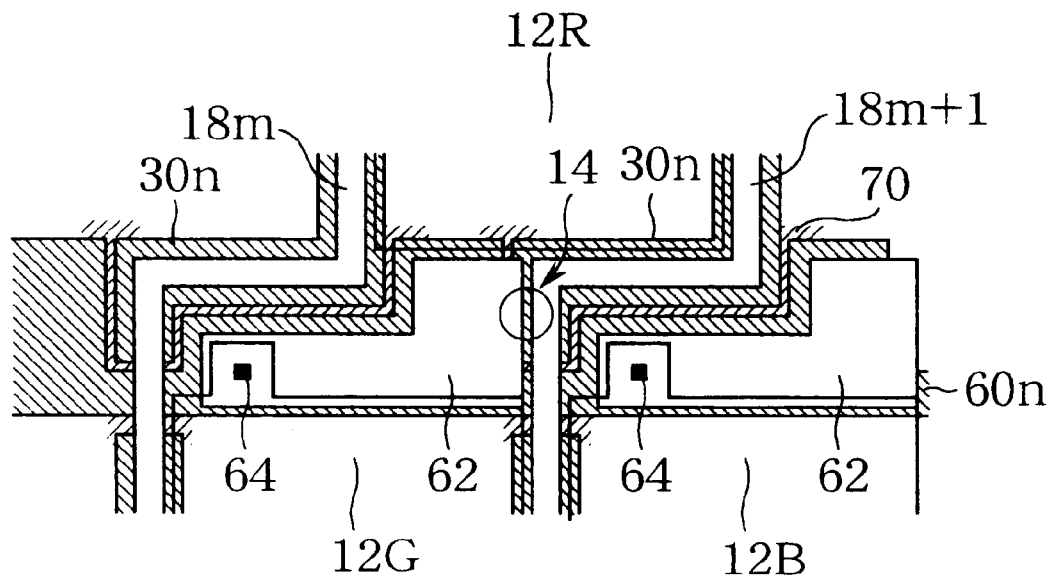
FIG. 35 is a view of a pattern layout of the thin film transistor matrix device according to a twenty-third embodiment of the present invention.
Figure 36:
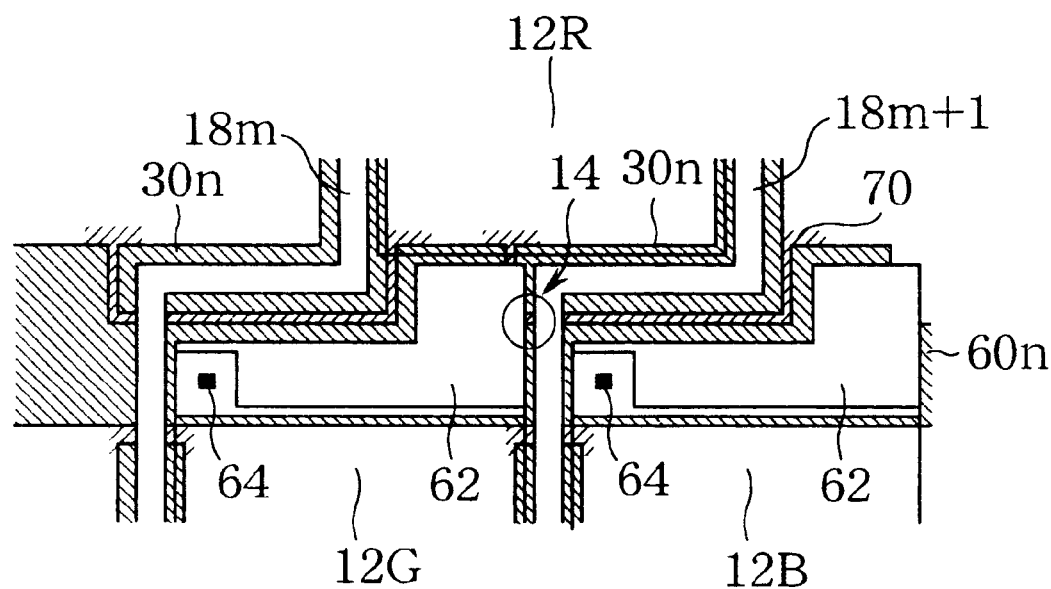
FIG. 36 is a view of a pattern layout of the thin film transistor matrix device according to a twenty-fourth embodiment of the present invention.

The thin film transistor matrix device according to the present embodiment has substantially the same constitution as the thin film matrix device according to the twenty-third embodiment shown in FIG. 35 but is different from the latter in that the recesses of the capacitance bus lines 60$n$, 60$n$+1, 60$n$+2, . . . are smaller. The recesses are formed not to accommodate the entire bent portions of the drain bus lines 18$m$, 18$m$+1, 18$m$+2, . . . but to accommodate minimum necessary portions thereof for the thin film transistors 14. Accordingly the intermediate electrodes 62 can have a larger area, and larger sub-capacitances can be realized.

As described above, according to the present embodiment, in the thin film transistor matrix device even for use in a liquid crystal color display device of delta array, the thin film transistors are disposed in the regions of the capacitance bus lines, whereby the picture element electrodes can have larger effective areas, and higher aperture ratios can be obtained.

A Twenty-Fifth Embodiment

Figure 37:
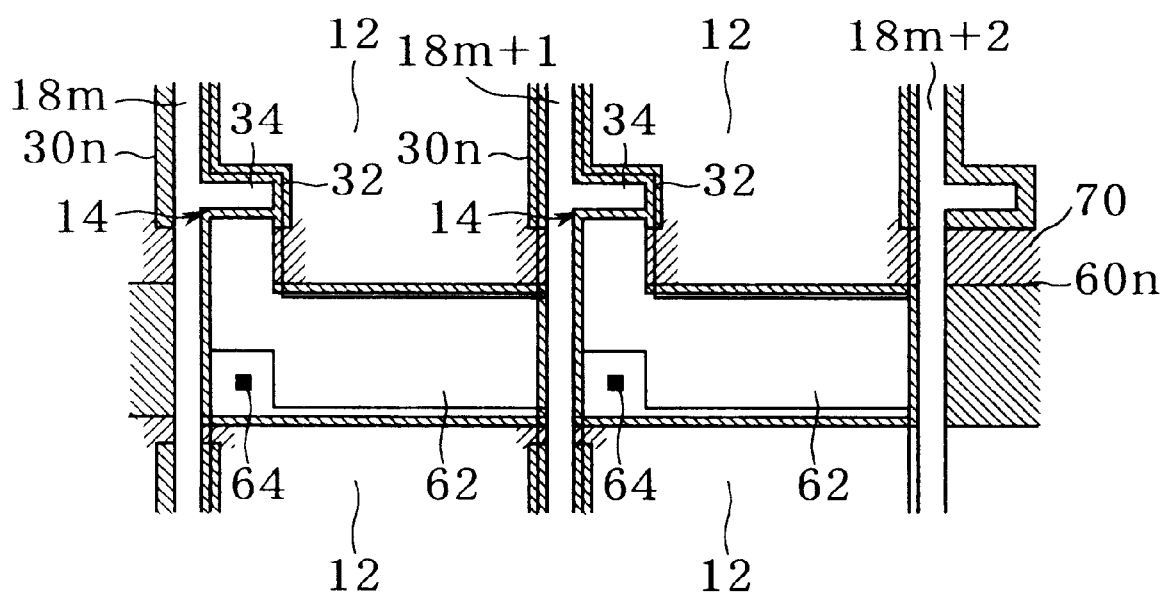
FIG. 37 is a view of a pattern layout of the thin film transistor matrix device according to a twenty-fifth embodiment of the present invention.
Figure 38A:
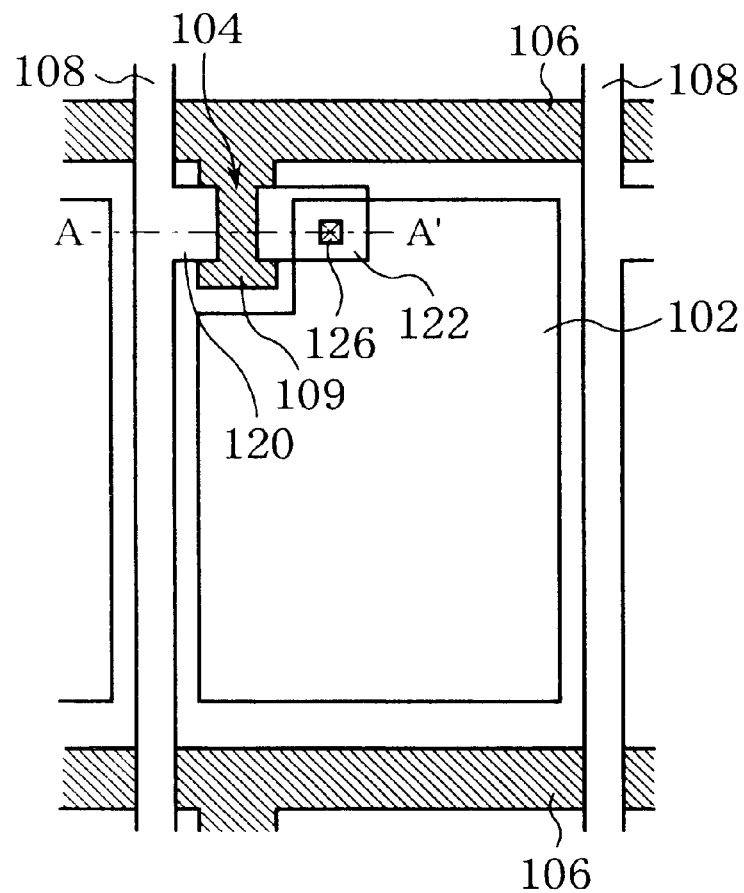
FIGS. 38A and 38B are views of a conventional thin film transistor.
Figure 38B:
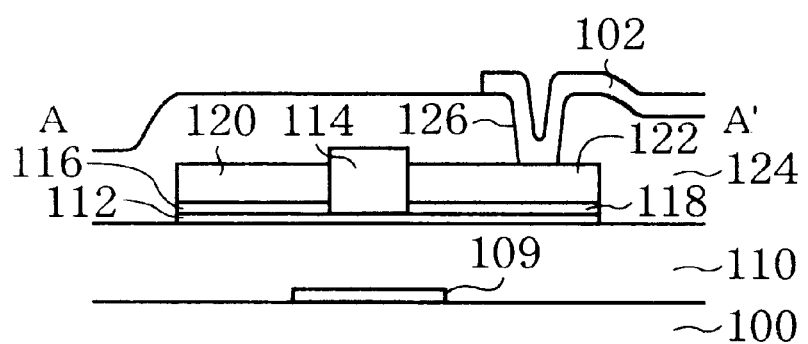
Figure 39:
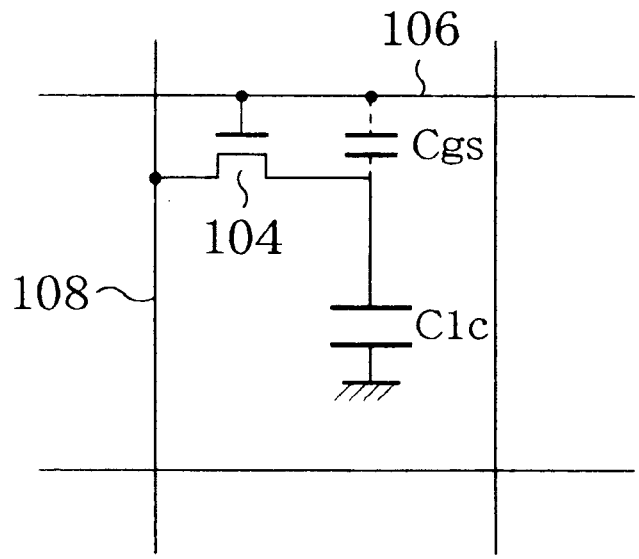
FIG. 39 is a view of an equivalent circuit of the thin film transistor matrix device shown in FIG. 38.
Figure 40:
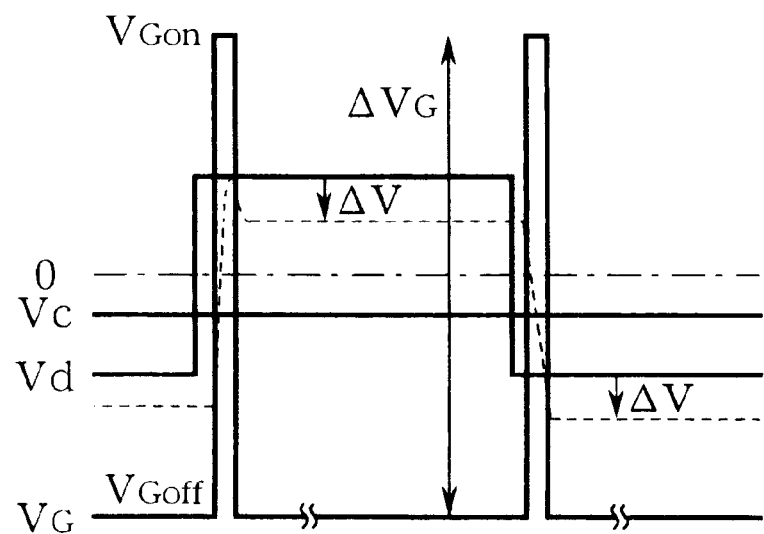
FIG. 40 is an operational waveform of the thin film transistor matrix device shown in FIG. 38.
Figure 41A:
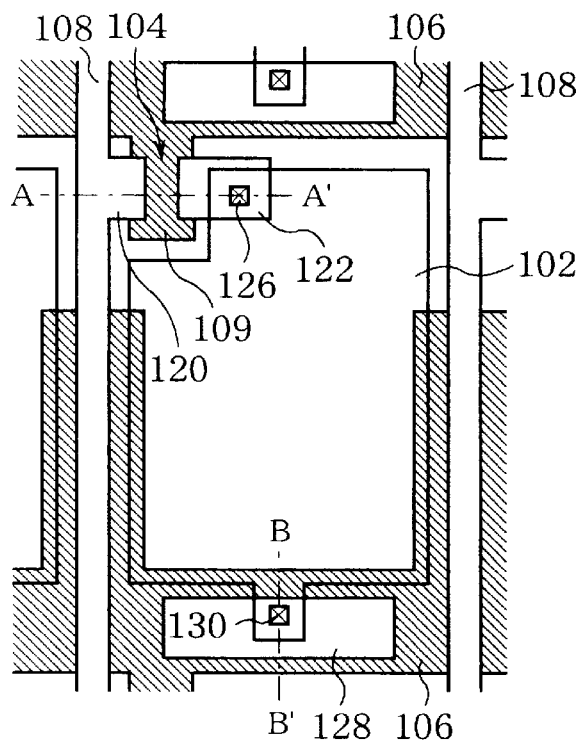
FIGS. 41A to 41C are views of a conventional thin film transistor matrix device.
Figure 41B:
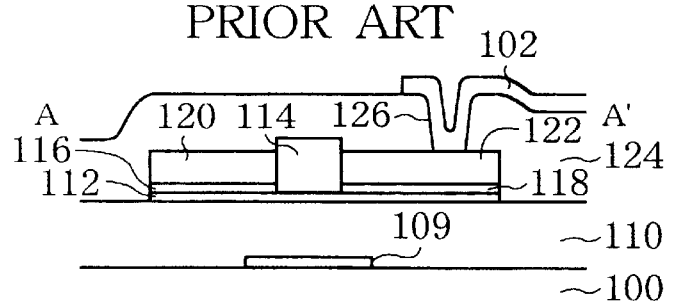
Figure 41C:
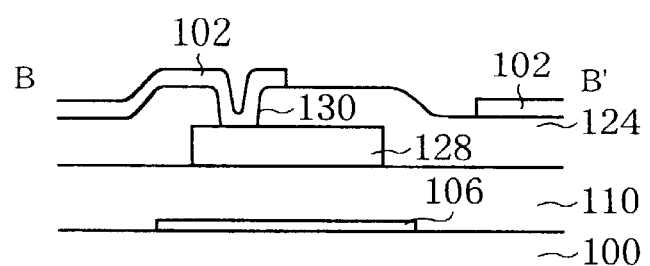
Figure 42:
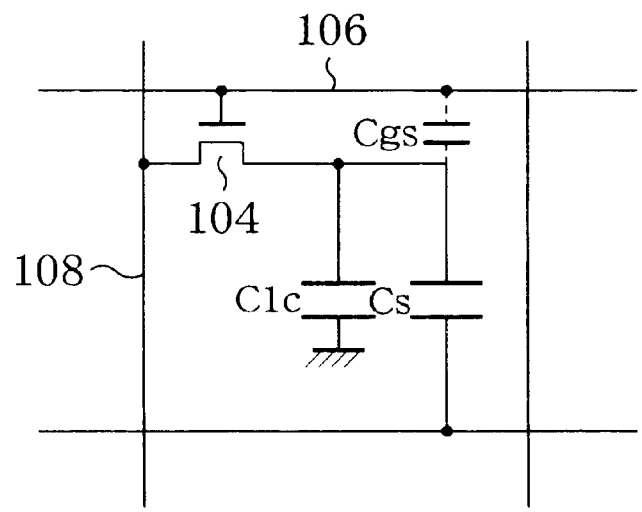
FIG. 42 is a view of an equivalent circuit of the thin film transistor matrix device shown in FIG. 41.
Figure 43:
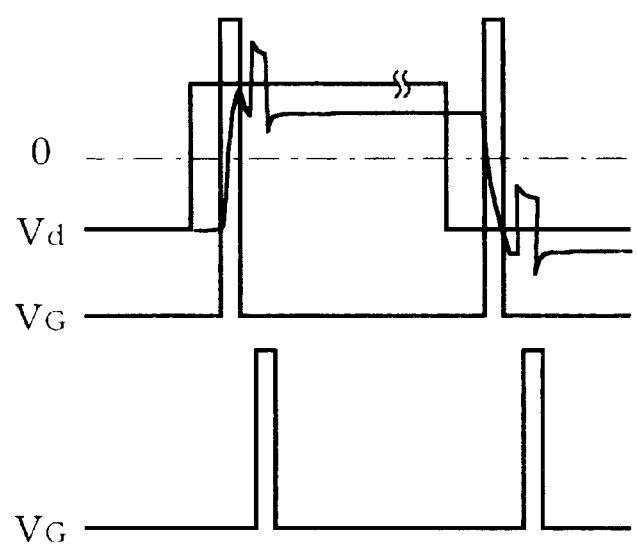
FIG. 43 is an operational waveform of the thin film transistor matrix device shown in FIG. 41.
Figure 44A:
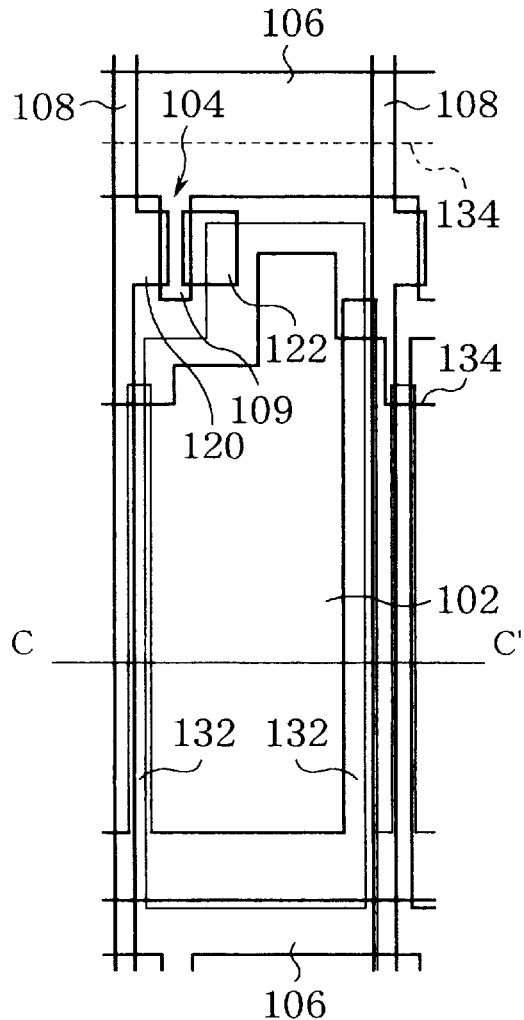
FIGS. 44A and 44B are views of a conventional thin film transistor matrix device.
Figure 44B:
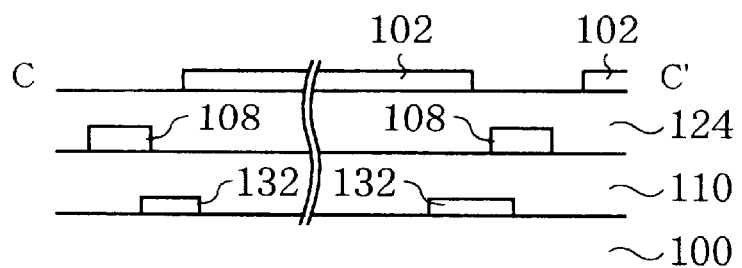
Figure 45A:
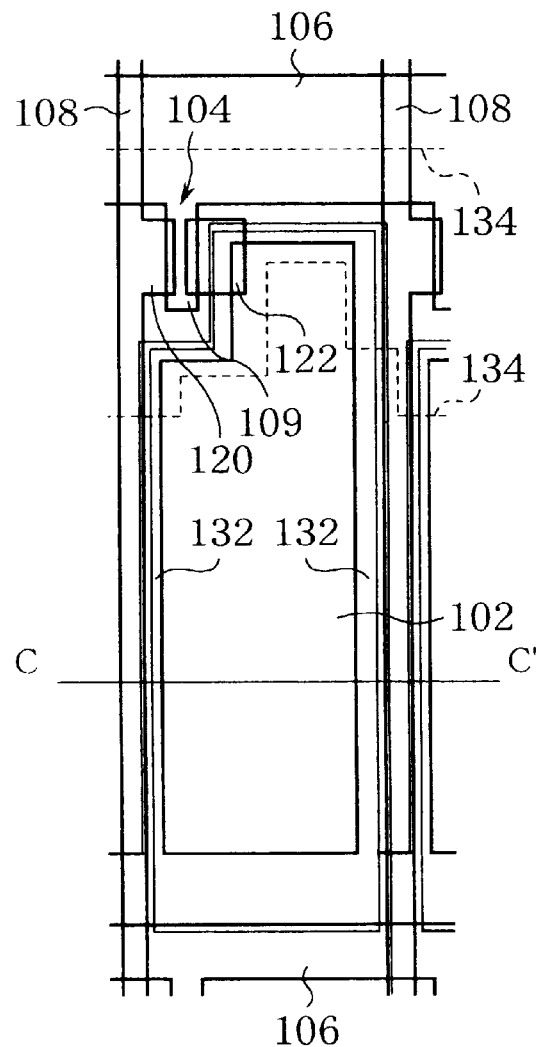
FIGS. 45A and 45B are views of a conventional thin film transistor matrix device.
Figure 45B:
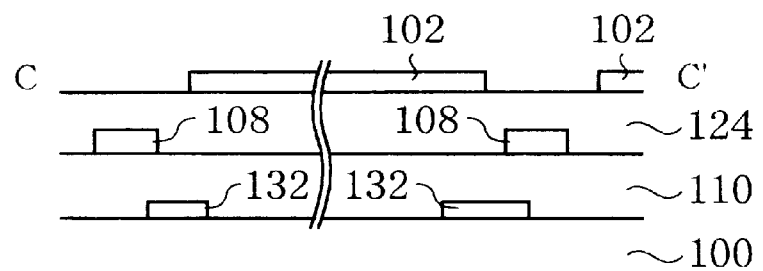
Figure 46:
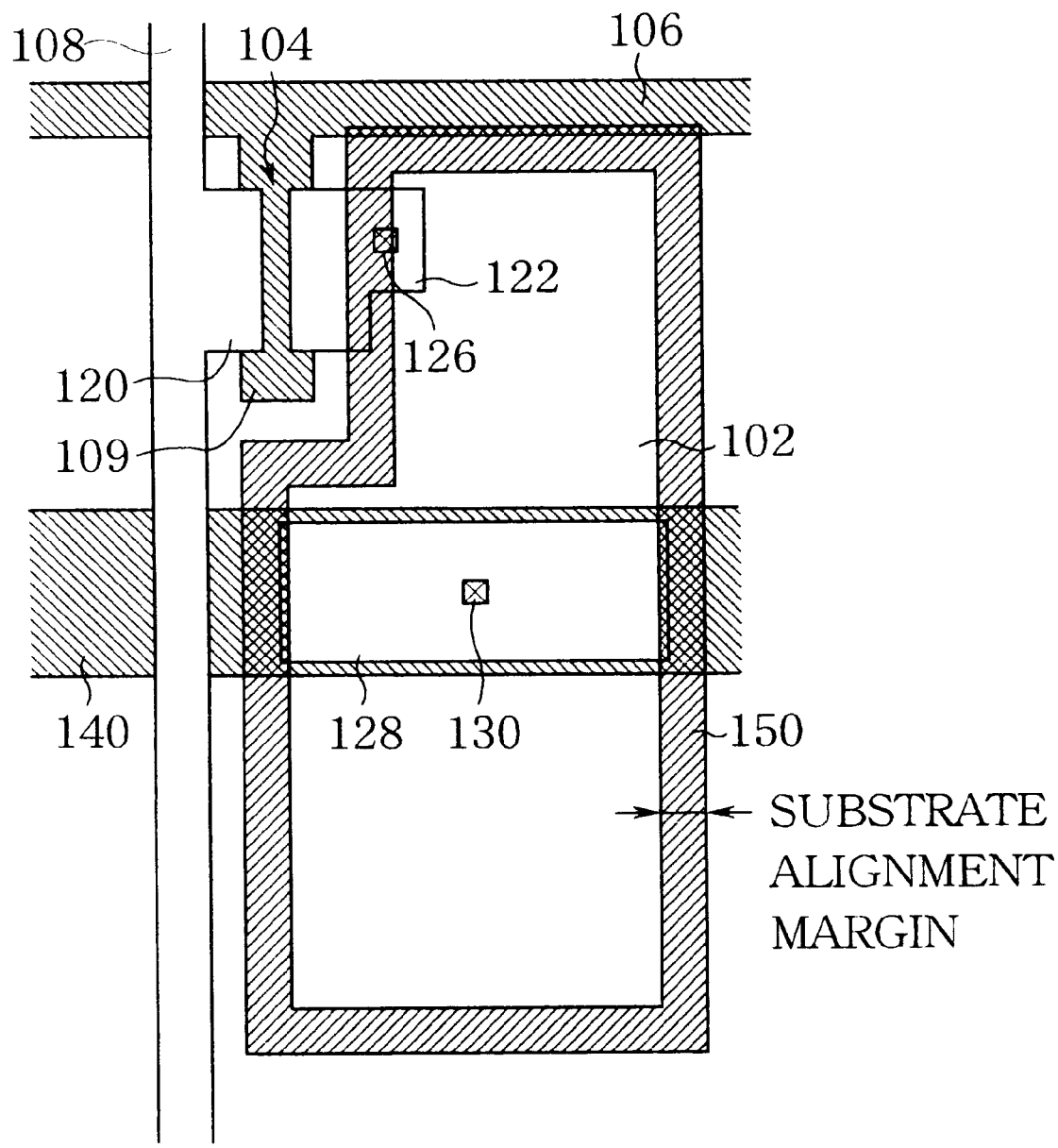
FIG. 46 is a view of a conventional thin film transistor matrix device.
Figure 47A:
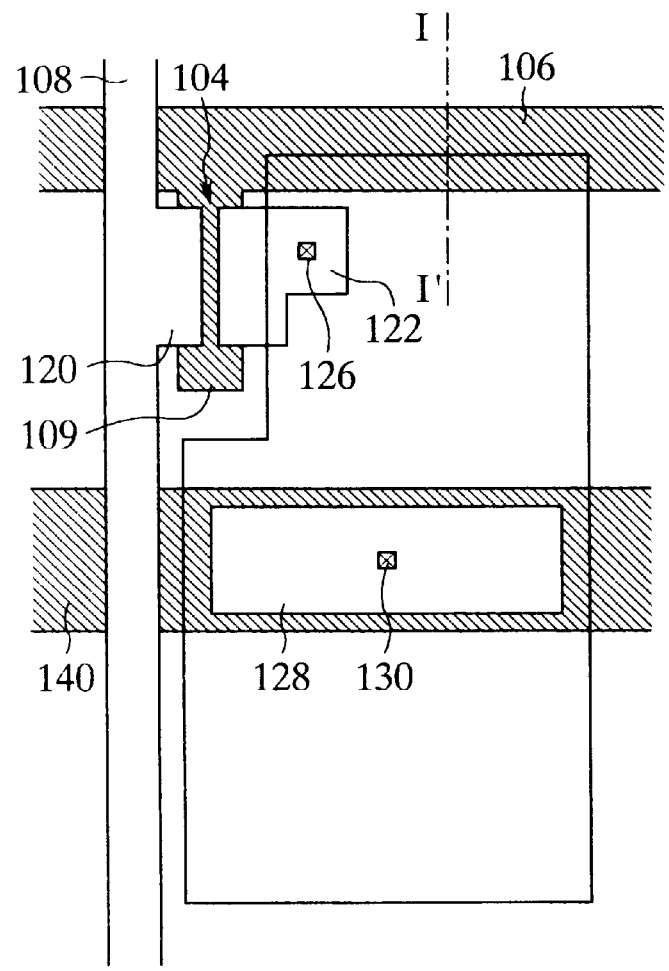
FIGS. 47A and 47B are views of a conventional thin film transistor matrix device.
Figure 47B:
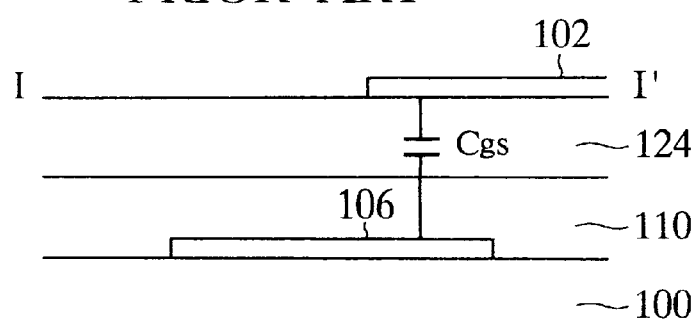

The thin film transistor matrix device according to a twenty-fifth embodiment of the present invention will be explained with reference to FIG. 37. The same members or members of the same kinds of the present embodiment as the thin film transistor matrix device shown in FIG. 29 are represented by the same reference numerals to simplify or not to repeat their explanation.

The thin film transistor matrix device according to the present embodiment has substantially the same constitution as the thin film transistor matrix device according to the seventeenth embodiment but is characterized in that the gate electrodes 32 are made larger to light shield the gaps in the neighborhood of the thin film transistors 14. The gate electrodes 32 light shield the gaps between drain bus lines 18m, 18m+1, 18m+2, ... and drain electrodes 34, and picture element electrodes 12. A light shielding film 70 on an opposed substrate light shield only at the gaps between the thin film transistors 14 and capacitance bus lines 60n, 60m+1, 60n+2, ...

Thus enlarging the gate electrodes 32 generates parasitic capacitances between the gate electrodes 32 and the picture element electrodes 12 of a previous row, but the parasitic capacitances have such a small value that they little affect display quality and do not degrade display quality.

As described above, according to the present embodiment, the gate electrodes are used to light shield at the gaps with respect to the picture element electrodes, whereby the light shielding films on the opposed substrate can have a smaller light shielding region, which contributes to higher aperture ratios.

Modifications

The present invention is not limited to the above-described embodiments and cover other various modifications.

For example, in the above-described embodiments, thin film transistors are used as the transistors, but they may be other non-linear devices, such as MOS transistors or others as long as the devices can switch the picture element electrodes.

What is claimed is:

1. A transistor matrix device comprising:

an insulating substrate;

a plurality of picture element electrodes arranged in a matrix on the insulating substrate;

a plurality of transistors electrically connected respectively to said plurality of picture element electrodes for switching the respective picture element electrodes;

a plurality of gate bus lines commonly connecting gates of the transistors; and a plurality of drain bus lines commonly connecting drains of the transistors, the picture element electrodes of an n-th row, which are connected to an n-th gate bus line through the transistors, having at least parts thereof located between an n+1-th gate bus line, which is next to the n-th gate bus line, and an n+2-th gate bus line, which is next to the n+1-th gate bus line, but without extending into a region between the n-th gate bus line and the n+1-th gate bus line, so that the picture element electrodes of the n-th row do not overlap the n-th gate bus line.

2. A transistor matrix device according to claim 1, wherein:

the picture element electrodes of the n-th row are disposed in a region between the n+1-th gate bus line and the n+2-th gate bus line.

3. A transistor matrix device according to claim 1, further comprising:

first sub-capacitances disposed between the picture element electrodes of the n-th row and the n+1-th gate bus lines.

4. A transistor matrix device according to claim 3, further comprising:

second sub-capacitances disposed between the picture element electrodes of the n-th row and the n+2-th gate bus lines.

5. A transistor matrix device according to claim 4, wherein:

a capacitance value of the second sub-capacitances is larger than that of the first sub-capacitances.

6. A transistor matrix device according to claim 4, wherein:

a capacitance value of the first sub-capacitances is larger than that of the second sub-capacitances.

7. A transistor matrix device according to claim 4, further comprising:

intermediate electrodes disposed between the picture element electrodes and the gate bus lines and connected to the picture element electrodes, the second sub-capacitances being formed between the intermediate electrodes and the gate bus lines.

8. A transistor matrix device according to claim 3, further comprising:

intermediate electrodes disposed between the picture element electrodes and the gate bus lines and connected to the picture element electrodes, the first sub-capacitances being formed between the intermediate electrodes and the gate bus lines.

9. A transistor matrix device according to claim 3, further comprising:

source electrodes disposed between sources of the transistors and the picture element electrodes and connecting the sources to the picture element electrodes, the first sub-capacitances being formed between the source electrodes and the gate bus lines.

10. A transistor matrix device according to claim 9, wherein:

the source electrodes shield light at gaps between the picture element electrodes and the gate bus lines.

11. A transistor matrix device according to claim 1, wherein:

the picture element electrodes of the n-th row or electrodes connected thereto, and the picture element electrodes of the n+1-th row or electrodes connected thereto are-neighbored with each other by below 5 $\mu$m.

12. A transistor matrix device according to claim 1, further comprising:

a plurality of light shielding films for shielding light at gaps between the picture element electrodes of the n-th row and the picture element electrodes of the n+1-th row next to the n-th row.

13. A transistor matrix device according to claim 12, wherein:

an n-th light shielding film which shields light at the gaps between the picture element electrodes of the n-th row and the picture element electrodes of the n+1-th row is connected to the n+2-th gate bus line.

14. A transistor matrix device according to claim 1, wherein:

the gate bus lines are overlapped on edges of the picture element electrodes of two neighboring rows or electrodes connected to said picture element electrodes, and the gate bus lines are overlapped on the picture element electrodes of one of the two neighboring rows or the electrodes connected thereto over a width wider than on the picture element electrodes of the other of the two neighboring rows or the electrodes connected thereto, whereby the gate bus lines shield inversion boundaries of liquid crystal generated near the edges of the picture element electrodes of said one row or said electrodes connected thereto.

15. A transistor matrix device according to claim 14, wherein:

an orientation of the liquid crystal has a component which is directed from the edges of said picture element electrodes or said electrodes connected thereto, which are overlapped on the gate bus lines over the relatively larger width, to the edges of said picture element electrodes or said electrodes, which are overlapped on the gate bus lines over the relatively smaller width.

16. A transistor matrix device according to claim 1, wherein:

said picture element electrodes are picture element electrodes each of three sub-picture elements constituting one color picture element.

17. A transistor matrix device according to claim 16, wherein:

the three sub-picture elements constituting each of said picture elements are located respectively at three summits of a triangle.

18. A transistor matrix device according to claim 1, wherein:

the transistors are thin film transistors.

19. A liquid crystal panel comprising:

a transistor matrix device according to claim 1;

an opposed substrate arranged opposed to the transistor matrix device; and a liquid crystal sandwiched between the transistor matrix device and the opposed substrate.

20. A liquid crystal display unit comprising:

a liquid crystal panel according to claim 19;

a drive circuit for driving the liquid crystal panel; and a connection wiring for connecting the liquid crystal panel and the drive circuit.

21. A liquid crystal panel according to claim 19, wherein:

an orientation of the liquid crystal corresponding to a first region between the n-th gate bus line and the n-th light shielding film is different from an orientation of the liquid crystal corresponding to a second region between the n-th light shielding film and the n+1-th gate bus line.

22. A transistor matrix device according to claim 1, wherein the picture element electrodes of the n-th row overlap both the n+1-th gate bus line and the n+2-th gate bus line.

23. A transistor matrix device comprising:

an insulating substrate;

a plurality of picture element electrodes arranged in a matrix on the insulating substrate;

a plurality of transistors electrically connected respectively on said plurality of picture element electrodes for switching the respective picture element electrodes;

a plurality of gate bus lines commonly connecting the gates of the transistors; and a plurality of drain bus lines commonly connecting the drains of the transistors, the gate bus lines being overlapped on edges of the picture element electrodes of one of two neighboring rows or electrodes connected to said picture element electrodes, and on edges of the picture element electrodes of the other of the two neighboring rows or electrodes connected to said picture element electrodes, wherein said two neighboring rows of picture element electrodes do not include the picture element electrodes driven by its associated gate bus line, a width of the gate bus lines overlapped on the picture element electrodes of said one row or the electrodes connected thereto being wider than that of the gate bus lines overlapped on the picture element, electrodes of the other row or the electrodes connected thereto, whereby the gate bus lines shield inversion boundaries of liquid crystal generated near the edges of the picture element electrodes of said one row or said electrodes connected thereto.

24. A transistor matrix device according to claim 23, wherein:

an orientation of the liquid crystal has a component which is directed from the edges of said picture element electrodes or said electrodes connected thereto, which are overlapped on the gate bus lines over the relatively larger width, to the edges of said picture element electrodes or said electrodes, which are overlapped on the gate bus lines over the relatively smaller width.

25. A transistor matrix device according to claim 23, wherein:

said picture element electrodes are picture element electrodes each of three sub-picture elements constituting one color picture element.

26. A transistor matrix device according to claim 25, wherein:

the three sub-picture elements constituting each of said picture elements are located respectively at three summits of a triangle.

27. A transistor matrix device according to claim 23, wherein: the transistors are thin film transistors.

28. A liquid crystal panel comprising:

a transistor matrix device according to claim 23;

an opposed substrate arranged opposed to the transistor matrix device; and a liquid crystal sandwiched between the transistor matrix device and the opposed substrate.

29. A liquid crystal panel according to claim 28, wherein:

an orientation of the liquid crystal corresponding to a first region between the n-th gate bus line and the n-th light shielding film is different from an orientation of the liquid crystal corresponding to a second region between the n-th light shielding film and the n+1-th gate bus line.

30. A liquid crystal display unit comprising:

a liquid crystal panel according to claims 28;

a drive circuit for driving the liquid crystal panel; and a connection wiring for connecting the liquid crystal panel and the drive circuit.

* * * * *

UNITED STATES PATENT AND TRADEMARK OFFICE
CERTIFICATE OF CORRECTION

PATENT NO. : 5,946,058
DATED : August 31, 1999
INVENTOR(S) : Kamada et al.

Page 1 of 2

It is certified that error appears in the above-identified patent and that said Letters Patent is hereby corrected as shown below:

ON THE TITLE PAGE

Under "[75] Inventors" please delete

"Katsusige" and insert --Katsushige-- therefor

Column 32, line 9, after "claim" delete "4"

and insert --3-- therefor and insert --4-- therefor

Column 32, line 22, before "sub-capacitances" delete "first" and insert

--second-- therefor

UNITED STATES PATENT AND TRADEMARK OFFICE
CERTIFICATE OF CORRECTION

PATENT NO. : 5,946,058
DATED : August 31, 1999
INVENTOR(S) : Kamada et al.

It is certified that error appears in the above-identified patent and that said Letters Patent is hereby corrected as shown below:

Column 32, line 40, delete "are-neighbored" and insert --are neighbored-- therefor Column 34, line 12, after "element" delete "," (comma)

Column 34, lines 4-7 after "said picture element electrodes," delete "wherein said two neighboring rows of picture element electrodes do not include the picture element electrodes driven by its associated gate bus line"

Signed and Sealed this

Seventeenth Day of April, 2001

Attest:

NICHOLAS P. GODICI

*Attesting Officer*   Acting Director of the United States Patent and Trademark Office